United States Patent
Kurokawa et al.

(10) Patent No.: US 10,287,962 B2
(45) Date of Patent: May 14, 2019

(54) WORK VEHICLE

(71) Applicant: YANMAR CO., LTD., Osaka-shi, Osaka (JP)

(72) Inventors: Yoshiaki Kurokawa, Osaka (JP); Koji Kawakami, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/489,216

(22) Filed: Apr. 17, 2017

(65) Prior Publication Data

US 2017/0218832 A1    Aug. 3, 2017

Related U.S. Application Data

(63) Continuation of application No. PCT/JP2015/078380, filed on Oct. 6, 2015.

(30) Foreign Application Priority Data

Oct. 16, 2014   (JP) ................ 2014-211350
Apr. 9, 2015    (JP) ................ 2015-079709

(51) Int. Cl.
   *B60K 11/04*   (2006.01)
   *F01P 1/02*    (2006.01)
   (Continued)

(52) U.S. Cl.
   CPC .............. *F01P 1/02* (2013.01); *B60K 11/04* (2013.01); *B60K 13/02* (2013.01); *B60K 13/04* (2013.01);
   (Continued)

(58) Field of Classification Search
   CPC ...... F01P 1/02; F01P 5/06; F01P 11/08; F01P 11/10; F01P 11/12; F01P 11/0295; F01P 2060/02; F01P 2060/04; F01P 2060/10; F01P 2060/12; F01N 13/1805; F01N 13/08; F01N 3/021; F02B 29/0406; F02B 29/0412; F02B 29/045; F02M 35/048; F02M 35/164; F02M 35/00; F02M 35/04;
   (Continued)

(56) References Cited

U.S. PATENT DOCUMENTS 5,234,051 A * 8/1993 Weizenburger ........ B60K 11/04
                                                    123/41.31
5,386,873 A    2/1995 Harden, III et al.
(Continued)

FOREIGN PATENT DOCUMENTS

EP    1707420 A2   10/2006
EP    2311681 A1    4/2011
(Continued)

*Primary Examiner* — James M Dolak
(74) *Attorney, Agent, or Firm* — Norton Rose Fulbright US LLP

(57) ABSTRACT

A work vehicle includes a hood, an engine, a radiator, an air cleaner, and a condenser. The hood covers an engine compartment located on a front portion of a traveling body. The engine is a drive source. The radiator supplies a coolant to the engine. The air cleaner takes in outside air and supplies the air to the engine. The condenser cools a refrigerant. In front of the radiator, the air cleaner and the condenser are disposed one above the other. The condenser is withdrawable in the left and right direction.

2 Claims, 38 Drawing Sheets

(51) Int. Cl.
  *B60K 13/02* (2006.01)
  *B60K 13/04* (2006.01)
  *B62D 21/18* (2006.01)
  *B62D 25/04* (2006.01)
  *B62D 25/10* (2006.01)
  *B62D 49/06* (2006.01)
  *F01N 3/021* (2006.01)
  *F01P 11/02* (2006.01)
  *F01P 11/08* (2006.01)
  *F01P 11/10* (2006.01)
  *F01P 11/12* (2006.01)
  *F02B 29/04* (2006.01)
  *F02M 35/16* (2006.01)
  *F01P 5/06* (2006.01)
  *F02M 35/04* (2006.01)
  *F01N 13/08* (2010.01)
  *F01N 13/18* (2010.01)
  *E02F 9/08* (2006.01)
  *F01P 7/16* (2006.01)

(52) U.S. Cl.
  CPC ......... *B62D 21/18* (2013.01); *B62D 25/04* (2013.01); *B62D 25/10* (2013.01); *B62D 49/06* (2013.01); *E02F 9/0808* (2013.01); *E02F 9/0866* (2013.01); *F01N 3/021* (2013.01); *F01N 13/08* (2013.01); *F01N 13/1805* (2013.01); *F01P 5/06* (2013.01); *F01P 11/0295* (2013.01); *F01P 11/08* (2013.01); *F01P 11/10* (2013.01); *F01P 11/12* (2013.01); *F02B 29/0406* (2013.01); *F02B 29/0431* (2013.01); *F02M 35/048* (2013.01); *F02M 35/164* (2013.01); *B60Y 2200/221* (2013.01); *B62D 21/186* (2013.01); *F01N 2340/04* (2013.01); *F01N 2590/08* (2013.01); *F01P 7/16* (2013.01); *F01P 2060/04* (2013.01); *F01P 2060/10* (2013.01); *F01P 2060/14* (2013.01); *Y02T 10/146* (2013.01); *Y02T 10/20* (2013.01)

(58) Field of Classification Search
  CPC ......... E02F 9/0866; E02F 9/0808; E02F 9/08; E02F 9/0891; B60K 13/02; B60K 13/04; B60K 13/00; B60K 11/02; B60K 11/04; B60K 11/06; B60K 11/00; B62D 25/10; B62D 25/04; B62D 25/082; B62D 25/084; B62D 21/18; B62D 21/186; B62D 49/00; B62D 49/06
  See application file for complete search history.

(56) References Cited

U.S. PATENT DOCUMENTS

| | | | | |
|---|---|---|---|---|
| 6,435,264 | B1* | 8/2002 | Konno | B60K 11/04 123/41.49 |
| 6,951,240 | B2* | 10/2005 | Kolb | B60K 11/02 165/121 |
| 7,089,994 | B2* | 8/2006 | Esposito | B60K 11/04 165/42 |
| 7,128,178 | B1 | 10/2006 | Heinle et al. | |
| 7,284,594 | B2* | 10/2007 | Sanada | F25B 39/04 165/132 |
| 7,383,905 | B2* | 6/2008 | Lang | B60K 11/04 180/68.1 |
| 7,398,847 | B2* | 7/2008 | Schmitt | B60K 11/04 180/68.4 |
| 7,814,963 | B2* | 10/2010 | Adamson | B60K 11/04 123/41.31 |
| 7,896,062 | B2* | 3/2011 | Adamson | B60K 11/04 123/563 |
| 8,162,087 | B2* | 4/2012 | Kobayashi | B60K 11/08 165/149 |
| 8,256,496 | B2* | 9/2012 | Shuttleworth | F01P 5/06 123/41.31 |
| 8,505,499 | B2* | 8/2013 | Hirasawa | B60K 11/04 123/41.01 |
| 8,960,342 | B2* | 2/2015 | Werner | B60K 11/04 165/41 |
| 9,045,171 | B2* | 6/2015 | Nogami | B62D 25/105 |
| 9,580,112 | B2* | 2/2017 | Shoen | B62D 25/12 |
| 9,895,966 | B2* | 2/2018 | Inaoka | B60K 11/04 |
| 10,072,557 | B2* | 9/2018 | Gullberg | F04D 17/16 |
| 10,072,670 | B2* | 9/2018 | Jung | F04D 29/526 |
| 2006/0219451 | A1 | 10/2006 | Schmitt | |
| 2011/0088637 | A1 | 4/2011 | Hirasawa et al. | |
| 2011/0277961 | A1* | 11/2011 | Knepper | F01P 3/18 165/104.19 |
| 2012/0103712 | A1 | 5/2012 | Stanek et al. | |

FOREIGN PATENT DOCUMENTS

| | | |
|---|---|---|
| JP | 11-11163 A | 1/1999 |
| JP | H11-350530 A | 12/1999 |
| JP | 2007-182165 A | 7/2007 |
| JP | 2008-031955 A | 2/2008 |
| JP | 2011-88571 A | 5/2011 |
| JP | 2012-86726 A | 5/2012 |
| JP | 2012-184601 A | 9/2012 |
| JP | 2012-201158 A | 10/2012 |
| JP | 2014-148921 A | 8/2014 |
| JP | 2014-172465 A | 9/2014 |

* cited by examiner

WORK VEHICLE

CROSS-REFERENCE TO RELATED APPLICATIONS

The present application is a continuation application of International Application No. PCT/JP2015/078380, filed Oct. 6, 2015, which claims priority to Japanese Patent Application No. 2014-211350, filed Oct. 16, 2014 and Japanese Patent Application No. 2015-079709, filed Apr. 9, 2015. The contents of these applications are incorporated herein by reference in their entirety.

BACKGROUND OF THE INVENTION

The invention of the present application relates to work vehicles.

As higher-level emission regulations have been applied to diesel engines (hereinafter, simply referred to as engines), agricultural vehicles and construction and engineering machines that include an engine are required to include an exhaust gas purification device that removes air pollutants in exhaust gas. Diesel particulate filters (hereinafter, referred to as the DPF) that collect, for example, particulate matter in exhaust gas (for example, refer to Japanese Unexamined Patent Application Publication No. 2008-31955) are known exhaust gas purification devices.

SUMMARY OF THE INVENTION

Japanese Unexamined Patent Application Publication No. 2008-31955 discloses a configuration of a tractor. The tractor includes an engine on the front section of a traveling body. A DPF is located on either left or right side of an exhaust manifold above the engine. The DPF extends in the fore-and-aft direction of the engine. The DPF and the engine are covered with a hood. According to the tractor disclosed in Japanese Unexamined Patent Application Publication No. 2008-31955, the hood has a cross-section that is like an inverted U-shape. Thus, the left and right corners of the hood bulge outward. The DPF is located inside the left and right corners, that is, in the left and right inner corners of the hood. As described above, with the configuration disclosed in Japanese Unexamined Patent Application Publication No. 2008-31955, since the left and right corners of the hood bulge outward in view of a mounting space of the DPF, the forward view of an operator seated in an operator's seat of the traveling body, in particular, view ahead of the left and right corners of the hood is sacrificed.

If the DPF is mounted close to the engine, decrease in the temperature of the exhaust gas supplied from the engine to the DPF is reduced, and the temperature of the exhaust gas in the DPF is easily maintained at a high temperature. Since the support structure of the DPF, however, is not easily simplified, the workability in mounting the DPF or shock proof cannot be improved. Increase in the size of the engine due to mounting of the DPF increases influence caused by vibration of the engine having different vibration systems, and breakage or failure may possibly occur in a component that needs to be coupled to both the traveling body and the engine (for example, an exhaust pipe).

Increase in the size of the engine not only requires a design change in the work vehicle due to an insufficient engine mounting space in the work vehicle, but also deteriorates ease of maintenance depending on the mounting state of the engine. Furthermore, increase in the size of the engine deteriorates the flow of cooling air in the engine compartment so that cooling effect is reduced. The heat retention in the engine compartment may possibly cause a failure not only in the electronic components, but also in the engine due to heating.

Accordingly, the invention of the present application provides a work vehicle that has been improved taking into consideration the above-described current status.

According to one aspect of the invention of the present application, the work vehicle includes an engine, a radiator, an intercooler, and an oil cooler. The engine is on a front portion of a traveling body and includes a forced induction device. The radiator is configured to supply a coolant to the engine. The intercooler is configured to cool compressed air from the forced induction device. The oil cooler is configured to cool lubricant. The intercooler and the oil cooler are disposed one above the other in front of the radiator. The intercooler is above the oil cooler and secured to a stationary frame. The oil cooler is located within the stationary frame and pivotable about a vertical axis.

In the first aspect of the present invention, the work vehicle may further include an air cleaner and a condenser. The air cleaner may be configured to take in outside air and supply the air to the engine. The air cleaner may be secured to a location in front of the intercooler and spaced apart from the intercooler. The condenser may be configured to cool a refrigerant. The air cleaner and the condenser may be disposed one above the other. The condenser may be withdrawable in a left and right direction.

In the first aspect of the present invention, the work vehicle may further include an air cleaner and a condenser. The air cleaner may be configured to take in outside air and supply the air to the engine. The air cleaner may be secured to a location in front of the intercooler and spaced apart from the intercooler. The condenser may be configured to cool a refrigerant. The air cleaner and the condenser may be disposed one above the other. The condenser may be pivotable about a fore-and-aft axis.

According to another aspect of the invention of the present application, the work vehicle includes an engine, a radiator, a hood, a cooling fan, a fan shroud, and a plurality of heat exchangers. The engine is in an engine compartment and on a front portion of a traveling body. The engine includes a forced induction device. The radiator is in the engine compartment and configured to supply a coolant to the engine. The hood includes an opening portion in a front surface of the hood and is configured to cover the engine compartment. The cooling fan is in the engine compartment and at a front of the engine. The cooling fan is disposed with a center of the cooling fan offset downward from a center of the radiator. The fan shroud is in the engine compartment and configured to surround an outer circumference of the cooling fan and to cover a rear surface of the radiator. The plurality of heat exchangers are in the engine compartment and in front of the radiator. The plurality of heat exchangers are disposed one above the other with a number of upper ones of the heat exchangers being smaller than a number of lower ones of the heat exchangers.

In the second aspect of the present invention, in the work vehicle, the plurality of heat exchangers may be a condenser, an intercooler, and an oil cooler. The condenser may be configured to cool a refrigerant. The intercooler may be configured to cool compressed air from the forced induction device. The oil cooler may be configured to cool lubricant. The intercooler and the oil cooler may be disposed one above the other in front of the radiator. The condenser may be located in front of the intercooler and the oil cooler and at a lower location.

In the second aspect of the present invention, in the work vehicle, the fan shroud may include a first frame portion, a second frame portion, and an offset portion. The first frame portion may include an inlet side opening and be configured to cover an entire rear surface of the radiator. The first frame portion may have a larger cross section. The second frame portion may include an outlet side opening and be configured to cover the outer circumference of the cooling fan. The second frame portion may have a smaller cross section. The fan shroud may have a shape such that the first frame portion is connected to the second frame portion in a fore-and-aft direction. The offset portion may be above the cooling fan and may have a gently curved surface at a connection portion between the first frame portion and the second frame portion.

In the second aspect of the present invention, the work vehicle may be configured as follows. The hood may be configured to cover the engine compartment, which is located on a front section of the traveling body. The engine may be a drive source. The cooling fan may be configured to air-cool the engine. The plurality of heat exchangers may be configured to allow cooling air guided by the cooling fan to pass through the heat exchangers to exchange heat with a cooling medium. The work vehicle may further include a bottom plate and an engine control unit. The bottom plate may be configured to cover an upper surface of a front portion of the traveling body. The engine control unit may be configured to control the engine. The engine control unit may be located in front of the heat exchangers and stand upright on the bottom plate with a longitudinal direction of the engine control unit being in conformance with a fore-and-aft direction of the traveling body. With this configuration, the mounting orientation of the engine control unit is in conformance with the cooling air, which is caused to flow through the engine compartment in the fore-and-aft direction by the cooling fan. As a result, since the area in the engine control unit that acts as a shield against the flow of the cooling air is reduced, decrease in the flow rate of the cooling air to the engine is inhibited, and therefore the interior of the engine compartment is maintained at an appropriate temperature.

The opening portion of the hood may be left and right symmetrical meshed opening portions at positions in front of the cooling fan. The bottom plate may include a meshed opening portion in front of the cooling fan. The engine control unit may be located at a position between the left and right symmetrical meshed opening portions and above the opening portion of the bottom plate. With this configuration, since the engine control unit is located at a position that does not overlap the opening portions of the hood, the existence of the engine control unit does not reduce the open area through which the cooling air flows to the inside. Furthermore, in the limited configuration at the front of the cooling fan, the open area is made greater than the flow rate of air to be passed through the cooling fan since the opening portion is present in the bottom plate. Furthermore, since the engine control unit is located above the opening portion of the bottom plate, the engine control unit can be cooled.

The bottom plate may be made up of a front bottom plate and a rear bottom plate, which are two separate fore and aft plates. The engine control unit may stand upright on the front bottom plate. The front bottom plate may include a harness insertion hole at a location rearward of the opening portion. A harness to be coupled to the engine control unit may be inserted through the harness insertion hole. With this configuration, the engine control unit and the insertion hole, through which the harness of the engine control unit is inserted, are collectively located on the front bottom plate. As a result, maintenance of the front section of the traveling body can be carried out simply by removing the front bottom plate, and thus the difficulties in the work are eliminated. Furthermore, the engine control unit is configured as a one-piece unit via the front bottom plate, and thus the ease of assembly is improved and replacement of the engine control unit is easy.

Furthermore, since the plurality of heat exchangers stand upright on the rear bottom plate of the bottom plate, the heat exchangers are collectively located on the rear bottom plate. As a result, maintenance of the front section of the traveling body can be carried out simply by removing the front bottom plate, and thus the difficulties in the work are eliminated. Furthermore, the heat exchangers are configured as a one-piece unit via the rear bottom plate, and thus the ease of assembly is improved and replacement of the heat exchangers is easy.

In the second aspect of the present invention, the work vehicle may further include an after-treatment device and a hood shield. The after-treatment device is in an upper section of the engine and configured to purify exhaust gas of the engine. The hood shield is at a rear of the hood and configured to cover a rear section of the engine. The hood shield may include left and right end portions bent forward so that left and right edges of the hood shield are located forward of a central portion of the hood shield. In the work vehicle, the engine may be mounted on a front portion of the traveling body. The cooling fan may be configured to air-cool the engine and may be located at a front of the engine. The fan shroud may be secured to the traveling body and configured to cover the cooling fan. The cooling fan, the engine, and the after-treatment device may be covered with the hood. With this configuration, since heat in the engine compartment below the hood is insulated by the hood shield, the temperature at the operator's seat is prevented from being increased by the exhaust heat from the engine compartment. Thus, the operator in the operator's seat can perform steering comfortably without being affected by the exhaust heat from the engine and the after-treatment device. Since the left and right end portions of the hood shield are bent, the noise generated by the engine in the engine compartment is prevented from propagating to the operator's seat.

The fan shroud may be configured to surround the cooling fan. The work vehicle may further include a pair of left and right support column frames and a beam frame. The pair of left and right support column frames may stand upright on the traveling body and may be coupled to the central portion of the hood shield. The central portion may be located between the bent portions of the hood shield. The beam frame may be held between the support column frames and the fan shroud. With this configuration, since the fan shroud and the hood shield, which are stably supported by the traveling body, are coupled to each other by the beam frame, which is held in between, these members integrally configure a sturdy engine compartment frame as a whole.

Furthermore, the pair of left and right support column frames may stand upright on the traveling body in the rear section of the engine. The beam frame may be held between the support column frames and the fan shroud. In the upper section of the engine, the after-treatment device may be located along the beam frame so that the after-treatment device may be positioned between the beam frame and an inner side surface of the hood. With this configuration, since the pair of support column frames and the fan shroud are coupled to each other by the beam frame, which is held in between, these members integrally configure a sturdy engine compartment frame as a whole. Furthermore, since the after-treatment device is positioned between the beam frame and the inner side surface of the hood, the space around the after-treatment device is larger, and as a result, the difficulties in component mounting and maintenance in the upper section of the engine are eliminated.

The work vehicle may further include a heat insulator secured to the beam frame. The heat insulator may be located below the hood to cover an upper portion of the after-treatment device. With this configuration, since the heat insulator is secured in such a manner as to hold the beam frame, the heat insulator reinforces the beam frame and renders the engine compartment frame more sturdy. Furthermore, since the heat insulator is located between the after-treatment device and the hood, the hood is prevented from being heated by exhaust heat from the engine compartment.

With the embodiment of the invention of the present application, since the oil cooler is mounted in an openable and closable manner, the worker can easily access the lower region in front of the radiator, where dust tends to deposit as a result of the flow of the cool air. Thus, the difficulties in the maintenance work are eliminated. Furthermore, since the air cleaner and the intercooler are spaced apart from each other, a space is formed above the radiator so that cool air can easily flow into the radiator. As a result, the velocity distribution of the cool air in the engine compartment is equalized in the height direction, and thus the backflow, for example, is inhibited.

With the embodiment of the invention of the present application, the condenser is withdrawable utilizing the space below the air cleaner. Thus, access to the space behind the condenser is facilitated, and as a result, the difficulties in the maintenance work for the heat exchangers for cooling are eliminated. Furthermore, since the condenser is mounted so as to be withdrawable in front of the radiator and below the air cleaner, the plurality of heat exchangers, including the radiator, the air cleaner, and the condenser, are efficiently arranged in the limited space of the engine compartment. This configuration optimizes the pressure drop of the cool air to the engine through the fan shroud. Thus, increase in the size of the hood is prevented and decrease in cooling efficiency in the engine compartment is inhibited.

With the embodiment of the invention of the present application, the condenser is pivotable utilizing the space between the air cleaner and the intercooler. Thus, access to the oil cooler is facilitated and also the oil cooler is openable and closable, and as a result, the difficulties in the maintenance work are eliminated. Furthermore, the oil cooler and the condenser are mounted so as to be pivotable in a manner to avoid the air cleaner and the intercooler, which are stationary. Thus, the number of components that need to be removed when a worker accesses the radiator is reduced and therefore the difficulties in maintenance work are eliminated. Furthermore, since the air cleaner and the intercooler are spaced apart from each other, a space is formed above the radiator so that the cool air can easily flow into the radiator. As a result, the velocity distribution of the cool air in the engine compartment is equalized in the height direction, and thus backflow of the cool air, for example, is inhibited.

With the embodiment of the invention of the present application, the pressure drop in the offset region between the cooling fan and the radiator is reduced, so that the velocity distribution of the cool air that flows within the fan shroud is equalized. As a result, a pressure differential within the fan shroud is inhibited, so that backflow of the cool air within the radiator is prevented, and thus the cooling efficiency of the radiator is increased. Furthermore, since the pressure drop in the offset region between the cooling fan and the radiator is reduced, introduction of the cool air is facilitated and thus the load imposed on the cooling fan is reduced.

DESCRIPTION OF THE EMBODIMENTS

Figure 1:
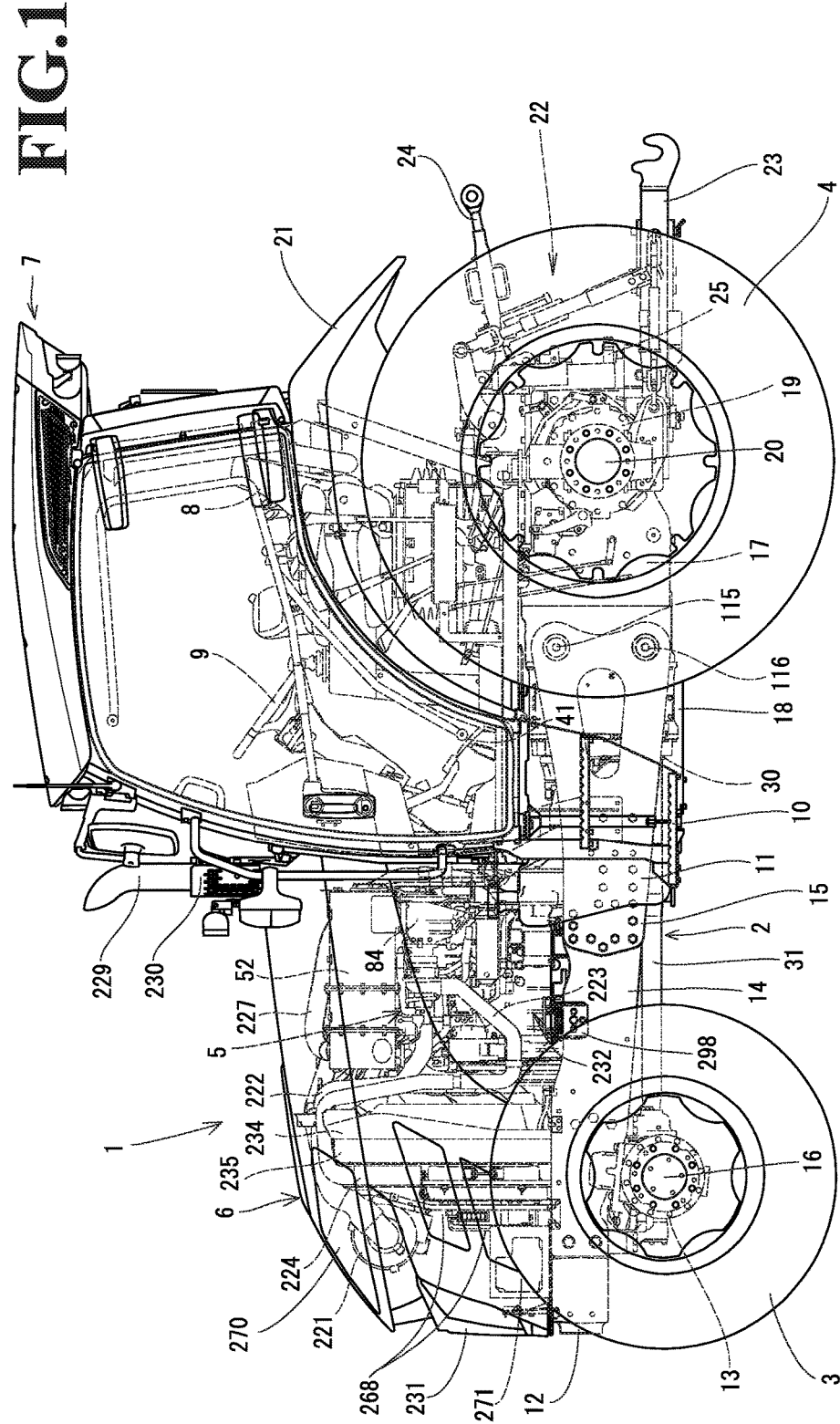
FIG. 1 is a left side view of a work vehicle according to the invention of the present application.
Figure 2:
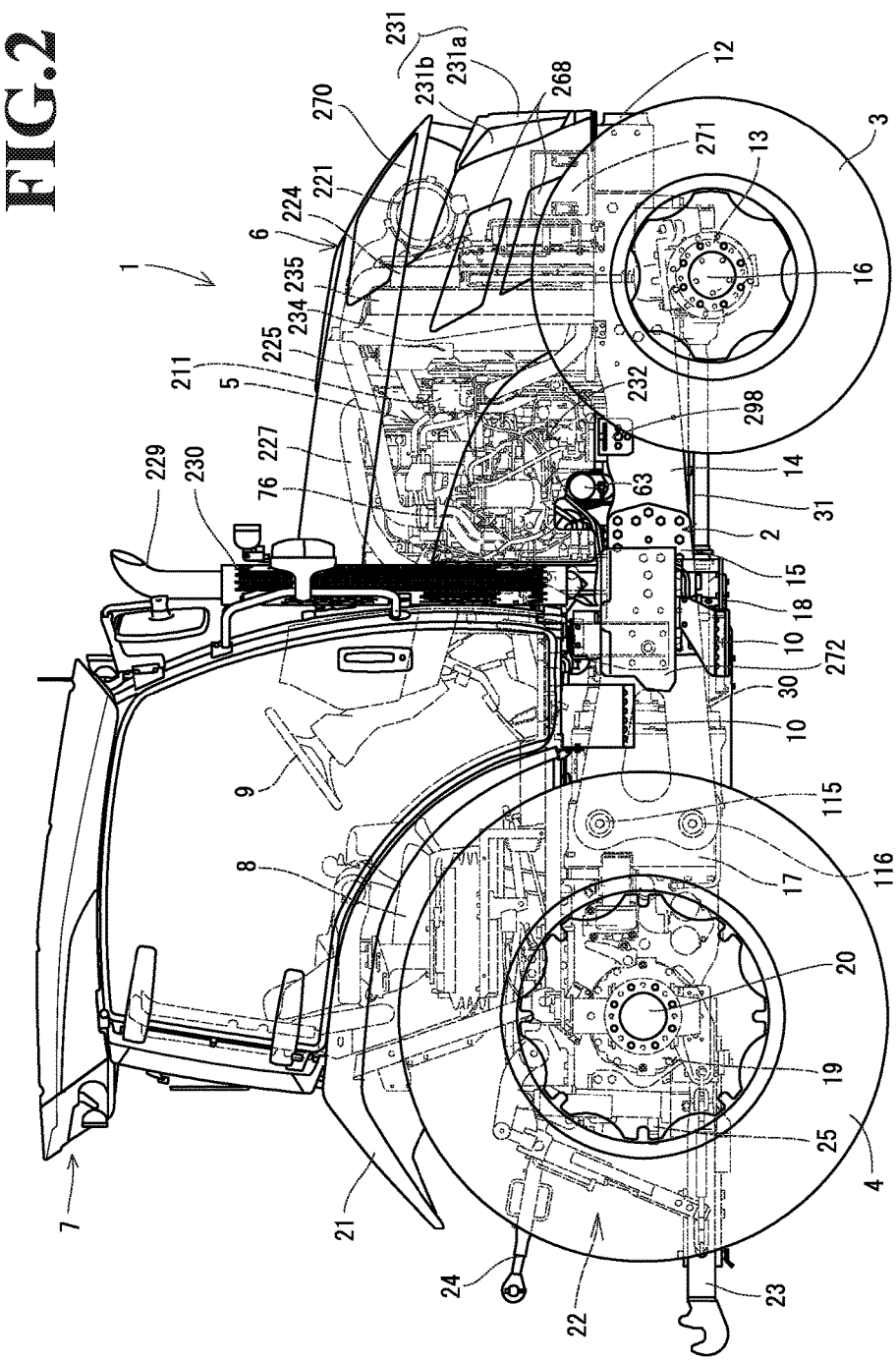
FIG. 2 is a right side view of the work vehicle.
Figure 3:
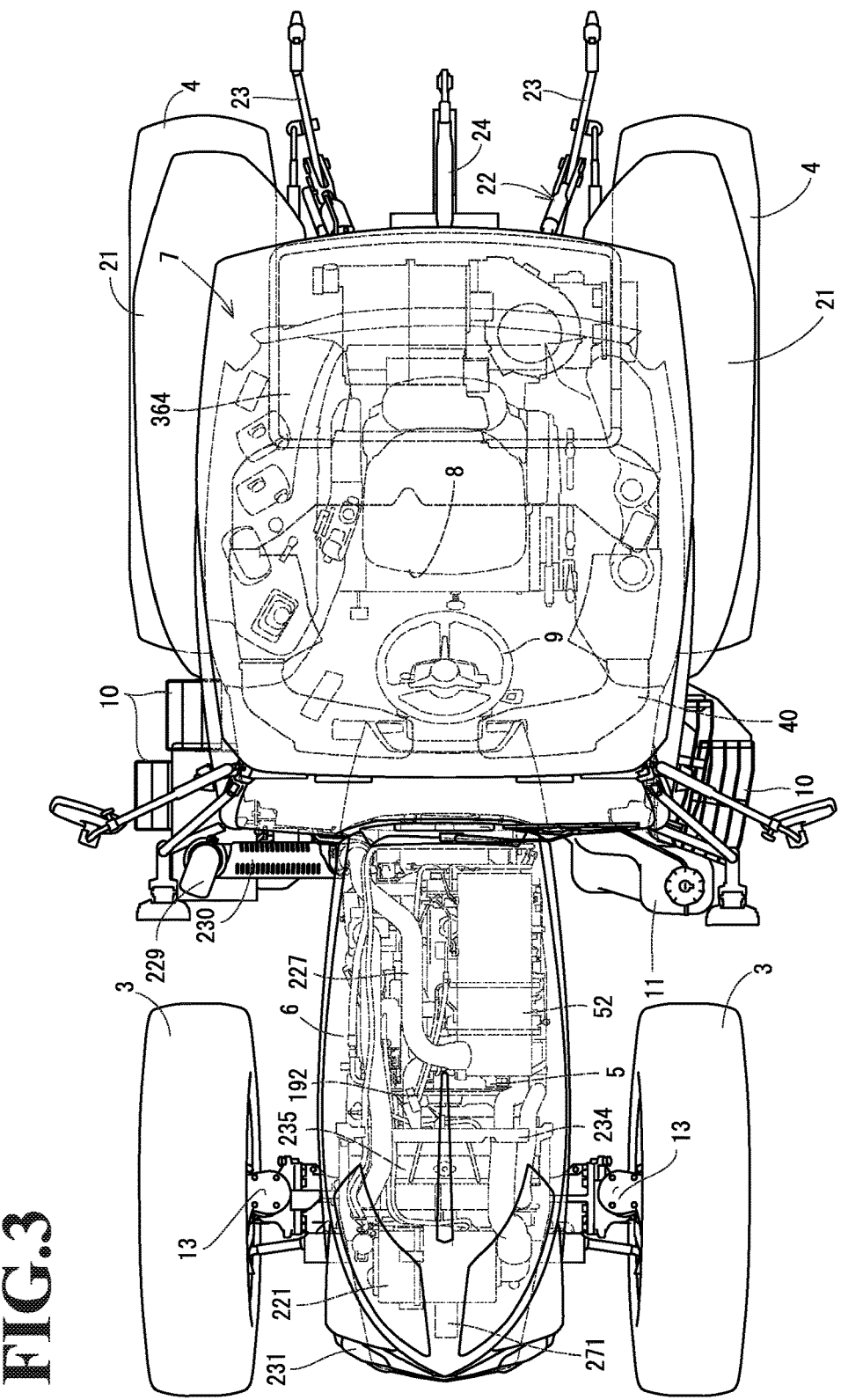
FIG. 3 is a plan view of the work vehicle.
Figure 4:
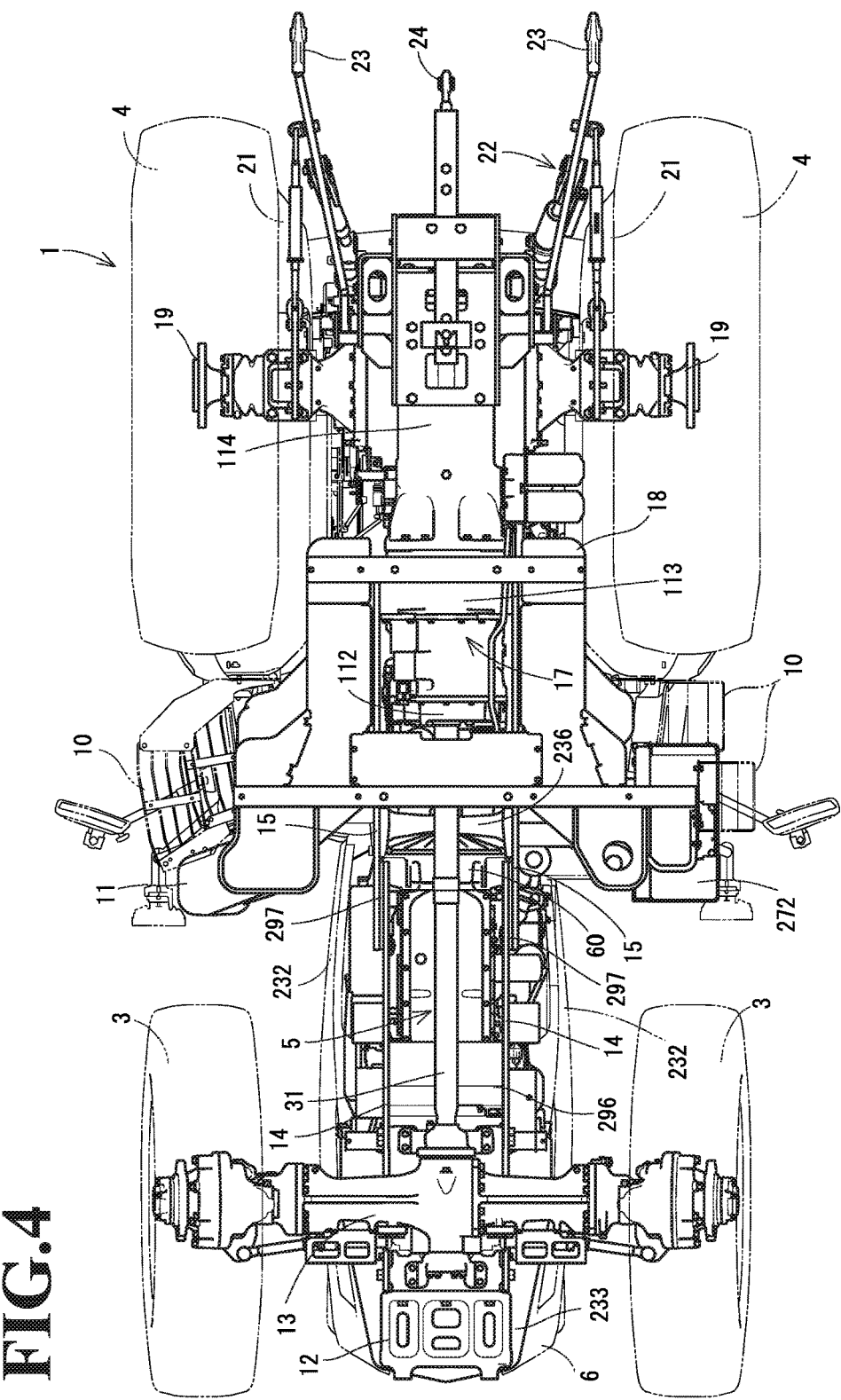
FIG. 4 is a bottom view of the work vehicle.
Figure 5:
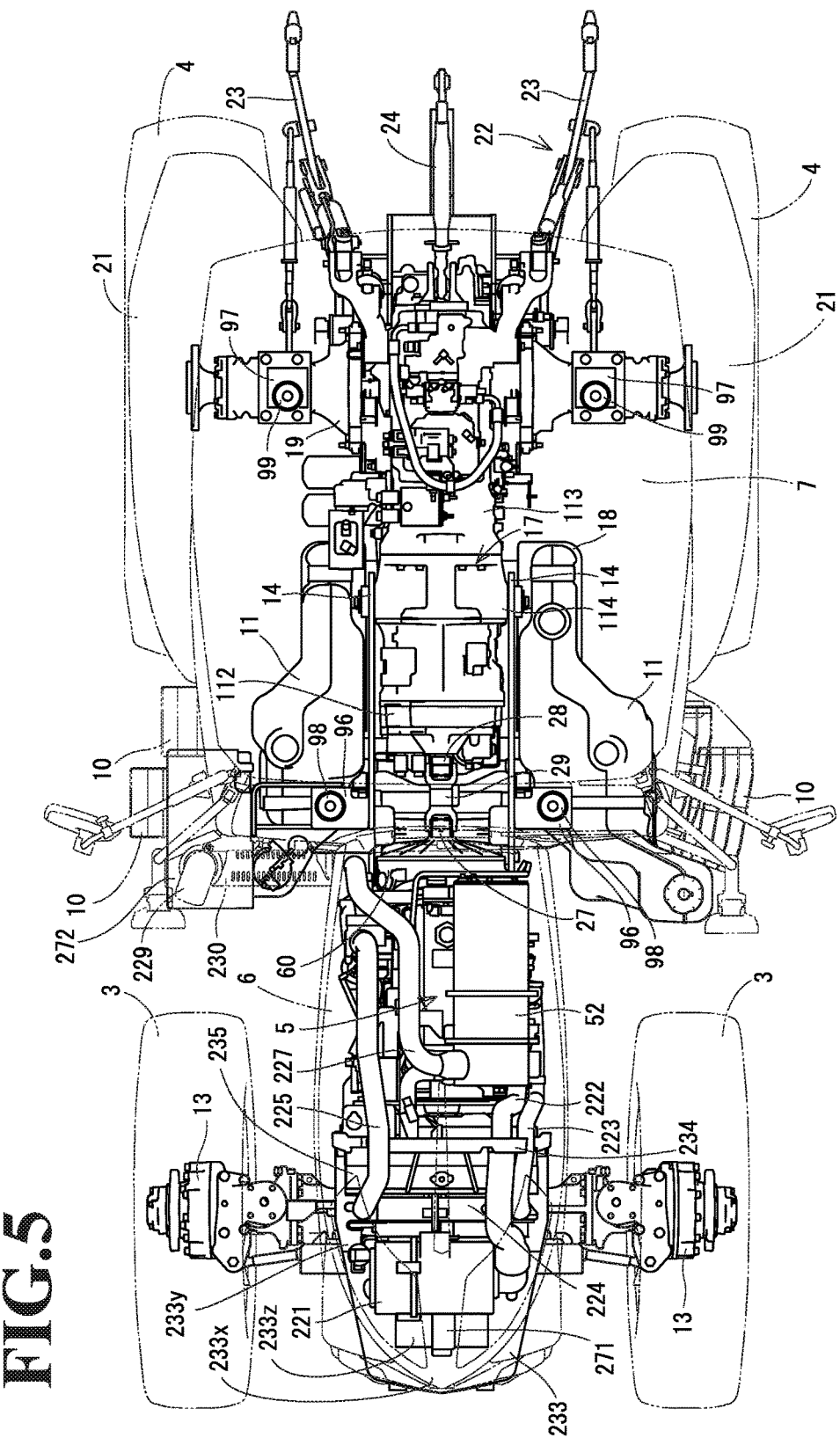
FIG. 5 is a plan view of the traveling body of the work vehicle.
Figure 6:
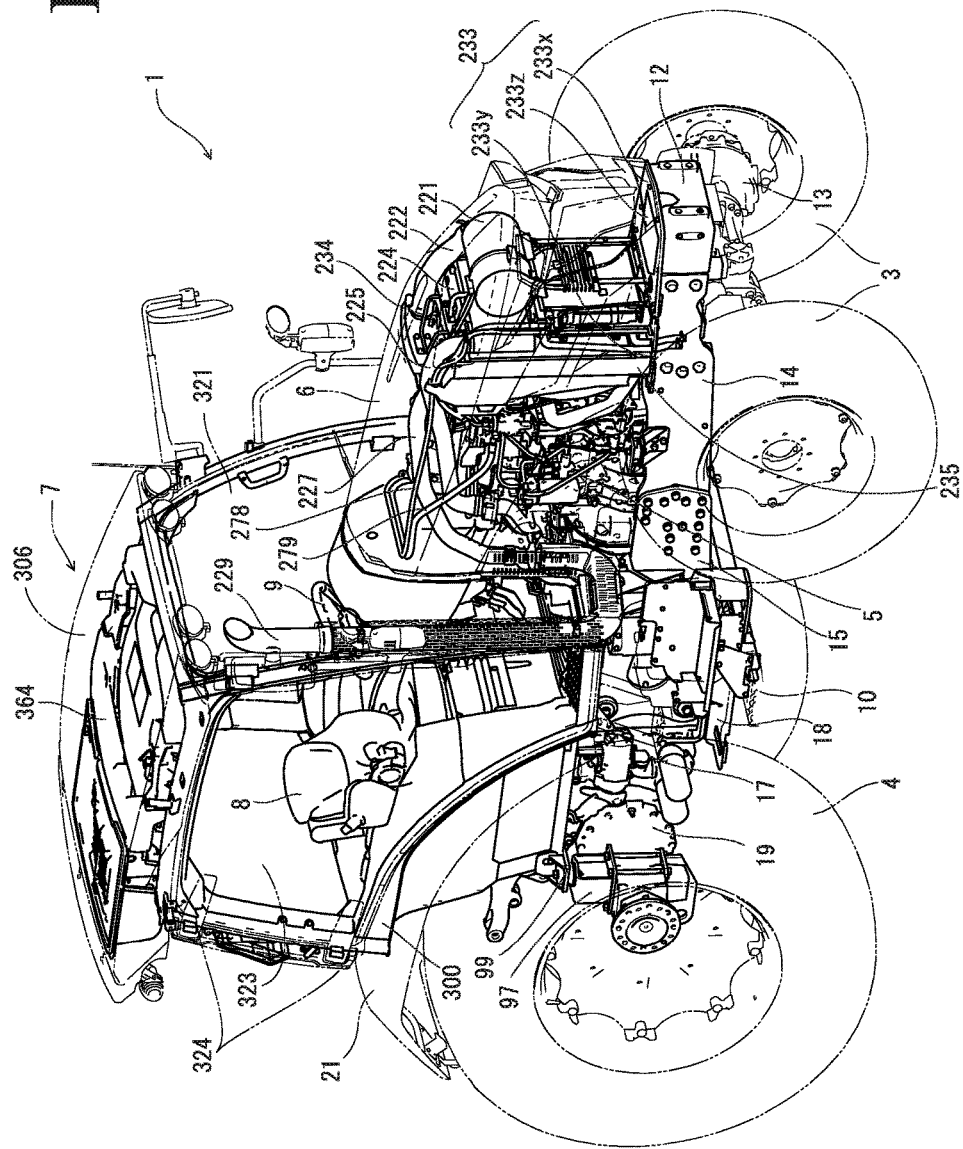
FIG. 6 is a front perspective view of the work vehicle.

Hereinafter, an embodiment of the present invention will be described with reference to the drawings. First, a configuration of a tractor 1 according to the embodiment will be described with reference to FIGS. 1 to 10. The tractor 1 is a work vehicle. A traveling body 2 of the tractor 1 according to this embodiment is supported by traveling sections, which are a pair of left and right front wheels 3 and a pair of left and right rear wheels 4 in this embodiment. The rear wheels 4 and the front wheels 3 are driven by a power source mounted on the front section of the traveling body 2. The power source is the common rail diesel engine 5 (hereinafter, simply referred to as the engine) in this embodiment. The tractor 1 travels forward and backward by driving the rear wheels 4 and the front wheels 3. The engine 5 is covered with a hood 6. A cabin 7 is provided on the upper surface of the traveling body 2. An operator's seat 8 and a steering wheel (round steering wheel) 9 are located inside the cabin 7. The steering wheel 9 is steered to move the steering direction of the front wheels 3 to left and right. A step 10 is provided on the lower section outside the cabin 7. The step 10 is used by an operator to get on and off. The fuel tank 11, which supplies fuel to the engine 5, is provided below the bottom portion of the cabin 7.

The traveling body 2 includes the engine frames (front frames) 14, which include a front bumper (frame coupling member) 12 and front axle cases 13, and left and right body frames (rear frames) 15. The left and right body frames 15 are detachably secured to the rear portions of the engine frames 14. A front axle 16 rotationally projects outward from the left side of the left front axle case 13 and from the right side of the right front axle case 13. The front wheels 3 are secured to the left side of the left front axle case 13 and the right side of the right front axle case 13 via the front axle 16. A transmission case 17 is coupled to the rear portion of the body frame 15. The transmission case 17 changes speed of rotational power from the engine 5 as required and transmits the rotational power to the four front and rear wheels 3, 3, 4, 4. A tank frame 18 is bolted to the left and right body frames 15 and the bottom surface of the transmission case 17. The tank frame 18 is a rectangular frame plate as viewed from the bottom and bulges outward in the left and right direction. The fuel tank 11 of this embodiment is separated into two left and right parts. The left and right parts of the fuel tank 11 are distributed on the upper surface of the left and right bulging sections of the tank frame 18. Left and right rear axle cases 19 are mounted on the left and right external side surfaces of the transmission case 17 to project outward. Left and right rear axles 20 are rotationally inserted in the left and right rear axle cases 19. The rear wheels 4 are secured to the transmission case 17 via the rear axles 20. The upper sections of the left and right rear wheels 4 are covered with left and right rear fenders 21.

A hydraulic lifting and lowering mechanism 22 is detachably secured to, for example, the rear upper surface of the transmission case 17. The hydraulic lifting and lowering mechanism 22 lifts and lowers a farm implement such as a rotary tiller. The farm implement, such as a rotary tiller, is coupled to the rear portion of the transmission case 17 via a three point link mechanism including a pair of left and right lower links 23 and a top link 24. A power take-off (PTO) shaft 25 projects rearward from the rear side of the transmission case 17. The PTO shaft 25 transmits PTO drive power to the farm implement, such as a rotary tiller.

The flywheel 61 is directly coupled to the engine output shaft 53, which projects rearward from the rear side of the engine 5. A main drive axle 27 and a main transmission input shaft 28 are coupled with each other via a power transmission shaft 29. The main drive axle 27 projects rearward from the flywheel 61. The main transmission input shaft 28 projects forward from the front side of the transmission case 17. The power transmission shaft 29 includes universal couplings on both ends. A hydraulic continuously variable transmission, a steering reverser, a traveling sub-transmission gear mechanism, and a rear wheel differential gear mechanism are located in the transmission case 17. Rotational power of the engine 5 is transmitted through the main drive axle 27 and the power transmission shaft 29 to the main transmission input shaft 28 in the transmission case 17. The rotational speed of the rotational power is changed by the hydraulic continuously variable transmission and the traveling sub-transmission gear mechanism. The speed-changed power is transmitted to the left and right rear wheels 4 via the rear wheel differential gear mechanism.

Front wheel output shafts 30 project forward from the lower part of the front surface of the transmission case 17. A front wheel transmission shaft (not shown) projects rearward from each front axle case 13, which embeds a front wheel differential gear mechanism (not shown). The front wheel transmission shafts are coupled to the front wheel output shafts 30 via front wheel drive shafts 31. The speed-changed power changed by the hydraulic continuously variable transmission and the traveling sub-transmission gear mechanism in the transmission case 17 is transmitted from the front wheel output shafts 30, the front wheel drive shafts 31, and the front wheel transmission shafts via the front wheel differential gear mechanisms in the front axle cases 13 to the left and right front wheels 3.

The transmission case 17 includes a front transmission case 112, a rear transmission case 113, and an intermediate case 114. The front transmission case 112 includes, for example, the main transmission-shift input shaft 28. The rear transmission case 113 includes, for example, the rear axle cases 19. The intermediate case 114 couples the front end of the rear transmission case 113 to the rear end of the front transmission case 112. The rear end portions of the left and right body frames 15 are coupled to the left and right side surfaces of the intermediate case 114 via left and right upper and lower machine body coupling shafts 115, 116. That is, rear end portions of the left and right body frames 15 are coupled to the left and right side surfaces of the intermediate case 114 with the two upper machine body coupling shafts 115 and the two lower machine body coupling shafts 116 so that the body frames 15 and the transmission case 17 are integrally connected and form the rear portion of the traveling body 2. The traveling body 2 is configured such that, for example, the front transmission case 112 or the power transmission shaft 29 is located between the left and right body frames 15 to protect, for example, the front transmission case 112.

Furthermore, left and right front supports 96 support the front side of the cabin 7, and left and right rear supports 97 support the rear portion of the cabin 7. The front supports 96 are bolted to the front end portions on the machine outer surfaces of the left and right body frames 15. The front bottom portion of the cabin 7 is supported on the upper surfaces of the front supports 96 via rubber vibration isolators 98 while preventing vibration. The left and right rear axle cases 19 extend horizontally in the left and right direction. Each of the rear support 97 is bolted to a middle portion of the upper surface of the associated one of the left and right rear axle cases 19 in the left and right width direction. The rear bottom portion of the cabin 7 is supported on the upper surfaces of the rear supports 97 via rubber vibration isolators 99 while preventing vibration. Thus, the traveling body 2 supports the cabin 7 via the plurality of rubber vibration isolators 98, 99 while preventing vibration.

The rear axle cases 19 have a cross-sectional end surface that is approximately a rectangular tube. The rear supports 97 are located on the upper surfaces of the rear axle cases 19 to sandwich the rear axle cases 19. Anti-vibration brackets 101 are located on the lower surface of the rear axle cases 19. The rear supports 97 and the anti-vibration brackets 101 are fastened with bolts 102. The ends of an anti-vibration rod 103 with an extendable turnbuckle are coupled to the intermediate portion of each lower link 23, which extends in the fore-and-aft direction, and the associated anti-vibration bracket 101 to prevent the lower link 23 from swinging in the left and right direction.

The cabin 7, which covers the operator's seat 8 on the traveling body 2, includes a cabin frame 300. The cabin frame 300 constitutes the framework of the cabin 7. The cabin frame 300 is approximately in the shape of a box frame and includes a pair of left and right front pillars 301, a pair of left and right rear pillars 302, a front beam 303, a rear beam 304, and left and right side beams 305. The front pillars 301 are located in front of the operator's seat 8. The rear pillars 302 are located behind the operator's seat 8. The front beam 303 couples the upper ends of the front pillars 301 to each other. The rear beam 304 couples the upper ends of the rear pillars 302 to each other. The side beams 305 each couple the upper end of the corresponding one of the front pillars 301 to the upper end of the corresponding one of the rear pillars 302. The front pillars 301 and the rear pillars 302 are arranged in the fore-and-aft direction. A roof 306 is detachably secured to the upper end of the cabin frame 300, that is, to the rectangular frame formed by the front beam 303, the rear beam 304, and the left and right side beams 305.

Left and right bottom frames 311 extend in the fore-and-aft direction with their ends in the longitudinal direction coupled to the lower ends of the front pillars 301 and the lower ends of the rear pillars 302. A floorboard 40 is disposed in a tensioned state on the upper side of the left and right bottom frames 311, a dashboard 33 stands upright at the front end of the floorboard 40, and a steering wheel 9 is mounted to the rear side of the dashboard 33 via a steering column 32. A brake pedal 35, for example, is disposed on the upper side of the front section of the floorboard 40, and the operator's seat 8 is mounted on the upper side of the rear section of the floorboard 40.

An air conditioner 364 is accommodated in a rear portion of the roof 306, which is mounted on the upper end of the cabin frame 300. The air conditioner 364 controls the air conditioning in the cabin 7. The air conditioner 364 adjusts the air conditioning (room temperature) in the cabin 7 by heating utilizing the coolant of the engine 5 and by cooling utilizing, for example, an engine-driven compressor 211, a condenser 275, and an evaporator. Coolant hoses 280, which are coupled to the air conditioner 364, extend along the cabin frame 300 toward the lower end at the front.

As is clear from the location arrangement of a front windshield 321, a rear windshield 322, and left and right side doors 323, the pillars 301, 302 and the beams 303, 304, 305 are located at side edges of the cabin 7 (cabin frame 300). That is, large windows can be provided on the front, rear, left, and right sides of the cabin frame 300. In this embodiment, the front windshield 321, the rear windshield 322, and left and right side doors 323, which are made of transparent glass, are located on the front, rear, left, and right sides of the cabin frame 300. As a result, large views in front of, behind, and to the left and right of the operator are ensured while ensuring the rigidity of the cabin frame 300.

As illustrated in FIGS. 11 to 14, the diesel engine 5 includes a cylinder block 54. The cylinder block 54 includes an engine output shaft 53 and pistons, and a cylinder head 55 is mounted on the cylinder block 54. An intake manifold 56 is located on the right side surface of the cylinder head 55 and an exhaust manifold 57 is located on the left side surface of the cylinder head 55. That is, the intake manifold 56 and the exhaust manifold 57 are distributed on both side surfaces of the engine 5. The side surfaces extend along the engine output shaft 53. In the diesel engine 5, a cooling fan 59 is located at the front of the cylinder block 54, and a flywheel 61 is located at the rear of the cylinder block 54. That is, the flywheel 61 and the cooling fan 59 are distributed on both sides intersecting the engine output shaft 53 in the engine 5.

The flywheel 61 is housed in a flywheel housing 60. The flywheel 61 is supported on the rear end of the output shaft 53. Motive power of the diesel engine 5 is transmitted to the operation parts of the work vehicle via the output shaft 53. An engine starter 69 is provided in the flywheel housing 60. A pinion gear of the engine starter 69 is engaged with a ring gear of the flywheel 61. When starting the diesel engine 5, the ring gear of the flywheel 61 is rotated by rotational force of the starter 69 so that the output shaft 53 starts rotating (or cranked). Engine mount fittings 60a are provided on the upper surface of the flywheel housing 60. A rear engine mount 240 can be bolted to the engine mount fittings 60a. The rear engine mount 240 includes an anti-vibration rubber.

In the diesel engine 5, an oil pan 62 is disposed on the lower surface of the cylinder block 54. Lubricant in the oil pan 62 is supplied to lubrication parts of the diesel engine 5 via an oil filter 63. The oil filter 63 is located on the right side surface of the cylinder block 54. The oil filter 63 is secured to the right side surface of the cylinder block 54 via an oil filter support member 88. One side (left side) of the oil filter support member 88 is coupled to the coupling port (oil filter mounting position) that communicates with an oil passage provided in the cylinder block 54. The oil filter 63 is secured to the upper section of the other side (right side) of the oil filter support member 88.

When the oil filter 63 is secured to the cylinder block 54, the oil filter support member 88 is provided in between. Thus, the oil filter 63 is arranged at a position higher than the original mounting position in the cylinder block 54. This prevents the oil filter 63 from interfering with the traveling body 2 even if the engine 5 is mounted on the traveling body 2 having a narrow lateral width. That is, the oil filter 63 is located above the engine frame 14 due to the existence of the oil filter support member 88. The right side engine cover 232 is shaped to have a cutout at its bottom edge so that the front of the oil filter 63 projects outwardly of the right side engine cover 232. Thus, the oil filter 63 is accessible and can be replaced easily.

The oil filter support member 88 includes an oil passage (not shown) formed in the oil filter support member 88. Lubricant that is drawn in from the oil pan 62 by the oil pump (not shown) is received through the oil passage (not shown) in the cylinder block 54 and supplied to the oil filter 63. The lubricant that has been filtered by the oil filter 63 is circulated to the cylinder block 54 and supplied to the lubrication parts of the engine 5. At this time, some of the lubricant filtered by the oil filter 63 is supplied to the external component through the lubricant outlet 88b via a lubricant supply pipe 89. Since part of a lubricant passage from the oil filter 63 to the external component is formed by the oil passage in the oil filter support member 88, the oil filter support member 88 serves multiple functions. This configuration reduces the number of components of the engine apparatus.

The diesel engine 5 includes, on the right side, a fuel supply pump 64, a cylindrical common rail 66, a fuel filter 67, and an exhaust gas recirculation (EGR) apparatus 75. The fuel supply pump 64 supplies fuel. The common rail 66 feeds fuel under pressure to injectors. The fuel filter 67 removes foreign matter from fuel supplied from the fuel tank 11. The EGR apparatus 75 is coupled to the intake manifold 56. Fuel in the fuel tank 11 is supplied to the fuel supply pump 64 via the fuel filter 67 and then is fed under pressure from the fuel supply pump 64 to the common rail 66. Thus, pressurized fuel is stored in the common rail 66, and therefore the pressurized fuel in the common rail 66 is injected from the injectors into the cylinders of the engine 5 by controlling opening and closing of the fuel injection valves of the injectors.

A coolant pump 71 for coolant lubrication is located in front of the cylinder head 55 (close to the cooling fan 59) to be coaxial with a fan axis of the cooling fan 59. The coolant pump 71 is configured to be driven by rotation of the engine output shaft 53 together with the cooling fan 59. The work vehicle includes a radiator 235. The coolant in the radiator 235 is supplied to the coolant pump 71 via a thermostat case 70. The thermostat case 70 is located above the coolant pump 71. When the coolant pump 71 is driven, the coolant is supplied to a water-cooling jacket (not shown) formed in the cylinder head 55 and the cylinder block 54 to cool the diesel engine 5. The coolant that has contributed to cooling of the diesel engine 5 is returned to the radiator 235. Due to the positional relationship, the coolant pump 71 opposes the cooling fan 59. Thus, the cool air from the cooling fan 59 contacts the coolant pump 71. When the coolant pump 71 is driven, the coolant in the radiator 235 is supplied to the cylinder block 54 and the cylinder head 55 to cool the diesel engine 5.

An engine mount fitting 74 is provided on each of left and right side surfaces of the cylinder block 54. A front engine mount 238 can be bolted to each engine mount fitting 74. The front engine mount 238 includes an anti-vibration rubber. In this embodiment, the engine mount fittings 74 of the cylinder block 54 are each bolted to the associated engine frame 14 via the associated engine mount 238 such that the cylinder block 54 is sandwiched between the left and right pair of engine frames 14 in the work vehicle. With this configuration, the engine frames 14 of the work vehicle support the front part of the diesel engine 5.

An intake connecting pipe 76 is coupled to the right side inlet portion of the intake manifold 56. Fresh air (external air) is supplied to the intake connecting pipe 76. An intake throttle member 77 is provided at the intake-air inlet side (upstream side) of the intake connecting pipe 76. The recirculation exhaust gas tube 78 is coupled to the top inlet portion of the intake manifold 56 via an EGR valve member 79. Some of exhaust gas (EGR gas) of the diesel engine 5 is supplied to the recirculation exhaust gas tube 78. In the intake manifold 56, the intake-air outlet side (downstream side) of the intake connecting pipe 76 and the coupling portion (rear portion) between the intake manifold 56 and an EGR valve member 79 configure a body case of an exhaust gas recirculation (EGR) apparatus 75. That is, the intake-air introduction side of the intake manifold 56 configures the EGR body case.

The EGR apparatus (exhaust gas recirculation apparatus) 75 is located mainly on the right side of the diesel engine 5, and more specifically, rightward of the cylinder head 55 and mixes some of the exhaust gas of the diesel engine 5 (EGR gas) with fresh air to supply the mixture to the intake manifold 56. The EGR device (exhaust-gas recirculation device) 75 includes the EGR body case configured by part of the intake manifold 56, the intake connecting pipe 76, which communicates with the intake manifold 56, the intake throttle member 77, which is located in the intake connecting pipe 76, the recirculation exhaust gas tube 78, which is coupled to the exhaust manifold 57 via the EGR cooler 80, and the EGR valve member 79, which connects the intake manifold 56 to the recirculation exhaust gas tube 78. The EGR cooler 80 and the EGR apparatus 75, which are distributed on both sides of the engine 5, are coupled to each other by the recirculation exhaust gas pipe 78. The recirculation exhaust gas pipe 78 is a circulation passage that detours around the rear surface of the engine 5 (close to the flywheel 61).

The intake throttle member 77 is coupled to the intake-air introduction side of the intake manifold 56 via the intake connecting pipe 76. The outlet of the recirculation exhaust gas pipe 78 is also coupled to the intake-air introduction side of the intake manifold 56 via the EGR valve member 79. The inlet of the recirculation exhaust gas pipe 78 is coupled to the exhaust manifold 57 via the EGR cooler 80. The amount of EGR gas supplied to the intake-air introduction side of the intake manifold 56 is adjusted by adjusting the opening portion degree of the EGR valve in the EGR valve member 79.

With the above-described configuration, while fresh air is supplied to the intake-air introduction side of the intake manifold 56 via the intake connecting pipe 76 and the intake throttle member 77, the EGR gas is supplied to the intake-air introduction side of the intake manifold 56 from the exhaust manifold 57. The fresh air from the outside and the EGR gas from the exhaust manifold 57 are mixed in the intake-air introduction side of the intake manifold 56. Some of the exhaust gas discharged to the exhaust manifold 57 from the diesel engine 5 is circulated from the intake manifold 56 to the diesel engine 5. This reduces the highest combustion temperature during high load operation and the discharge amount of NOx (nitrogen oxides) from the diesel engine 5.

The engine 5 includes a turbocharger 81, which compresses air using exhaust gas from the exhaust manifold 57. The turbocharger 81 includes a compressor case 83, which embeds a blower wheel. The intake-air introduction side of the compressor case 83 is coupled to the intake-air discharge side of the air cleaner 221 via the supply pipe 222, and the intake-air discharge side of the compressor case 83 is coupled to an upstream relay pipe 223. The turbocharger 81 includes the turbine case 82, which embeds the turbine wheel. The exhaust introduction side of the turbine case 82 is coupled to the exhaust gas outlet of the exhaust manifold 57, and the intake-air discharge side of the turbine case 82 is coupled to the exhaust gas inlet of the after-treatment device, which is the exhaust gas purification device 52 in this embodiment.

The diesel engine 5 includes a continuously regenerating exhaust gas purification device (diesel particulate filter (DPF)) 52. The exhaust gas purification device 52 includes the exhaust gas inlet pipe 161 on the case outer circumferential surface at one end (rear end) of the exhaust gas purification device 52 in the longitudinal direction. The exhaust gas inlet pipe 161 communicates with the exhaust gas discharge side of the turbine case 82 in the turbocharger 81 via the exhaust connecting pipe 84. In the exhaust gas purification device 52, the exhaust gas inlet pipe 161 is open downward to the left, and the exhaust gas outlet pipe 162 is open upward to the right.

The exhaust gas purification device 52 is coupled to the exhaust connecting pipe 84, which communicates with the turbocharger 81. The exhaust connecting pipe 84 is bolted at its lower end to the exhaust manifold 57 and thus is configured to be a support for the exhaust gas purification device 52 (DPF support). The exhaust introduction side of the exhaust connecting pipe 85 is bolted to the exhaust discharge side of the turbine case 82 of the turbocharger 81, and the exhaust discharge side of the exhaust connecting pipe 84 is fastened to the exhaust gas inlet pipe 161 of the exhaust gas purification device 52. Thus, the exhaust manifold 57 and the exhaust gas purification device 52 communicate with each other via the turbine case 82 of the turbocharger 81 and the exhaust connecting pipe 84.

The engine 5 includes a housing support that supports and secures the exhaust gas purification device 52. The housing support includes an outlet side bracket 177 and an inlet side bracket 176. The outlet side bracket 177 and the inlet side bracket 176 are distributed and stand upright on the front and the rear of the cylinder head 55 of the engine 5 and on both sides of the output shaft 53. The inlet side bracket 176 is located at the rear of the engine 5 and supports the exhaust introduction side of the exhaust gas purification device 52 together with the exhaust connecting pipe 84. The outlet side bracket 177 is located at the front of the engine 5 and supports the exhaust discharge side of the exhaust gas purification device 52.

The inlet side bracket 176 is located at the rear of the cylinder head 55 (above the flywheel housing 60). The inlet side bracket 176 includes a securing bracket (first bracket) 178. The lower edge of the securing bracket 178 is bolted to the rear surface of the cylinder head 55. A relay bracket 179 is bolted to the upper end of the securing bracket 178. The proximal end of an extended bracket (third bracket) 180 is bolted to the middle of the relay bracket (second bracket) 179. The distal end of the extended bracket 180 is fastened to the inlet side lid (upstream lid) 169 of the gas purification housing 168 with bolts and nuts.

The outlet side bracket 177 is located at the front of the cylinder head 55 (close to the cooling fan 59). The outlet side bracket 177 of this embodiment is separated into an outlet side first bracket (fourth bracket) 181 and an outlet side second bracket (fifth bracket) 182. The outlet side first bracket 181 is an approximately L-shaped member that extends upward from the right side of the cylinder head 55 and bends to the left side above the cylinder head 55. The outlet side second bracket 182 is an approximately L-shaped member that extends upward from the left side of the cylinder head 55 and bends to the right side above the cylinder head 55. Thus, the outlet side bracket 177 has an approximately inverted U shape in front of the cylinder head 55 and is secured to extend over the cylinder head 55 at a position rearward of the thermostat case 70.

As is clear from the above description, the exhaust gas purification device 52 of this embodiment is detachably coupled to the cylinder head 55, the intake manifold 56, and the exhaust manifold 57 of the engine 1 via the housing support above the diesel engine 4. The housing support includes the exhaust connecting pipe 84, the inlet side bracket 176, and the outlet side bracket 177. The inlet side bracket 176 and the exhaust connecting pipe 84, which are located upstream in the exhaust gas moving direction (exhaust introduction side), are distributed to the cylinder head 55 and the exhaust manifold 57. The outlet side bracket 177 (the outlet side first bracket 181 and the outlet side second bracket 182), which is located downstream in the exhaust gas moving direction (exhaust discharge side), is distributed to the cylinder head 55 and the intake manifold 56. Thus, the exhaust gas purification device 52 is supported at four points.

The securing bracket 178 also includes a side component coupling portion 178c. The side component coupling portion 178c is located on the right side of the upper end portion and includes bolt holes. A component securing bracket (exhaust pipe securing bracket) 210 for securing an external component such as an exhaust pipe 227 is bolted to the side component coupling portion 178c. The proximal end of the outlet side first bracket 181 includes, for example, a proximal end component coupling portion 181b. The proximal end component coupling portion 181b secures a component securing bracket (compressor securing bracket) 212 for securing an external component such as the air conditioner compressor 211. The outlet side first bracket 181 includes a bent portion (middle portion). The upper surface of the bent portion 181c includes, for example, a middle component coupling portion 181d. The middle component coupling portion 181d secures a component securing bracket (warm water pipe securing bracket) 208 for securing external components such as air conditioner warm water pipes 203, 204. The bent portion (middle portion) of the outlet side second bracket 182 includes a rear component coupling portion 182d. The rear component coupling portion 182d secures a component fixture (shield securing bracket) 207 for supporting the upstream relay pipe 223 and a shield 206.

Figure 13:
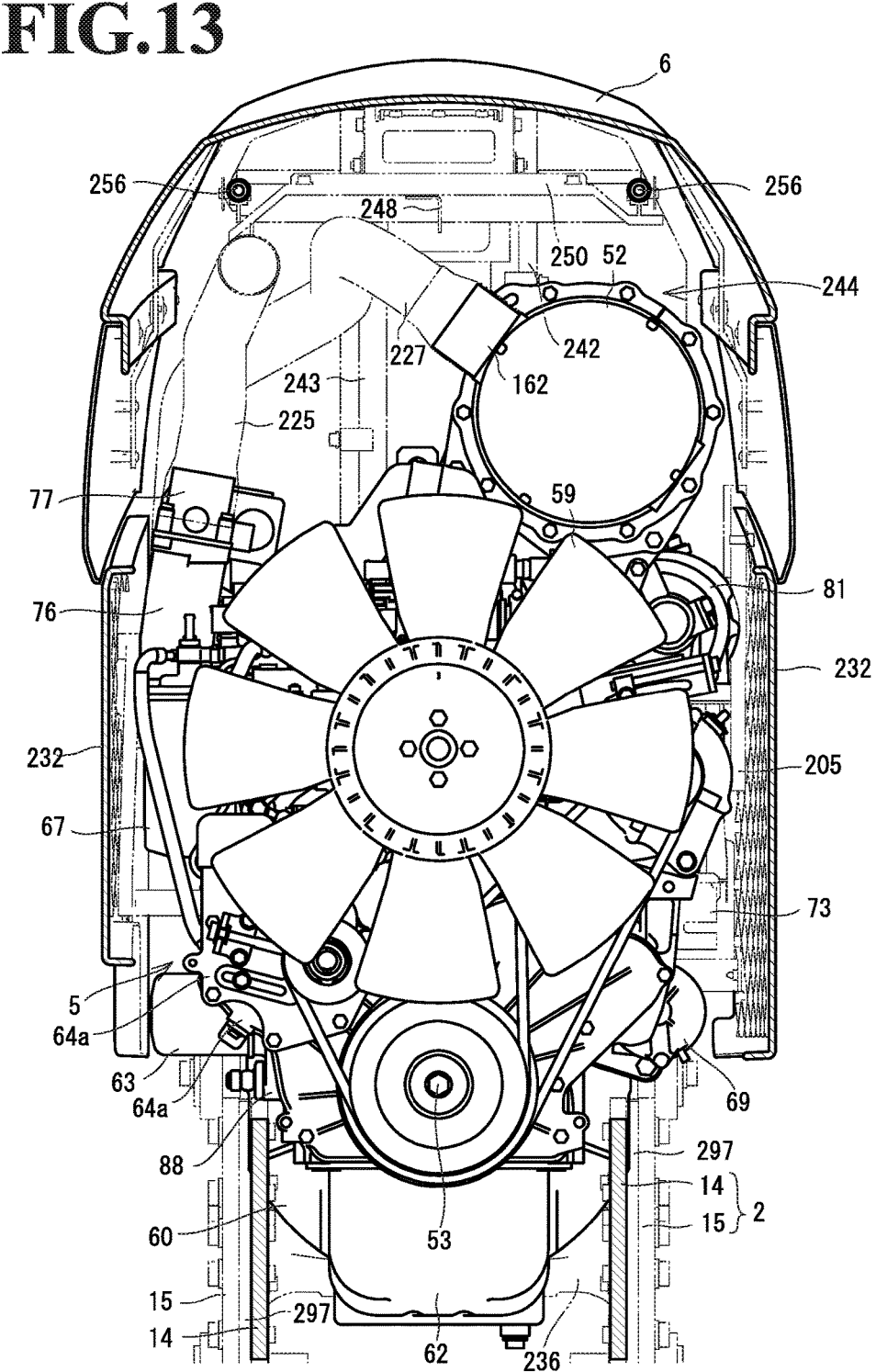
FIG. 13 is a cross-sectional view of the work vehicle illustrating the configuration in the engine compartment as viewed from the front.
Figure 14:
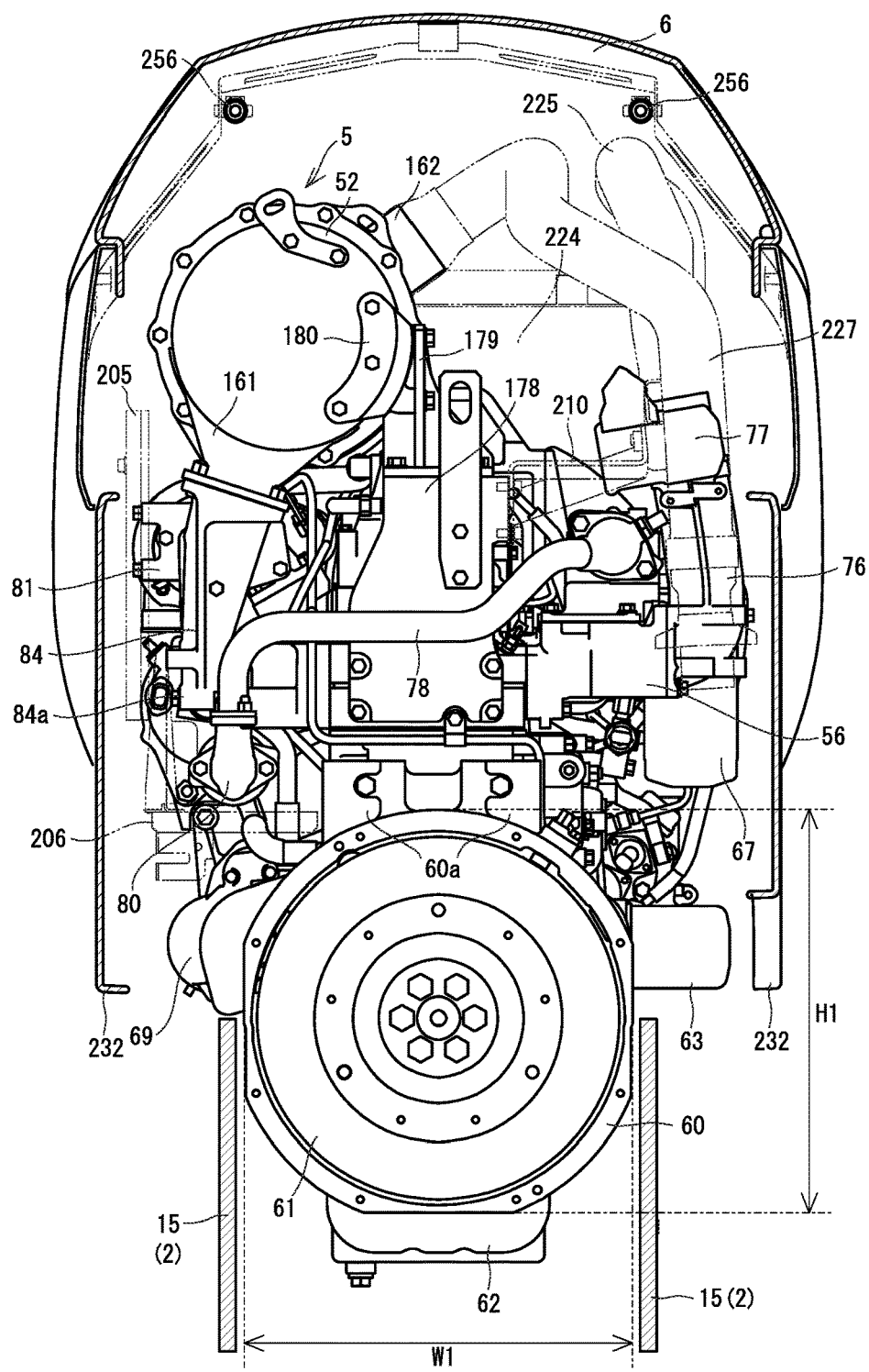
FIG. 14 is a cross-sectional view of the work vehicle illustrating the configuration in the engine compartment as viewed from the rear.

As illustrated in FIGS. 13 and 14, the hood 6 of the tractor 1 has an inverted U-shaped cross-section. Since the left and right corners of the hood 6 are chamfered to incline diagonally and outwardly downward to the left and right as viewed from the front, the forward view of the operator seated in the operator's seat 8, in particular, the view ahead of the left and right of the hood 6 is improved. While the exhaust gas purification device (DPF) 52 and the exhaust connecting pipe 84 oppose the left side inner wall of the hood 6, the intake connecting pipe 76 opposes the right side inner wall of the hood 6. While the exhaust connecting pipe 84 is located at a position facing the left side engine cover 232, the intake connecting pipe 76 is located at a position facing the right side engine cover 232.

The intake connecting pipe 76, which includes a hollow portion and supplies fresh air to the intake manifold 56, is configured to be tilted toward the cylinder head 55 as the intake connecting pipe 76 extends upward. The intake connecting pipe 76 extends upward from the intake manifold 56. That is, a fresh air introduction port located at the upper end of the intake connecting pipe 76 is offset with respect to a fresh air discharge port located at the lower end of the intake connecting pipe 76 toward the output shaft 53 of the engine 5 (center position of the engine 5). The intake connecting pipe 76 is arranged to be in conformance with the shape of the hood 6 that narrows upward, and the intake throttle member 77 is located closer to the center position of the hood 6 than the intake connecting pipe 76 between the upper section of the engine 5 and the inner surface of the hood 6. This configuration not only reduces the designed length of the downstream relay pipe 225, which connects a fresh air discharge end of the intercooler 224 to the intake throttle member 77, but also allows the downstream relay pipe 225 to be compactly accommodated in the hood 6, which has an upwardly decreasing lateral width.

The exhaust connecting pipe 84, which includes a hollow portion that supplies exhaust gas from the exhaust manifold 57 to the exhaust gas purification device 52, is configured to be tilted toward the cylinder head 55 as the exhaust connecting pipe 84 extends upward. The exhaust connecting pipe 84 is coupled to the exhaust gas inlet pipe 161 of the exhaust gas purification device 52 to support the exhaust gas purification device 52. That is, the exhaust gas discharge port at the upper end of the exhaust connecting pipe 84 is offset toward the output shaft 53 of the engine 5 (center position of the engine 5) with respect to the coupling support portion 84a at the lower end of the exhaust connecting pipe 84. The coupling support portion 84a is coupled to the exhaust manifold 57 at the lower end. The exhaust gas inlet pipe 161 of the exhaust gas purification device 52 is tilted toward the outer side of the engine 5 (toward the inner wall of the hood 6) as the exhaust gas inlet pipe 161 extends downward (toward an inlet flange).

The exhaust gas purification device 52 and the exhaust connecting pipe 84 are arranged to be in conformance with the shape of the hood 6 that narrows upward, and the exhaust gas purification device 52 is supported at a position closer to the center of the engine 5 between the upper section of the engine 5 and the inner surface of the hood 6. Thus, the exhaust gas purification device 52 is compactly accommodated in the hood 6, which has an upwardly decreasing lateral width. Supporting the exhaust gas purification device 52, which is a heavy object, at a position closer to the center of gravity of the engine 5 inhibits increase in, for example, vibration and noise of the engine 5 caused by mounting the exhaust gas purification device 52. This configuration also reduces influence on the shape of the hood 6 caused by mounting the exhaust gas purification device 52 on the engine 5 and prevents the shape of the hood 6 from becoming complicated.

Figure 15:
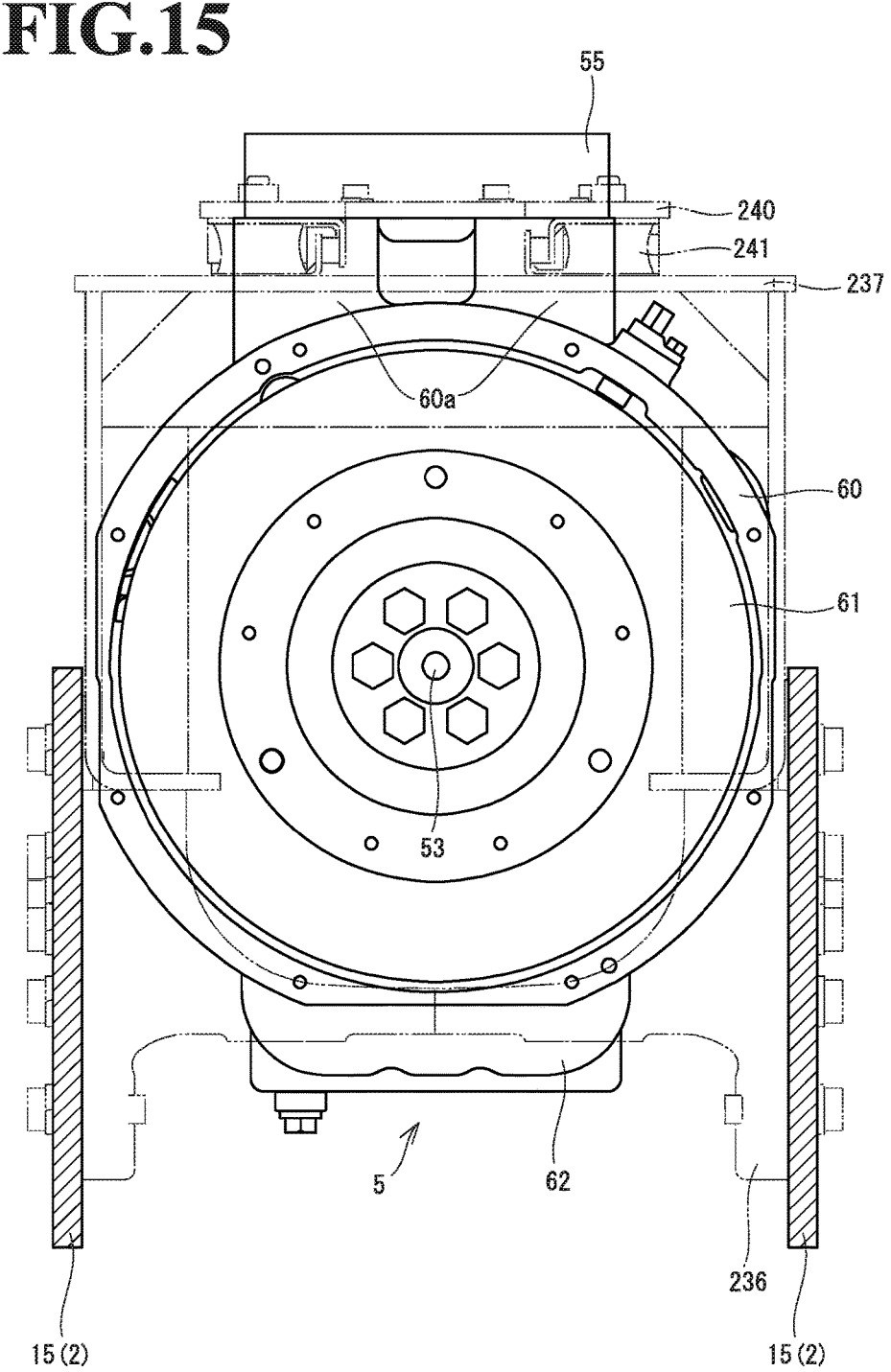
FIG. 15 is a partially enlarged view of the work vehicle illustrating the relationship between the traveling body and the flywheel housing.

As illustrated in FIGS. 14 and 15, the width W1 of the flywheel housing 60, which covers the flywheel 61 is narrower than the height H1. The flywheel 61 is located on the end surface that intersects the core of the engine output shaft 53. Since the width of the flywheel housing 60 is narrow, the engine 5 can be mounted on the traveling body 2, which has a narrow lateral width, without interference by the flywheel housing 60. In the traveling body 2, each body engine frame 15 is provided on the outer side of the associated engine frame 14 via the associated spacer 293. Thus, the width between the left and right body engine frames 15 is wider than the width between the left and right engine frames 14. The flywheel housing 61 is located at the rear of the engine 5. The main transmission input shaft 28 of the transmission case 17, which is coupled to the body frames 15, is coupled to the flywheel 61. Thus, the flywheel housing 61, which has the greatest lateral width in the engine 5, is sufficiently located between the body frames 15. This prevents the flywheel housing 61 from colliding with the traveling body 2, which has a different vibration system and thus prevents failure or breakage of the engine 5.

The flywheel housing 61 has an outline in which the left and right parts of a circle are cut off and in which the seat-like engine mount fittings 60a project from the upper section. The engine mount fittings 60a at the upper section are coupled to the traveling body 2 via the engine mount 240 at the rear portion. The flywheel housing 61 is not only mountable on the traveling body 2 having a narrow width, but also includes the seat-like engine mount fittings 60a that are capable of being coupled to the traveling body 2. Thus, coupling the flywheel housing 61 having a high rigidity to the traveling body 2 compensates for the rigidity achieved by the support structure of the engine 5.

More particularly, the inverted U-shaped engine support frame 237 is provided above the support beam frame 236, which is held between the pair of left and right body frames 15. The flywheel housing 61 and the engine support beam frame 237 are arranged next to each other in the fore-and-aft direction. While the rear section of the engine mount 238 is coupled to the upper surface of the engine support frame 237 via the anti-vibration rubbers 239, the front section of the engine mount 238 is coupled to the upper surface of the engine mount fittings 60a on the flywheel housing 61.

Figure 16:
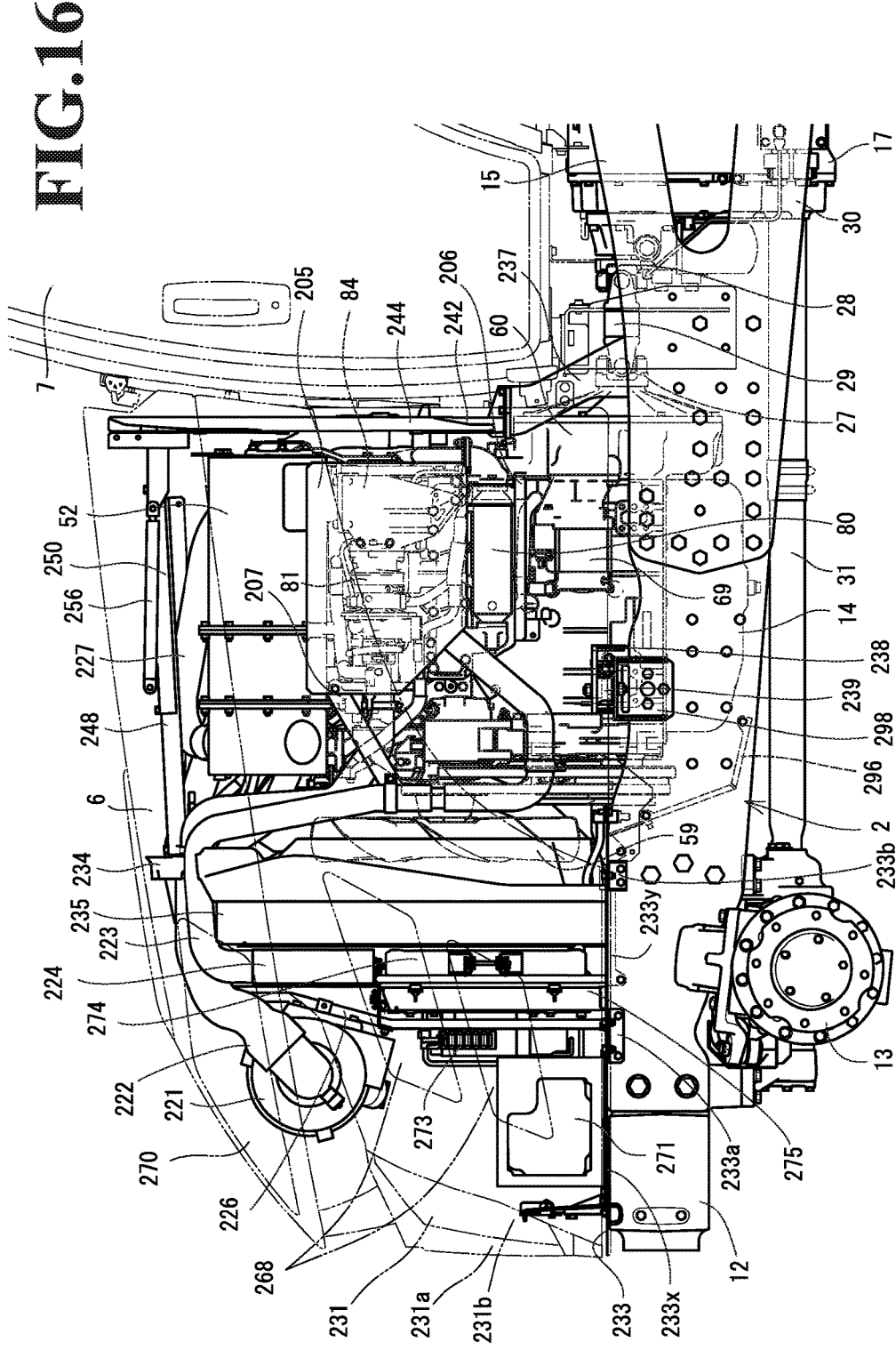
FIG. 16 is a left side enlarged view of the work vehicle illustrating the configuration in the engine compartment.
Figure 17:
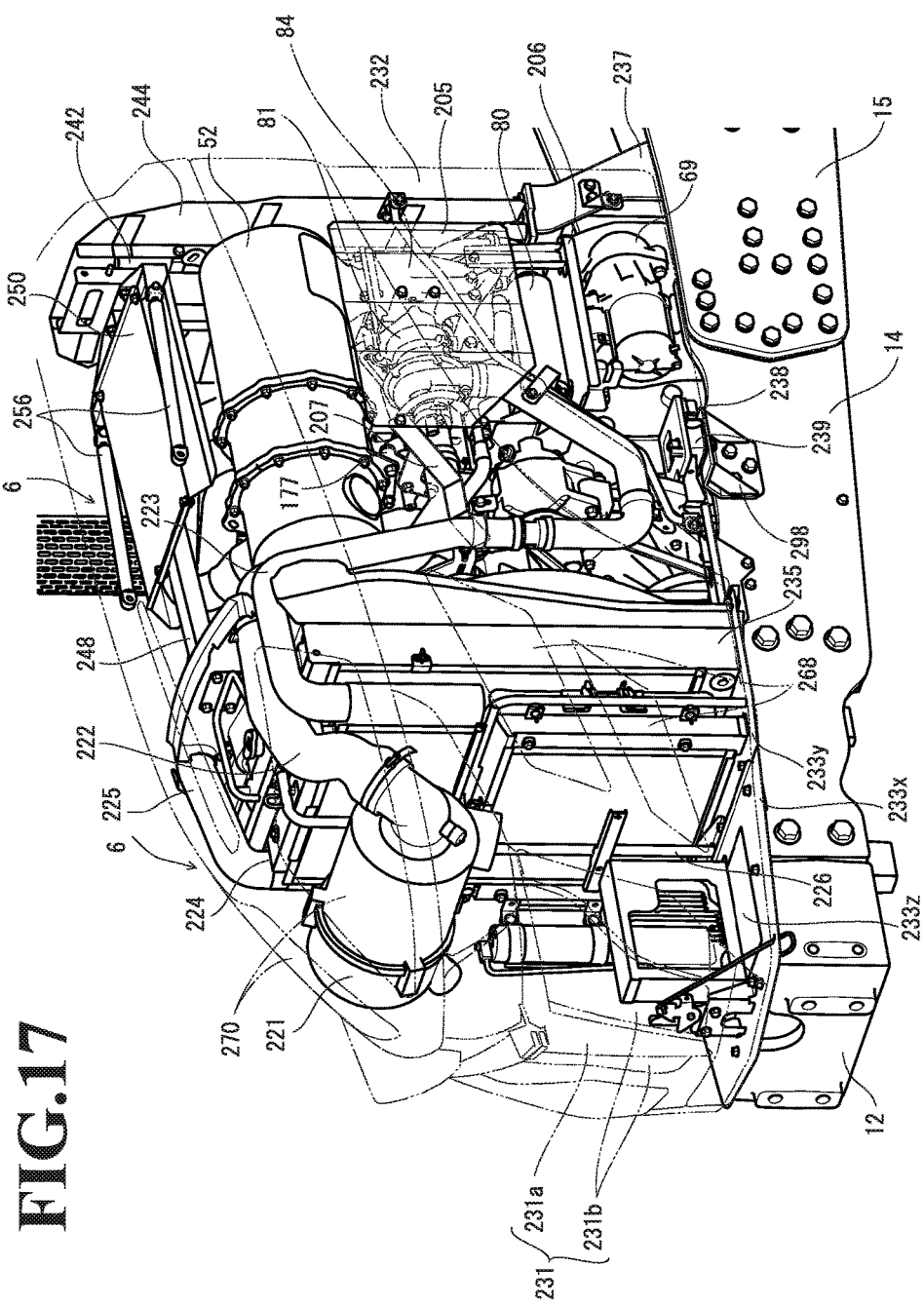
FIG. 17 is a left side enlarged perspective view of the work vehicle illustrating the configuration in the engine compartment.

Next, a configuration of the engine compartment frame including the hood 6 will be described with reference to FIGS. 4 to 10 and FIGS. 13 to 27. First, as illustrated in FIGS. 16 and 17, for example, the hood 6 includes a front grille 231 at the front lower section to cover the front of the engine compartment. The engine covers 232 are formed of perforated plates and are located below the hood 6 on the left and right side to cover the left and right side of the engine compartment. That is, the hood 6 and the engine covers 232 cover the front, the upper section, and the left and right sides of the diesel engine 5.

As illustrated in FIGS. 16 and 17, for example, the hood 6 includes the front grille 231 at the center position on the front surface. The ceiling at the upper section of the hood 6 is shaped to tilt diagonally upward from the front to the rear. The front grille 231 includes a pair of left and right anti-dust screens 231b. The anti-dust screens 231b are secured with a central frame 231a. The hood 6 provides a wide space at the rear section below the ceiling. The hood 6 forms a large space for accommodating the exhaust gas purification device 52 in the engine compartment inside the hood 6. The hood 6 includes opening holes 268 at the front section on the left and right side surfaces. Cooling air is drawn in from both left and right sides of the hood 6 through the pair of left and right opening holes 268. The hood 6 further includes left and right pair of meshed opening holes 270 at the front section of the ceiling. Cooling air is drawn in from the front upper section of the hood 6 through the pair of left and right opening holes 270. The opening holes 268, 270 are covered with meshed anti-dust screens.

As illustrated in FIGS. 16 to 20, for example, the front end inner surfaces of the pair of left and right engine frames (front frames) 14 are coupled to the left and right outer surfaces of the frame coupling member 12. The frame coupling member 12 is formed of a rectangular metal casting. The diesel engine 5 is supported on the engine frames 14, which are held by the frame coupling member 12. A frame bottom plate 233 is held by the upper edges of the left and right engine frames 14 and the upper surface of the front bumper 12 to cover the front end upper sections of the engine frames 14. An undercover 296 is disposed at the rear end of the frame bottom plate 233. The undercover 296 covers the lower front section of the engine 5. The front end of the undercover 296 is coupled to the frame bottom plate 233 and the rear left and right side edges of the undercover 296 are respectively coupled to the left and right engine frames 14. The undercover 296 includes a front portion and a rear portion. The front portion extends from the rear end of the frame bottom plate 233 toward the lower end of the engine frame 14 and the rear portion extends forward below the engine 5.

The lower surface of the frame bottom plate 233 is coupled to the side surfaces of the left and right engine frames 14 via coupling brackets 233a, 233b. The coupling brackets 233a, 233b are located at the front and the rear. The frame bottom plate 233 is divided into two parts at the front and the rear and includes a front bottom plate 233x and a rear bottom plate 233y. A first end of each coupling bracket 233a is coupled to the side surface of the associated one of the pair of left and right engine frames 14. A front section of a second end of each coupling bracket 233a is coupled to the associated one of the left and right edges of the lower surface of the front bottom plate 233x. The front section of the front bottom plate 233x is fastened to the frame coupling member 12. A rear section of the second end of each of the pair of left and right coupling brackets 233a is coupled to the associated one of the left and right edges of the front lower surface of the rear bottom plate 233y. A second end of each of the pair of left and right coupling brackets 233b is coupled to the associated one of the left and right edges of the front lower surface of the rear bottom plate 233y.

The frame bottom plate 233 includes an opening hole 233z in a central region in the left and right direction. The opening hole 233z is located in the front bottom plate 233z of the frame bottom plate 233 and is covered with a meshed anti-dust screen. That is, the hood 6 and the frame bottom plate 233 include, at positions forward of the cooling fan 59 of the engine 5, the opening portions 231b, 233z, 268, 270. When the cooling fan 59 is driven, cooling air is drawn into the engine compartment in the hood 5 through the opening portions 231b, 233z, 268, 270 of the hood 6 and the frame bottom plate 233.

Since the hood 6 and the frame bottom plate 233 include the holes, the open area is made greater than the flow rate of air to be passed through the cooling fan 59 in the limited configuration at the front of the cooling fan 59. With this configuration, the velocity of the cooling air to be passed through the cooling fan 59 is reduced, and the cooling air in the engine compartment is optimally controlled. Thus, backflow of the cooling air in the engine compartment is prevented, and in addition, the cooling air is effectively guided toward the engine 5. Since the opening portion 233z in the frame bottom plate 233 is a meshed opening portion, dust is prevented from entering the engine compartment and allowed to fall down by its own weight after the engine 5 is stopped.

The opening portion 233z of the frame bottom plate 233 is located at a position above the frame coupling member 12. Since the frame coupling member 12 of the traveling body 2 is located below the opening portion 233z of the frame bottom plate 233, when the outside air flows into the engine compartment through the opening portion 233z, the frame coupling member 12 prevents dust and mud from entering the engine compartment. The engine frames 14, which support the engine 5, are secured by the frame coupling member 12. The frame coupling member 12 is made of a metal casting. This configuration reinforces the support structure of the engine 5.

As illustrated in FIGS. 16 to 20, for example, an engine control unit (ECU) 271 is located at a position in front of the heat exchangers, such as the radiator 235, to be described later. The ECU 271 receives sensor signals from the sensors of the engine 5 and controls the driving of the engine 5. The engine control unit 271 stands upright on the frame bottom plate 233 with the longitudinal direction of the engine control unit 271 being in conformance with the fore-and-aft direction of the traveling body 2 (longitudinal direction of the engine frame 14). That is, the ECU 271 stands upright on the front bottom plate 233x of the frame bottom plate 233 and is located at a position behind the front of the hood 6 with the lateral width of the ECU 271 being small.

Since the ECU 271 is disposed in such a manner that its longitudinal direction conforms to the fore-and-aft direction, the mounting orientation of the ECU 271 is in conformance with the cooling air, which is caused to flow in the fore-and-aft direction within the engine compartment by the cooling fan 59. As a result, the area in the ECU 271 that acts as a shield against the flow of the cooling air is reduced, and therefore decrease in the flow rate of the cooling air to the engine 5 is inhibited and the interior of the engine compartment is maintained at an appropriate temperature.

The frame bottom plate 233x includes a harness insertion hole 233w at a location near the location where the ECU 271 stands upright and rearward of the opening portion 233z. A harness (not shown) to be coupled to the ECU 271 is guided to the bottom of the traveling body 2 through the harness insertion hole 233w, and is coupled to the engine 5 and a battery 272, for example, which are located rearward. Since the ECU 271 is located on the front bottom plate 233x and the harness insertion hole 233w is provided in the front bottom plate 233x, the ECU 271 is configured as a one-piece unit via the front bottom plate 233x. This configuration improves the ease of assembly.

Furthermore, the ECU 271 is located at a position between the anti-dust screens (opening portions) 231b and above the opening portion 233z of the frame bottom plate 233. The anti-dust screens (opening portions) 231b are left and right symmetrical screens provided in the front surface of the hood 6. That is, the ECU 271 is located behind the frame 231a of the front grille 231 and stands upright on the front bottom plate 233x over the opening portion 233z. The opening portion 233z is located at the center of the frame bottom plate 233 in the left and right direction. Since the ECU 271 is located at a position that does not overlap the opening portions 231b of the hood 6, the existence of the ECU 271 does not reduce the open area through which the cooling air flows to the inside. Furthermore, since the ECU 271 is located above the opening portion 233z of the frame bottom plate 233, the ECU 271 can be cooled.

As illustrated in FIGS. 16 to 20, for example, the radiator 235 stands upright on the rear bottom plate 233y of the frame bottom plate 233 to be located in front of the engine 5. A fan shroud 234 is secured to the rear surface of the radiator 235. The fan shroud 234 surrounds the outer circumference of the cooling fan 59 and connects the radiator 235 to the cooling fan 59. The radiator 235 is supported inside a rectangular radiator frame 260, which is secured in an upright position to the frame bottom plate 233. The radiator frame 260 includes an anti-dust screen 260a in the front surface. The anti-dust screen 260a prevents entry of dust, for example, into the frame-shaped radiator frame 260. The radiator frame 260 is secured on the frame bottom plate 233 to surround the radiator 235 inside. The radiator frame 260 is also coupled to the fan shroud 234.

Figure 19:
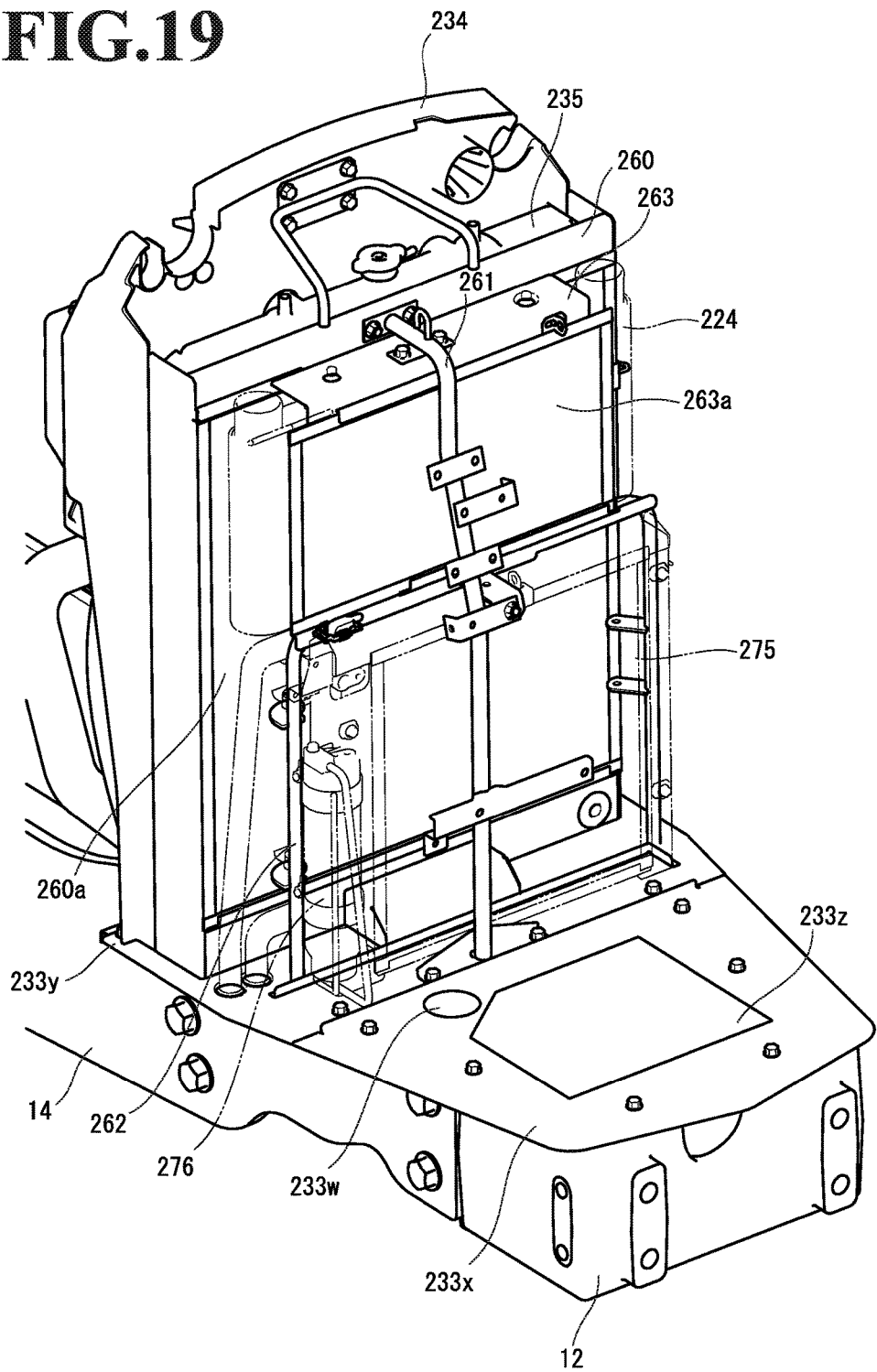
FIG. 19 is a front perspective view of the engine compartment illustrating the positional relationship between the heat exchangers in the work vehicle.
Figure 20:
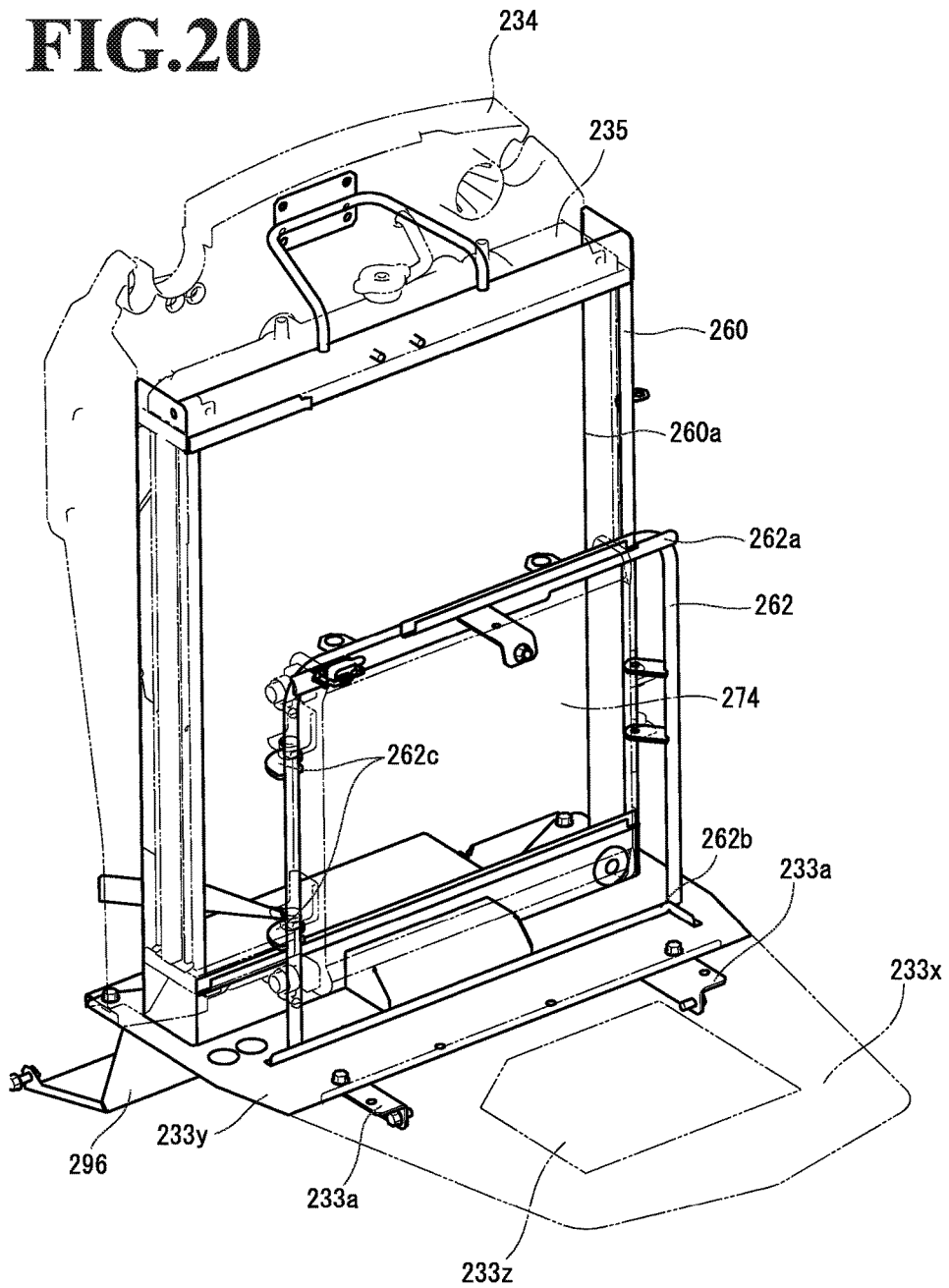
FIG. 20 is a perspective view of the work vehicle illustrating the configuration of the frame on the frame bottom plate.
Figure 21:
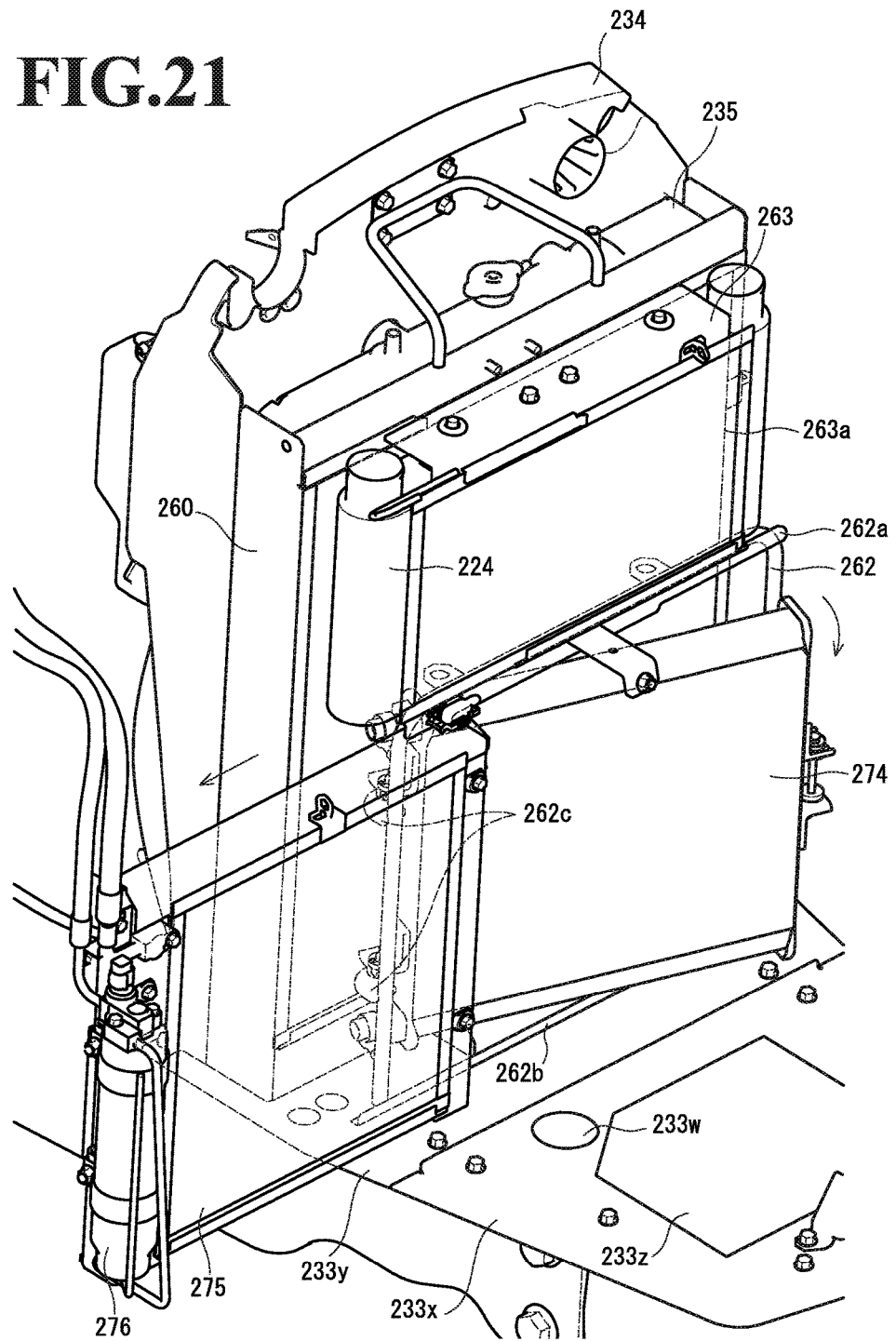
FIG. 21 is a perspective view of the condenser and the oil cooler in the work vehicle illustrating how the condenser and the oil cooler are moved.

As illustrated in FIGS. 19 and 20, a frame 226 stands upright on the rear bottom plate 233y of the frame bottom plate 233 in front of the radiator 235. The frame 226 includes an air cleaner support frame 261, which supports the air cleaner 221. The air cleaner support frame 261 is a bent rod-shaped frame. One end of the air cleaner support frame 261 is coupled to the rear bottom plate 233y and the other end is coupled to the radiator frame 260. The air cleaner 221 is secured to an upper position of the air cleaner support frame 261, and a fuel cooler 273 for cooling fuel is secured to the air cleaner support frame 261 at a position below the air cleaner 221.

The frame 226 includes an inverted U-shaped frame 262, which is bent like an inverted U. Both ends of the inverted U-shaped frame 262 are secured to the frame bottom plate 233y. The inverted U-shaped frame 262 stands upright between the radiator frame 260 and the air cleaner support frame 261 with both left and right ends (lower ends) coupled to the frame bottom plate 233y. A central portion of the upper frame of the inverted U-shaped frame 262 in the left and right direction is coupled to a middle portion of the air cleaner support frame 261 in the vertical direction. The upper section of the air cleaner support frame 261, relative to the portion coupled to the inverted U-shaped frame 262, supports the air cleaner 221 and the lower section of the air cleaner support frame 261, relative to the portion coupled to the inverted U-shaped frame 262, supports the fuel cooler 273.

The inverted U-shaped frame 262 supports an oil cooler 274 at a rear location (close to the radiator 235), and supports the condenser 275 at a front location (close to the fuel cooler 273). The oil cooler 274 is used to cool lubricant and the condenser 275 is used to cool a refrigerant. The intercooler 224 is sandwiched in the vertical direction between an intercooler coupling bracket 263 and the upper frame of the inverted U-shaped frame 262. The intercooler coupling bracket 263 is secured to the upper end of the air cleaner support frame 261. Thus, the intercooler 224 is supported above the oil cooler 274. In front of the intercooler 224, an anti-dust screen 263a is sandwiched and supported by the upper frame of the inverted U-shaped frame 262 and the intercooler coupling bracket 263.

The condenser 275 is a case-integrated structure and includes a receiver dryer 276 and an anti-dust screen 27a. The receiver dryer 276 is securely coupled to a side surface of the case and is used for gas liquid separation of a coolant. The anti-dust screen 27a is located in the front surface of the case. The air cleaner support frame 261, which stands upright on the frame bottom plate 233, is curved diagonally rearward above the condenser 275 and further is bent rearward above the intercooler 224. Thus, the air cleaner 221 is supported by the air cleaner support frame 261 so as to be located above the condenser 275 at a location where the air cleaner 221 partially overlaps with the condenser 275 in the fore-and-aft direction.

Figure 18:
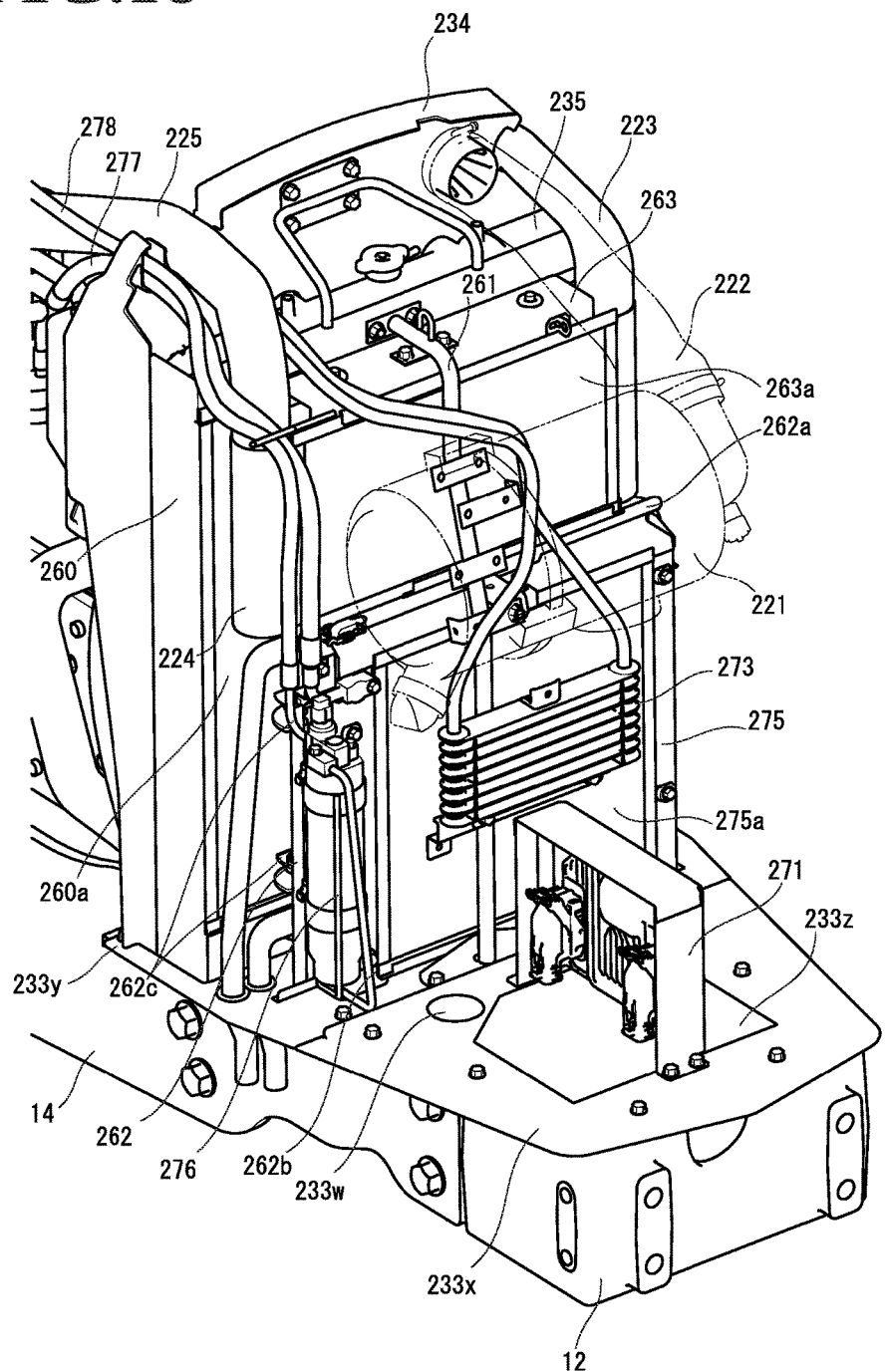
FIG. 18 is a perspective view of the work vehicle illustrating the configuration in the engine compartment at the front.

As illustrated in FIGS. 16 to 18, for example, the plurality of heat exchangers including the intercooler 224 are located in front of the radiator 235 in such a manner as to reduce the pressure drop in the offset portion from the cooling fan 59. This configuration equalizes the velocity distribution of the cool air that flows within the fan shroud 234 and inhibits a pressure differential within the fan shroud 234. Thus, backflow of the cool air within the radiator 235 is prevented and the cooling efficiency of the radiator 235 is increased.

More specifically, the intercooler 224 is located at an upper location in front of the radiator 235, the oil cooler 274, which is used to cool lubricant, is located at a lower location in front of the radiator 235, and the condenser 275 is located in front of the oil cooler 274. This arrangement reduces the pressure drop in the offset region between the cooling fan 59 and the radiator 235 and therefore facilitates introduction of the cool air to reduce the load imposed on the cooling fan 59.

The air cleaner 221 is secured to a location in front of the intercooler 224 and spaced apart from the intercooler 224. Since the air cleaner 221 and the intercooler 224 are spaced apart from each other, a space is formed above the radiator 235 so that the cool air can easily flow into the radiator 235. As a result, the velocity distribution of the cool air in the engine compartment below the hood 6 is equalized in the height direction, and thus backflow of the cool air, for example, is inhibited.

As illustrated in FIGS. 18 to 21, for example, the air cleaner 221 and the condenser 275 are arranged in the vertical direction in front of the radiator 235, so that the condenser 275 is withdrawable in the left and right direction. Specifically, a rail 262a is provided on the front side of the upper frame of the inverted U-shaped frame 262, and a rail 262b is provided on the frame bottom plate 233 at a location immediately below the rail 262a. The upper and lower edges of the rear surface of the condenser 275 are engaged with the upper and lower rails 262a, 262b, and thus the condenser 275 is sandwiched between the inverted U-shaped frame 262 and the rear bottom plate 233y to be slidable in the left and right direction.

The condenser 275 is integral with the receiver dryer 276. The receiver dryer 276 is coupled to coolant hoses 277, 278, which are coupled to the air conditioner compressor 211 and the air conditioner 364. The coolant hoses 277, 278 are held by the fan shroud 234 and the intercooler coupling bracket 263 in a hooked manner. Simply by unhooking the coolant hoses 277, 278, the condenser 275 can be made withdrawable, without the need for disengaging the coolant hoses 277, 278 from the receiver dryer 276. In this manner, the condenser 275 can be withdrawn utilizing the space below the air cleaner 221 in the engine compartment, and this configuration facilitates access to the space behind the condenser 275. Thus, the difficulties in maintenance work such as dust removal behind the condenser 275 are eliminated.

The intercooler 224 and the oil cooler 274 are disposed one above the other in front of the radiator 235. The upper intercooler 224 is secured to the inverted U-shaped frame (stationary frame) 262. Within the inverted U-shaped frame 262, the oil cooler 274 is secured so as to be pivotable about the vertical axis. That is, a pivotal support member 262c is provided at either the left frame or the right frame of the inverted U-shaped frame 262. The pivotal support member 262c pivotally supports either the left side surface or the right side surface of the oil cooler 274 about the vertical axis, and thus the oil cooler 274 is disposed so as to be able to open and close the inverted U-shaped frame 262. In this embodiment, the condenser 275 is configured to be withdrawn rightward together with the receiver dryer 276, which is mounted on the right side surface. Thus, the oil cooler 274 is pivotally supported on the right frame of the inverted U-shaped frame 262. Behind the withdrawable condenser 275, the oil cooler 274 is mounted so as to be pivotable about the vertical axis, and therefore a worker can easily access the lower region in front of the radiator 235, where dust tends to deposit as a result of the flow of the cool air. Thus, the difficulties in the maintenance work are eliminated.

As illustrated in FIGS. 4 to 10 and FIG. 16, the upstream relay pipe 223 and the downstream relay pipe 225 are distributed on both sides of the engine 5 and extend toward the front upper section of the engine 5 to be coupled to the intercooler 224, which is located on the frame 226 at the front of the engine 5. The air cleaner 221 is located on the upper section of the front surface of the frame 226. The supply pipe 222, which is coupled to the air cleaner 221, extends over the frame 226 toward the rear section on the left side of the engine 5. The fresh air introduction side of the intake connecting pipe 76 of the engine 5 communicates with the downstream relay pipe 225 via the intake throttle member 77. In the turbocharger 81 of the engine 5, the fresh air introduction side of the compressor case 83 communicates with the supply pipe 222 and the fresh air discharge side of the compressor case 83 communicates with the downstream relay pipe 225.

With the above-described configuration, dust is removed from the fresh air (external air) taken into the air cleaner 221 to purify the fresh air, and the fresh air is then drawn into the compressor case 83 of the turbocharger 81 via the supply pipe 222. The pressurized fresh air that has been compressed in the compressor case 83 of the turbocharger 81 is supplied to the EGR body case of the EGR apparatus 75 via the relay pipes 223, 225 and the intercooler 224. Some of the exhaust gas (EGR gas) from the exhaust manifold 57 is cooled by the EGR cooler 80, and the cooled EGR gas is then supplied to the EGR body case of the EGR apparatus 75 via the recirculation exhaust gas pipe 78.

In the engine compartment below the hood 6, the supply pipe 222 and upstream relay pipe 223, and the downstream relay pipe 225, are distributed on the left and right sides. This configuration is efficient pipe arrangement for the engine 5, in which the turbocharger 81 and the intake manifold 56 are distributed on the left and right sides. Thus, the air flow pipes 222, 223, 225 are located outward of the engine 5 in a natural manner and are inhibited from temperature increase due to exhaust heat generated by the engine 5 and the exhaust gas purification device 52. Thus, thermal influence on the air passing through the pipes is reduced. In the intercooler 224, which is located at the front section of the engine compartment, the fresh air outlet side and the fresh air inlet side are distributed on the left and right sides. This configuration not only reduces the lengths of the upstream relay pipe 223 and the downstream relay pipe 225, which communicate with the engine 5, but also allows the intercooler 224 to be compactly accommodated in the front section of the engine compartment.

As illustrated in FIGS. 13 to 15 and FIG. 27, for example, the front end of each of the left and right body frames 15 is coupled to the rear end of the corresponding one of the left and right engine frames 14 via a spacer 297. The left and right body frames 15 are located to sandwich the left and right engine frames 14. The coupling surface (outer side) between each body frame 15 and the support beam frame 236 is flush with the coupling surface (outer side) between each spacer 297 and the associated body frame 15. The support beam frame 236 is bolted to the left and right body frames 15 to hold the left and right body frames 15. An engine support frame 237 is mounted on the upper surface of the support beam frame 236. The lower end surface of the engine support frame 237 is bolted to the upper surface of the support beam frame 236 so that the engine support frame 237 surrounds the flywheel 61 of the diesel engine 5 together with the support beam frame 236.

The engine mount fittings 74, which are provided on left and right lower sides of the diesel engine 5, are coupled to engine support brackets 298 via the engine mounts 238. The engine support brackets 298 are located at the middle of the pair of left and right engine frames 14. The engine mounts 238 each include an anti-vibration rubber 239. Engine mount fittings 60a are provided on the upper section of the flywheel housing 60, which is located on the rear surface of the diesel engine 5. The engine mount fittings 60a are coupled to the upper surface of the engine support frame 237 via an engine mount 240. The engine mount 240 includes anti-vibration rubbers 241.

The engine mounts 238 are bolted to the upper sections of the engine support brackets 298, which are coupled to the outer side at the middle of the pair of left and right engine frames 14, with the anti-vibration rubbers 239 located on the lower side. The diesel engine 5 is sandwiched between the engine frames 14 with the pair of left and right engine mounts 238 so that the front section of the diesel engine 5 is supported. The rear surface of the diesel engine 5 is coupled to the front ends of the pair of left and right body frames 15 via the support beam frame 236, the engine support frame 237, and the engine mount 240 so that the rear section of the diesel engine 5 is supported by the front ends of the body frames 15. The left and right front anti-vibration rubbers 239 and the left and right rear anti-vibration rubbers 241 support the diesel engine 5 on the traveling body 2.

Figure 22:
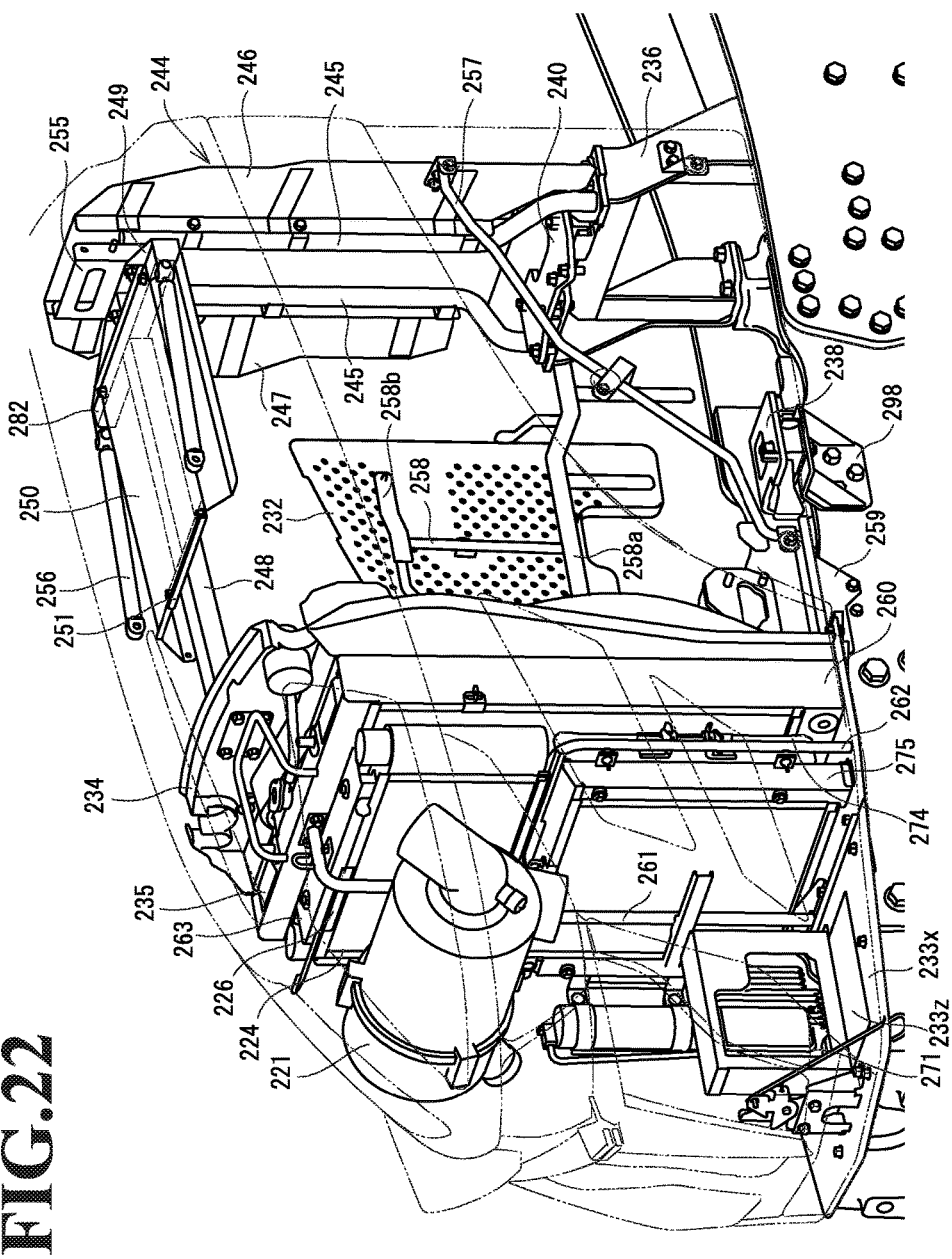
FIG. 22 is a front perspective view of the work vehicle illustrating the configuration of the frame in the engine compartment.
Figure 23:
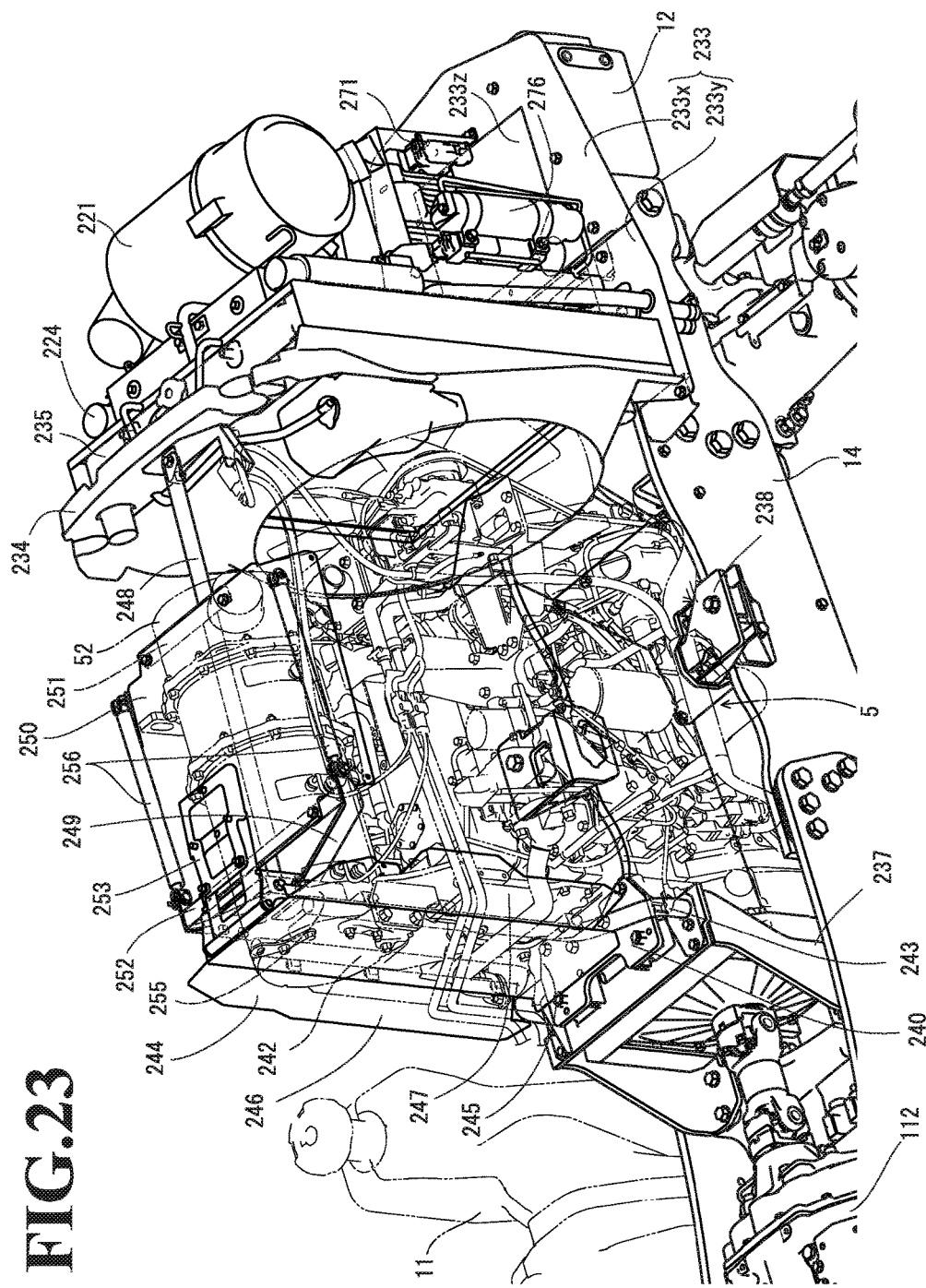
FIG. 23 is a rear perspective view of the work vehicle illustrating the configuration of the frame in the engine compartment.
Figure 24:
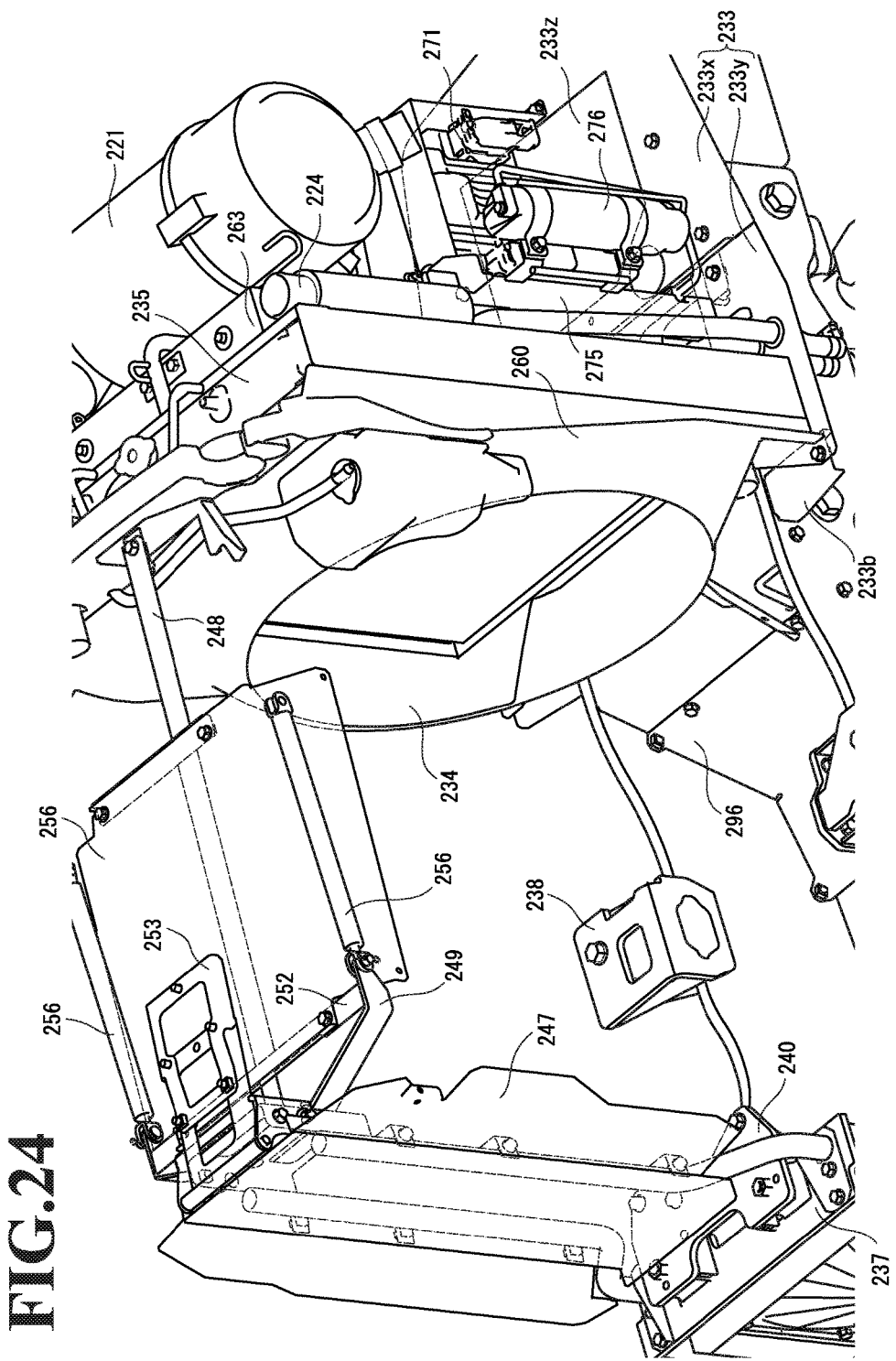
FIG. 24 is an enlarged perspective view of the work vehicle illustrating the configuration of the frame in the engine compartment.

As illustrated in FIGS. 22 to 24, for example, a pair of left and right support column frames 242, 243 extend upright from the upper surface of the engine support frame 237 to sandwich the engine mount 240 from left and right sides. A hood shield 244 covers the rear of the hood 6. The hood shield 244 is coupled to the pair of left and right support column frames 242, 243 such that the lower edge of the hood shield 244 is separate from the upper surface of the engine mount 240. Beam frames 248 are held between the upper sections of the fan shroud 234 and the hood shield 244. Since the fan shroud 234 and the hood shield 244, which are stably supported by the traveling body 2, are coupled to each other by the pair of beam frames 248, which are held between the fan shroud 234 and the hood shield 244, these members integrally configure a sturdy engine compartment frame as a whole.

Figure 7:
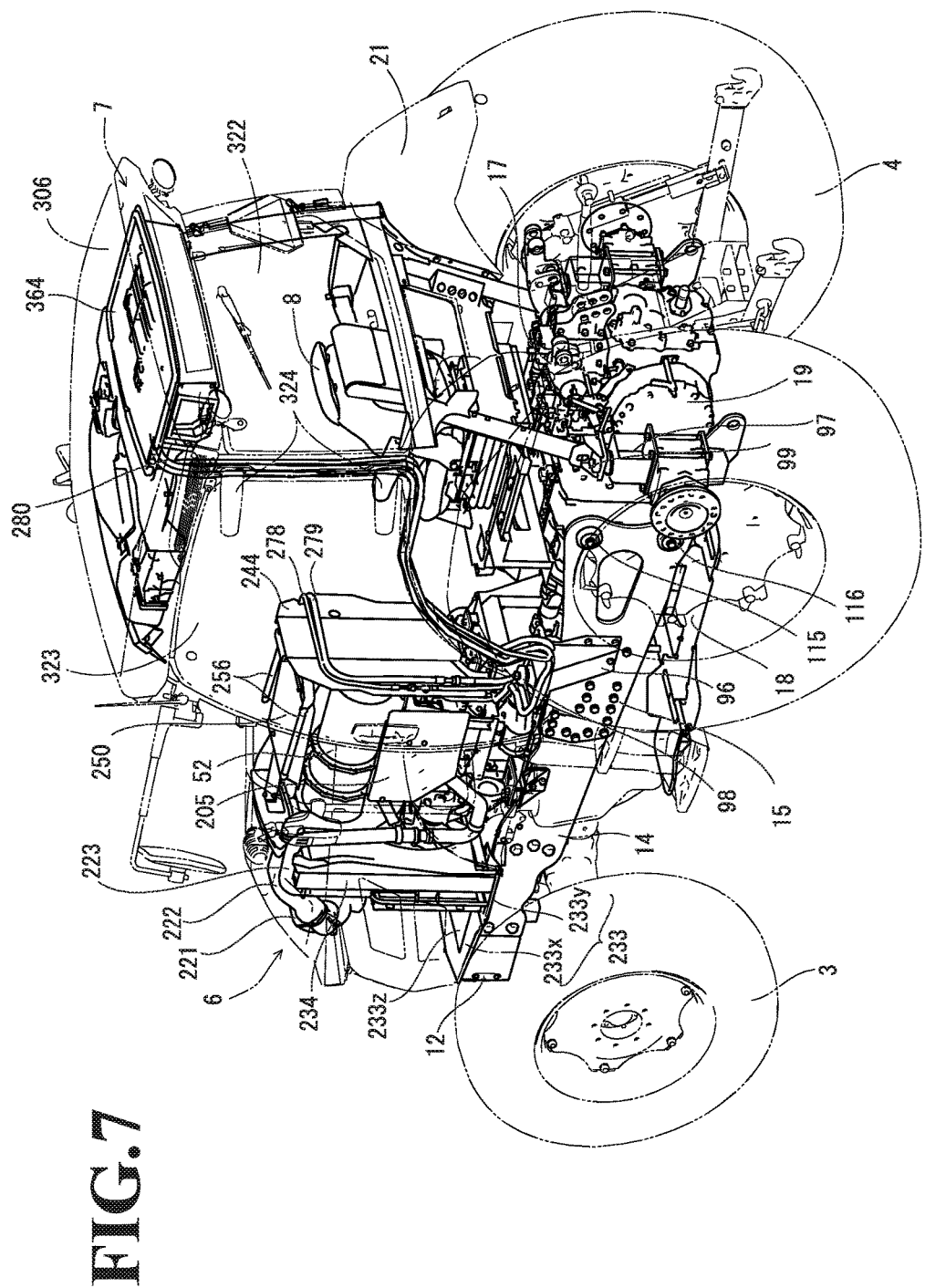
FIG. 7 is a rear perspective view of the work vehicle.
Figure 8:
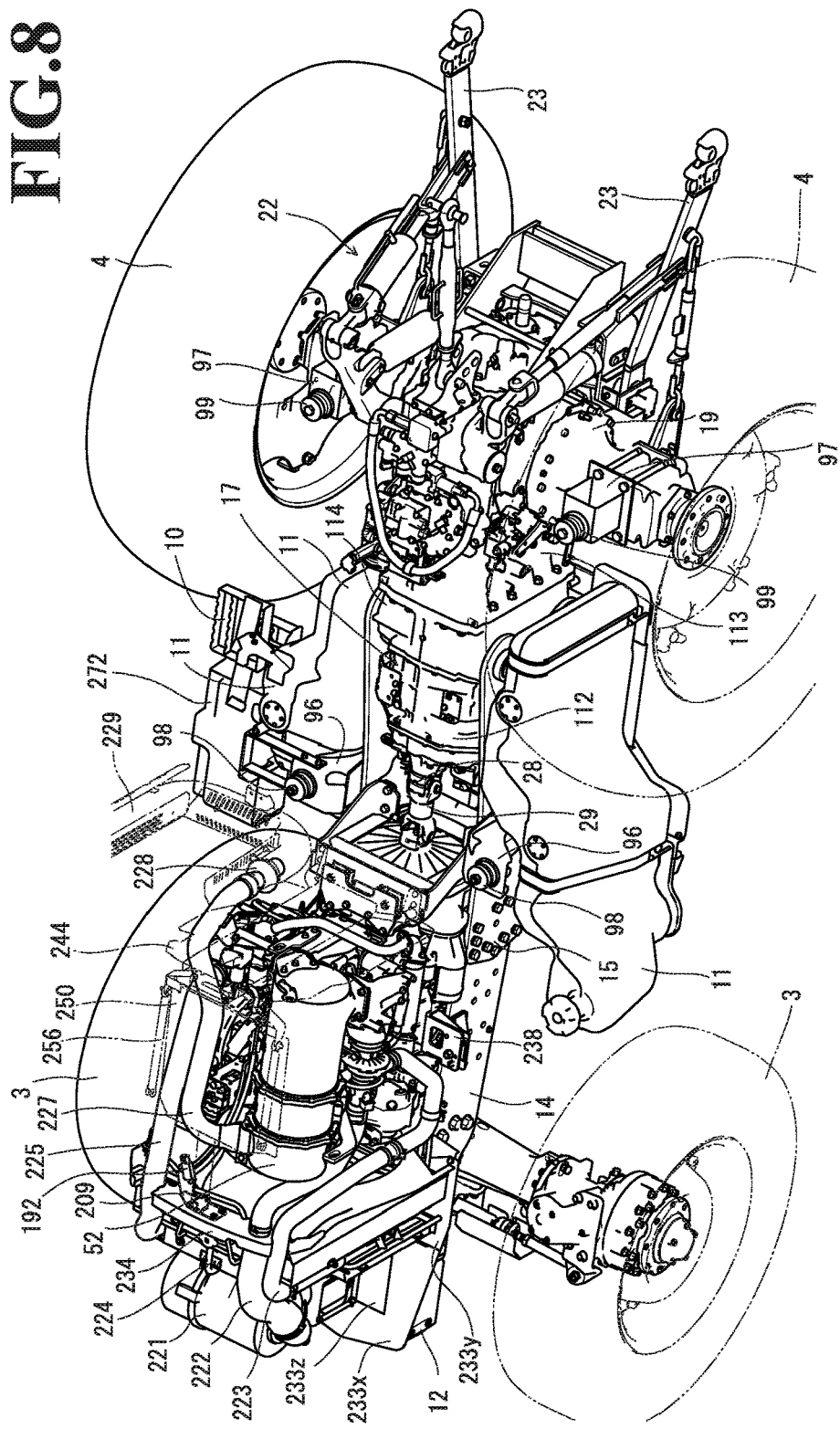
FIG. 8 is a rear perspective view of the traveling body as viewed from the left side.
Figure 9:
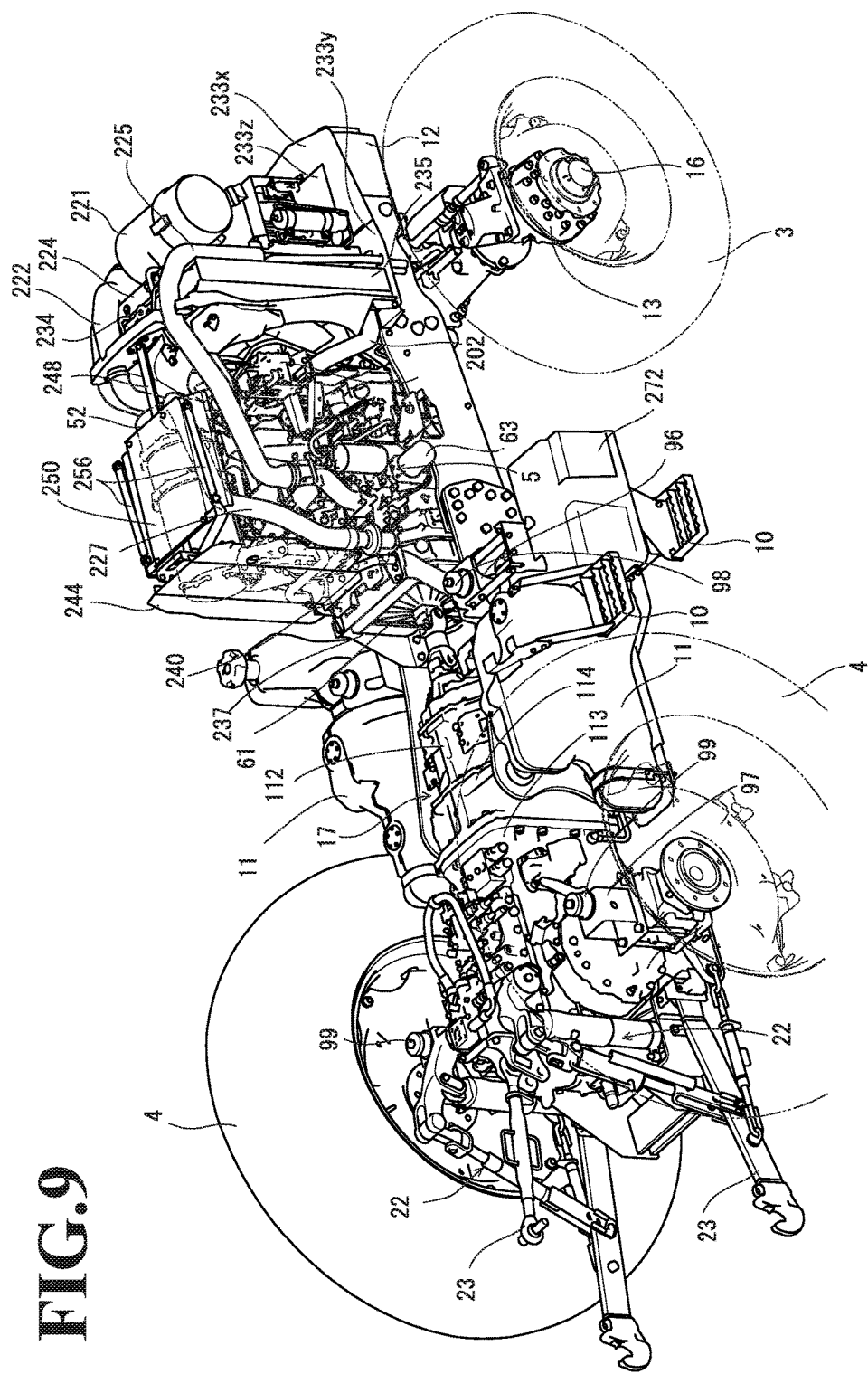
FIG. 9 is a rear perspective view of the traveling body as viewed from the right side.
Figure 10:
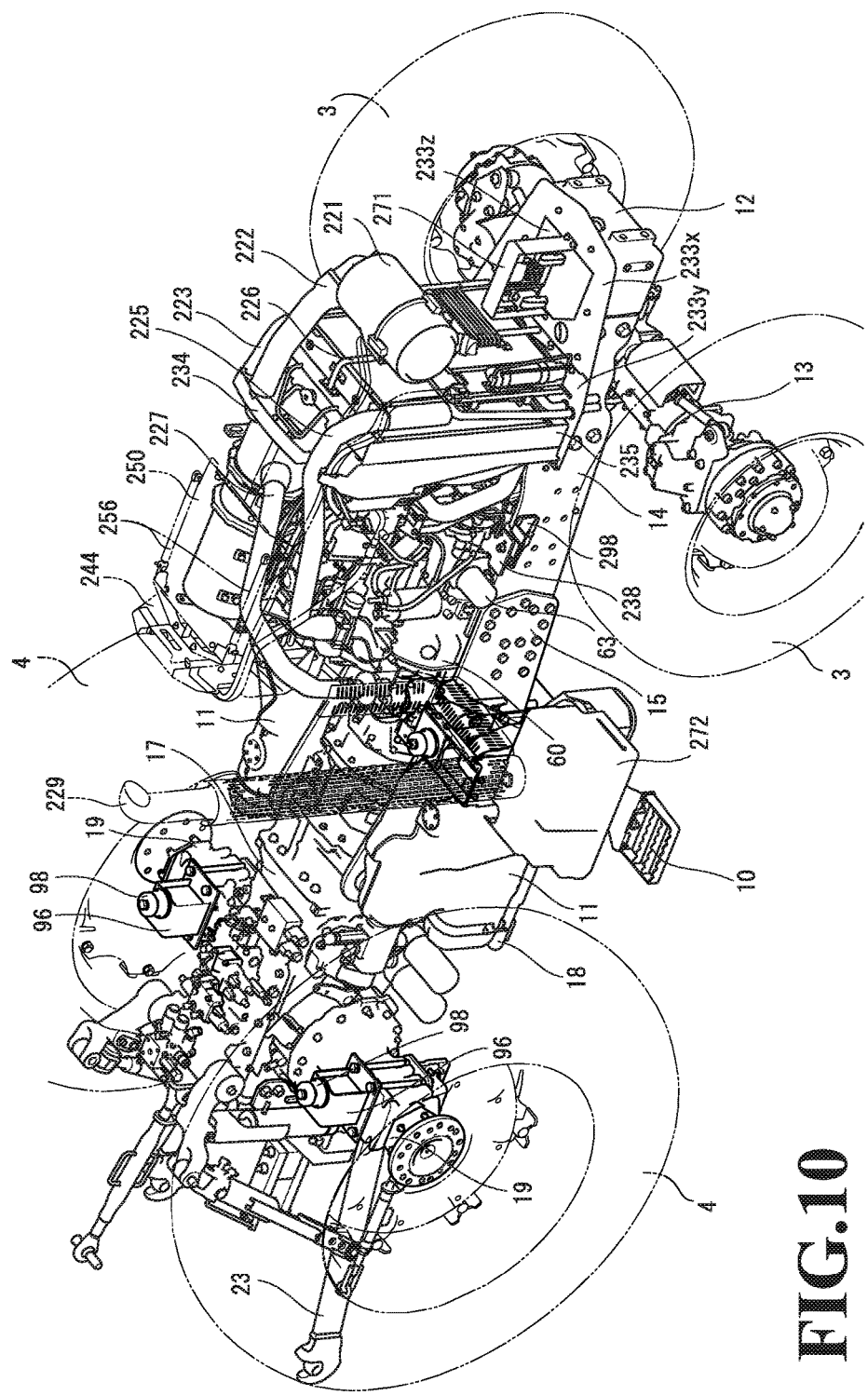
FIG. 10 is a front perspective view of the traveling body as viewed from the right side.
Figure 11:
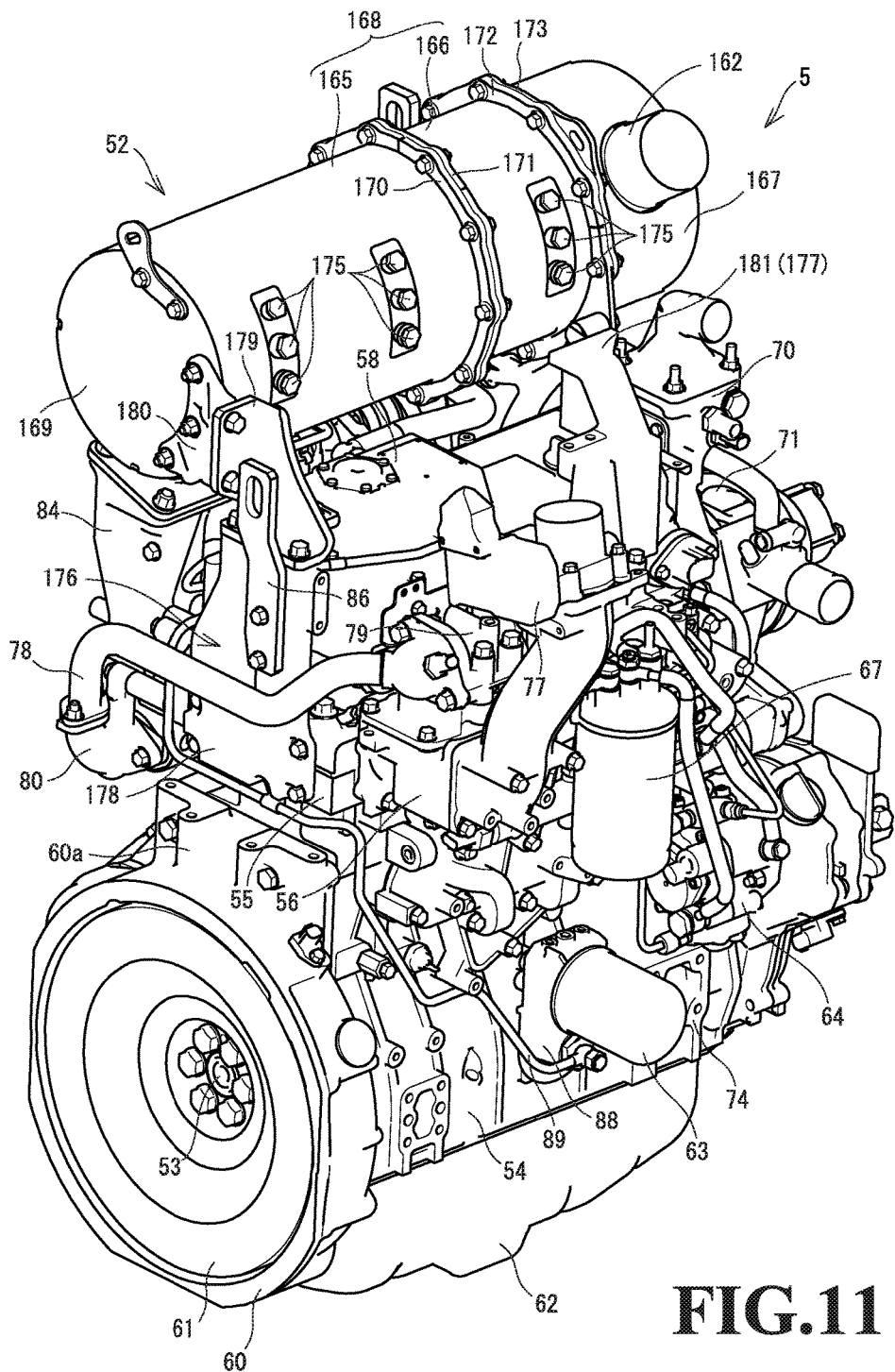
FIG. 11 is a rear perspective view of the diesel engine mounted on the work vehicle according to the invention of the present application.
Figure 12:
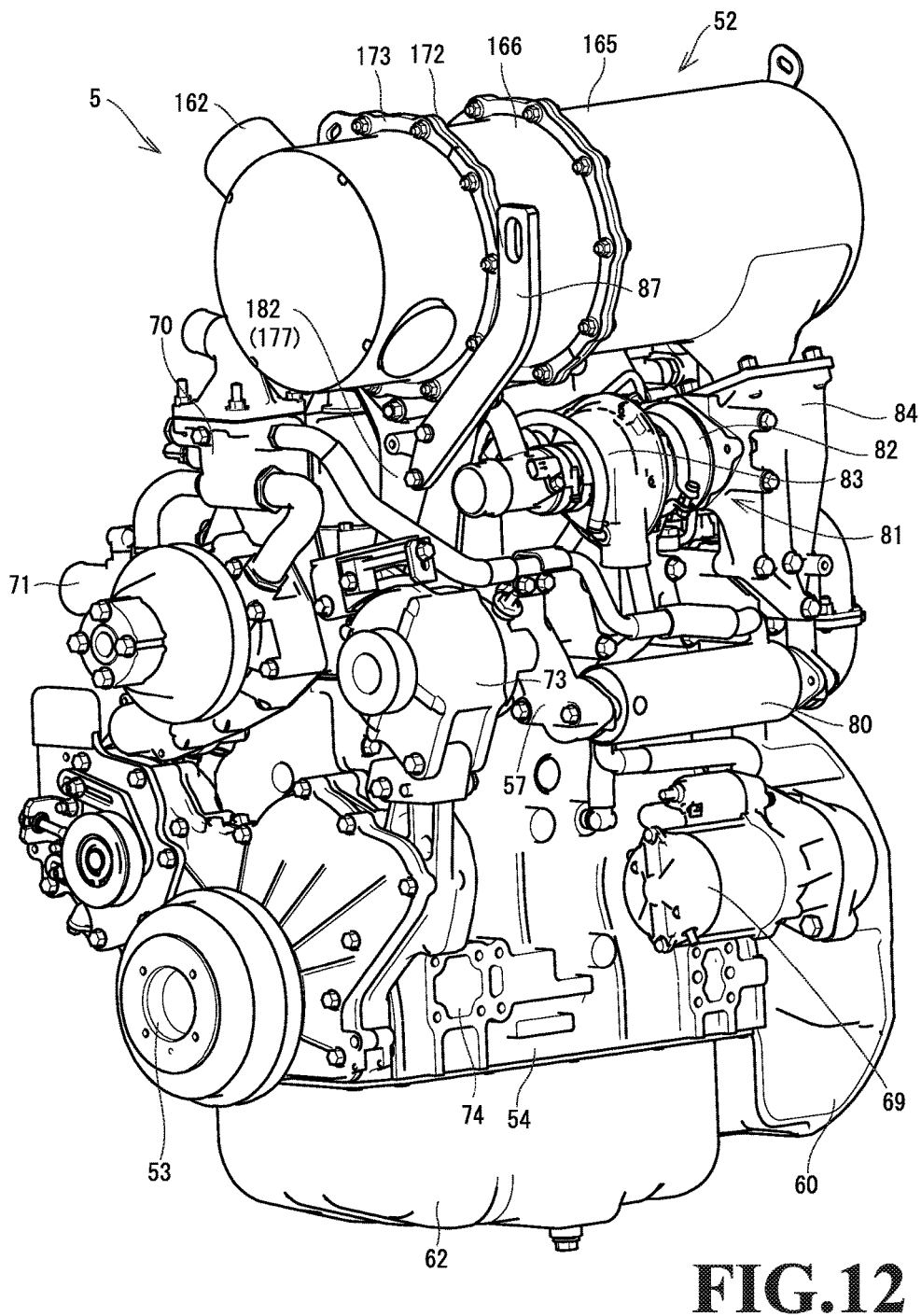
FIG. 12 is a front perspective view of the diesel engine.

The hood shield 244 is bent on the left and right sides, so that the left and right rear sections of the engine compartment are covered, and a space is formed between the front of the cabin 7 and the hood shield 244. This configuration prevents the noise generated by the engine 5 in the engine compartment from propagating to the cabin 7 (operator's seat 8). Furthermore, the hood shield 244 has a shape in which both the left and right sides are tilted toward the front in plan view, and therefore the space surrounded by the engine compartment below the hood 6 and the cabin 7 has larger left and right areas. Thus, as illustrated in FIG. 7, for example, when coupling the coolant hoses 277, 279 to the plurality of coolant hoses 280, the coupling operation behind the hood shield 244 is facilitated. The coolant hoses 277, 279 are located closer to the engine compartment and are coupled to the receiver dryer 276 and the air conditioner compressor 211. The plurality of coolant hoses 280 are coupled to the air conditioner 364 in the cabin 7.

The hood shield 244 includes a rear shield surface (first shield surface) 245 and a pair of left and right side shield surfaces (second and third shield surfaces) 246, 247. The rear shield surface 245 is secured at its front side by the pair of left and right support column frames 242, 243 and is approximately parallel to the front side of the front windshield 321 of the cabin 7. The pair of left and right side shield surfaces 246, 247 are tilted toward the front from the left and right edges of the rear shield surface 245. The left and right side shield surfaces 246, 247 are also coupled to middle portions of the support column frames 242, 243 and thus are supported more rigidly.

The hood shield 244 is located at a position spaced apart from the front side of the front windshield 321 via the support column frames 242, 243. Since the left and right side shield surfaces 246, 247 are tilted, the left and right edges of the hood shield 244 are further spaced apart from the front windshield 321 toward the front. Thus, the space between the hood shield 244 and the cabin 7 is greater at the left and right locations behind the hood shield 244.

As described above, the hood shield 244 has a bent shape in plan view. That is, the left and right sides of the hood shield 244 are bent toward the front so that the left and right edges of the hood shield 244 are positioned forward of the central portion. Since heat in the engine compartment below the hood 6 is insulated by the hood shield 244, the temperature inside the cabin 7 (operator's seat 8), which is located rearward of the engine compartment, is prevented from being increased by the exhaust heat from the engine compartment. As a result, the operator in the cabin 7 can perform steering comfortably without being affected by the exhaust heat from the engine 5 and the exhaust gas purification device 52.

Inside the hood 6, the hood shield 244 is located on the rear side of the hood 6 to cover at least the rear surfaces of the exhaust gas purification device 52 and the exhaust pipe 227. The hood shield 244 is shaped to bulge to the left and right from the pair of left and right support column frames 242, 243 so as to cover at least the rear surface of the diesel engine 5. On the rear side of the engine compartment, a region on the right side of the hood shield 244 is open, and the exhaust pipe 227 and the tailpipe 229 are coupled to each other in the region. The open region for coupling the exhaust pipe 227 to the tailpipe 229 is provided by cutting off a right lower portion of the right side shield surface 247.

By covering the rear surface of the hood 6 with the hood shield 244, heat in the engine compartment below the hood 6 is insulated by the hood shield 244. As a result, the temperature at the cabin 7 is prevented from being increased by the exhaust heat from the engine compartment. Thus, the operator in the cabin 7 can perform steering comfortably without being affected by the exhaust heat from the diesel engine 5 and the exhaust gas purification device 52. Since the hood shield 244 is spaced apart from the front side of the cabin 7, a heat barrier is formed between the hood shield 244 and the cabin 7, which is located rearward of the hood 6.

As illustrated in FIGS. 22 to 26, the pair of left and right support column frames 242, 243 are coupled to the central region (rear shield surface 245) of the hood shield 244. The central region is located between the bent portions. The beam frame 248 is held between the support column frames 242, 243 and the fan shroud 235. Since the fan shroud 235 and the support column frames 242, 243, which are stably supported by the traveling body 2, are coupled to each other by the beam frame 248, which is held between the fan shroud 235 and the hood shield 244, these members integrally configure a sturdy engine compartment frame as a whole.

A hood support bracket 255 is mounted to the upper ends of the support column frames 242, 243. A hinge member 253, which is provided in the rear section of the hood 6, is coupled to the hood support bracket 255. Thus, the hood support bracket 255 pivotally supports the rear section of the hood 6 near the upper ends of the support column frames 242, 243. The hood support bracket 255 is bent at the left and right edges and secured to the front sides of the support column frames 242, 243. The hood support bracket 255 has a U-shape with the left and right edges bent rearward. Both ends of the hood support bracket 255 are coupled to the support column frames 242, 243 and the front surface of the hood support bracket 255 is coupled to the rear end of the beam frame 248. That is, the beam frame 248 is coupled to the support column frames 242, 243 via the hood support bracket 255.

The beam frame 248 extends in the fore-and-aft direction with the right edge of the beam frame 248 located right of the center of the hood 6. In the upper section of the engine 5, the exhaust gas purification device 52 is located along the beam frame 248 so that the exhaust gas purification device 52 is positioned between the beam frame 248 and the inner side surface of the hood 6. Since the exhaust gas purification device 52 is positioned between the beam frame 248 and the inner side surface of the hood 6, the space around the exhaust gas purification device 52 is large, and as a result, the difficulties in component mounting and maintenance work in the upper section of the engine 5 are eliminated.

The heat insulator 250 is provided in the upper section of the engine 5 below the hood 6 to cover the beam frame 248 from a middle portion to the rear. Cross frames 251, 252 are respectively located at the middle portion and the rear end of the beam frame 248 and extend to the left and right of the beam frame 248. That is, the front cross frame 251 is secured to the upper surface of the middle portion of the beam frame 248 and extends to the left and right of the beam frame 248. The rear cross frame 252 is secured to the upper surface of the rear end of the beam frame 248 and extends to the left and right of the beam frame 248. The front and rear edges of the heat insulator 250 are respectively secured to the front and rear pair of cross frames 251, 252. The heat insulator 250 is disposed so as to cover the exhaust gas purification device 52 and the upper portion of the exhaust pipe 227 in the upper section of the engine 5. Since the heat insulator 250 is disposed between the exhaust gas purification device 52 and exhaust pipe 227 and the hood 6, the temperature of the hood 6 is prevented from being increased by exhaust heat from the engine compartment.

The exhaust gas purification device 52, which is mounted on the upper section of the engine 5, is located inside the rear section of the hood 6. A heat insulator 250 is located between the hood 6 and the exhaust gas purification device 52. Since the heat insulator 250 is located above the exhaust gas purification device 52, the temperature of the hood 6 is prevented from being increased by exhaust heat generated by the exhaust gas purification device 52 and the diesel engine 5. A space is formed between the hood 6 and the heat insulator 250 to insulate the inside of the engine compartment below the heat insulator 250 from the heat of the outside air. This configuration allows the exhaust gas purification device 52 to be operated under a high-temperature environment.

Furthermore, the hood shield 244, which is located on the rear side of the hood 6 and covers at least the exhaust gas purification device 52 from the rear surface, is provided in addition to the above-described heat insulator 250. Since heat in the engine compartment below the hood 6 is insulated by the hood shield 244 together with the heat insulator 250, the temperature inside the cabin 7 is prevented from being increased by the exhaust heat from the engine compartment. Also, a gap between the hood shield 244 and the heat insulator 250 makes it unlikely that heat is kept in the engine compartment below the hood 6. This inhibits heat damage on, for example, the exhaust gas purification device 52 itself and the hood 6.

Extendable gas springs (hood dampers) 256, 256 are located on the left and right sides of the heat insulator 250 below the hood 6. One end (rear end) of each of the pair of left and right gas springs 256, 256 is pivotally attached to the engine compartment frame, and the other end (front end) of each of the gas springs 256, 256 is pivotally attached to the inner surface of the upper section of the hood 6. An extension frame 249 extends to the left and right from the rear end of the beam frame 248 with the rear end being the center, and is coupled to the left and right ends of the rear cross frame 252.

That is, the extension frame 249 is integral with the beam frame 248 and the rear cross frame 252 at the rear end of the beam frame 248. At a location forward of the left and right ends of the rear cross frame 252, a pair of left and right gas springs 256, 256 are pivotally attached, at one end (rear end) respectively, to the left and right ends of the extension frame 249.

The hood 6 is held in an open position by the tension of the gas springs 256. Thus, when the front portion of the hood 6 is lifted to open the hood 6 with the upper end position of the hood shield 244 serving as a shaft fulcrum, the gas springs 256 keep the hood 6 in the open state. In this state, maintenance of the diesel engine 5 can be performed.

Figure 25:
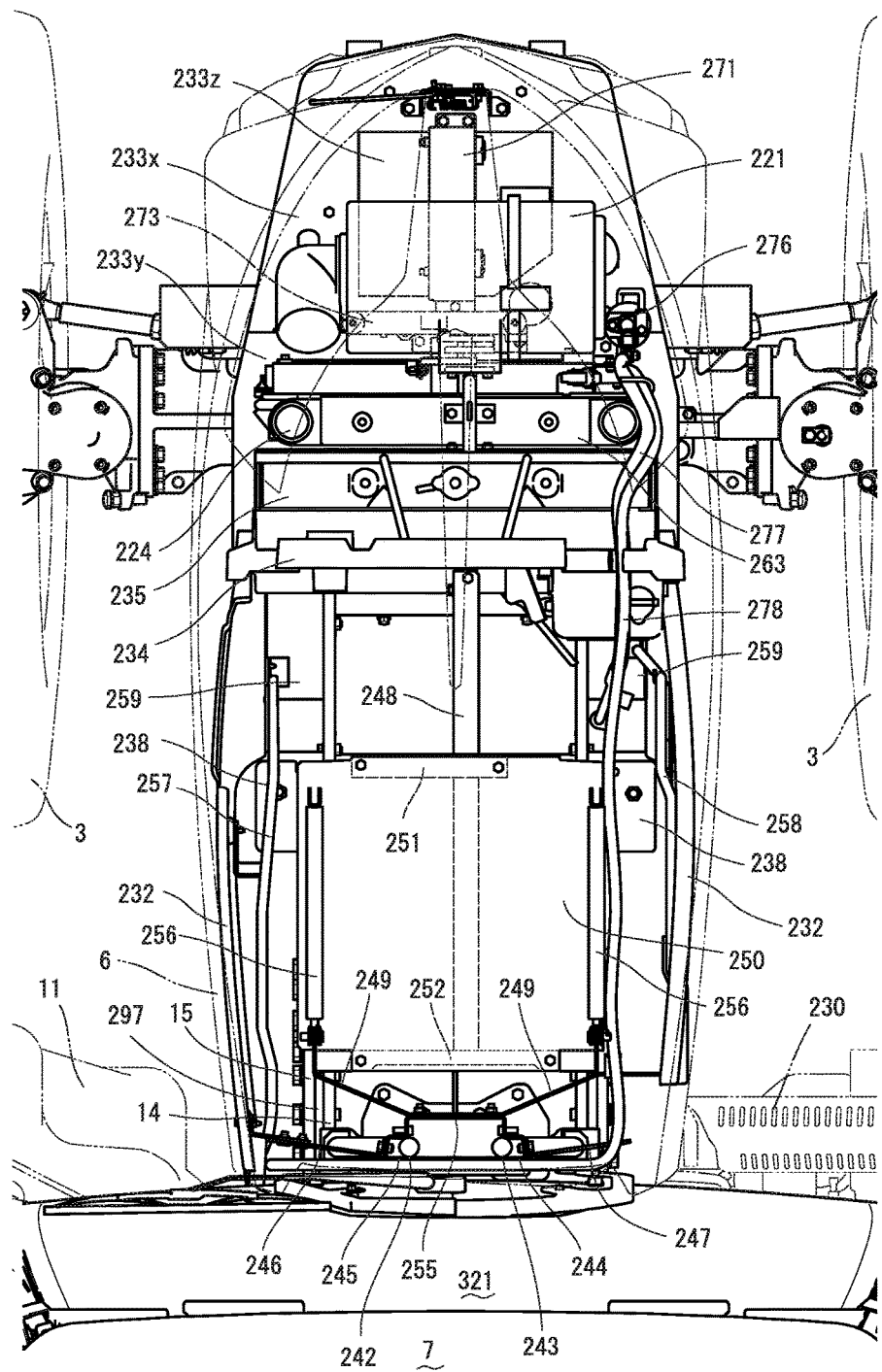
FIG. 25 is a plan view of the work vehicle illustrating the configuration in the engine compartment.
Figure 26:
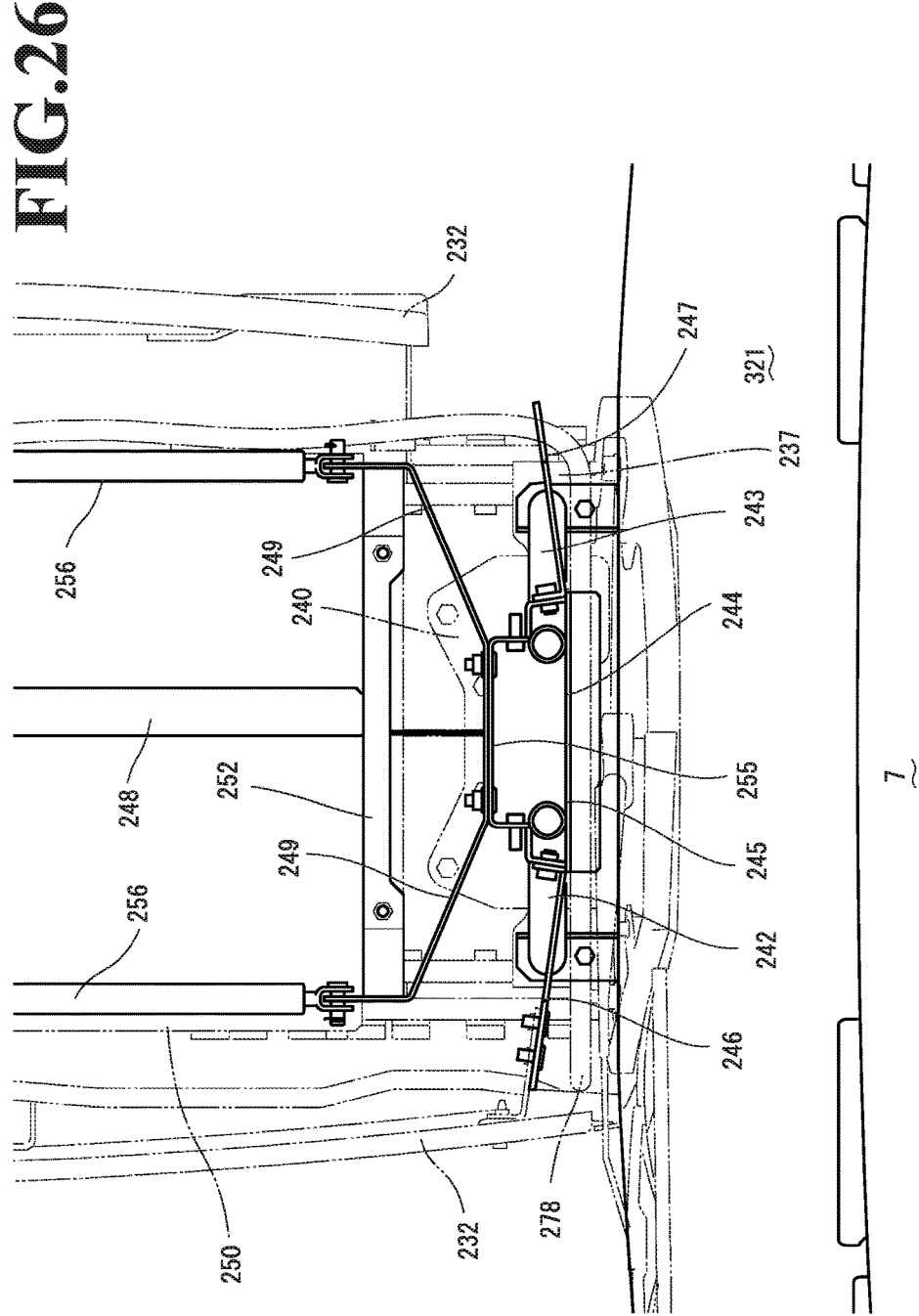
FIG. 26 is an enlarged plan view of the work vehicle illustrating the configuration of the hood shield in the engine compartment.

As illustrated in FIGS. 22 and 25, for example, a left engine cover frame 257 is tilted upward from the front end toward the rear end. The rear end of the left engine cover frame 257 is coupled to the left edge of the left side shield surface 246 of the hood shield 244, and the front end of the left engine cover frame 257 is coupled to a coupling bracket 259, which is coupled to a side surface of the left engine frame 14. The coupling bracket 259 is secured to the engine frame 14 at a location between the frame bottom plate 233 and the front engine mount 238. The left engine cover 232 is coupled to the front and rear ends and a middle portion of the left engine cover frame and also coupled to the left side surface of the engine support frame 237, and thus is secured to a lower portion of the left side surface of the hood 6.

A right engine cover frame 258 is coupled, at the front end, to the coupling bracket 259, which is coupled to the side surface of the left engine frame 14. The right engine cover frame 258 is tilted upward toward the rear and at a point bent downward. The rear end of the right engine cover frame 258 is located at a height approximately the same as the height of the front end. Both ends of the right engine cover frame 258 are coupled to a lower plate 258a, which is secured to the engine cover frame 258. One end of an upper plate 258b is coupled to the bent portion of the engine cover frame 258. The right engine cover 232 is coupled to the front and rear ends of the left engine cover frame and the other end of the upper plate 258b, and thus is secured to a lower portion of the right side surface of the hood 6. The right engine cover 232 is shaped to have a cutout at its bottom edge to allow the oil filter 63 of the engine 5 to project outward. The length of the right engine cover 232 in the fore-and-aft direction is shorter than the length of the left engine cover 233. The exhaust pipe 227 is coupled to the tailpipe 229 behind the right engine cover 232.

Figure 27:
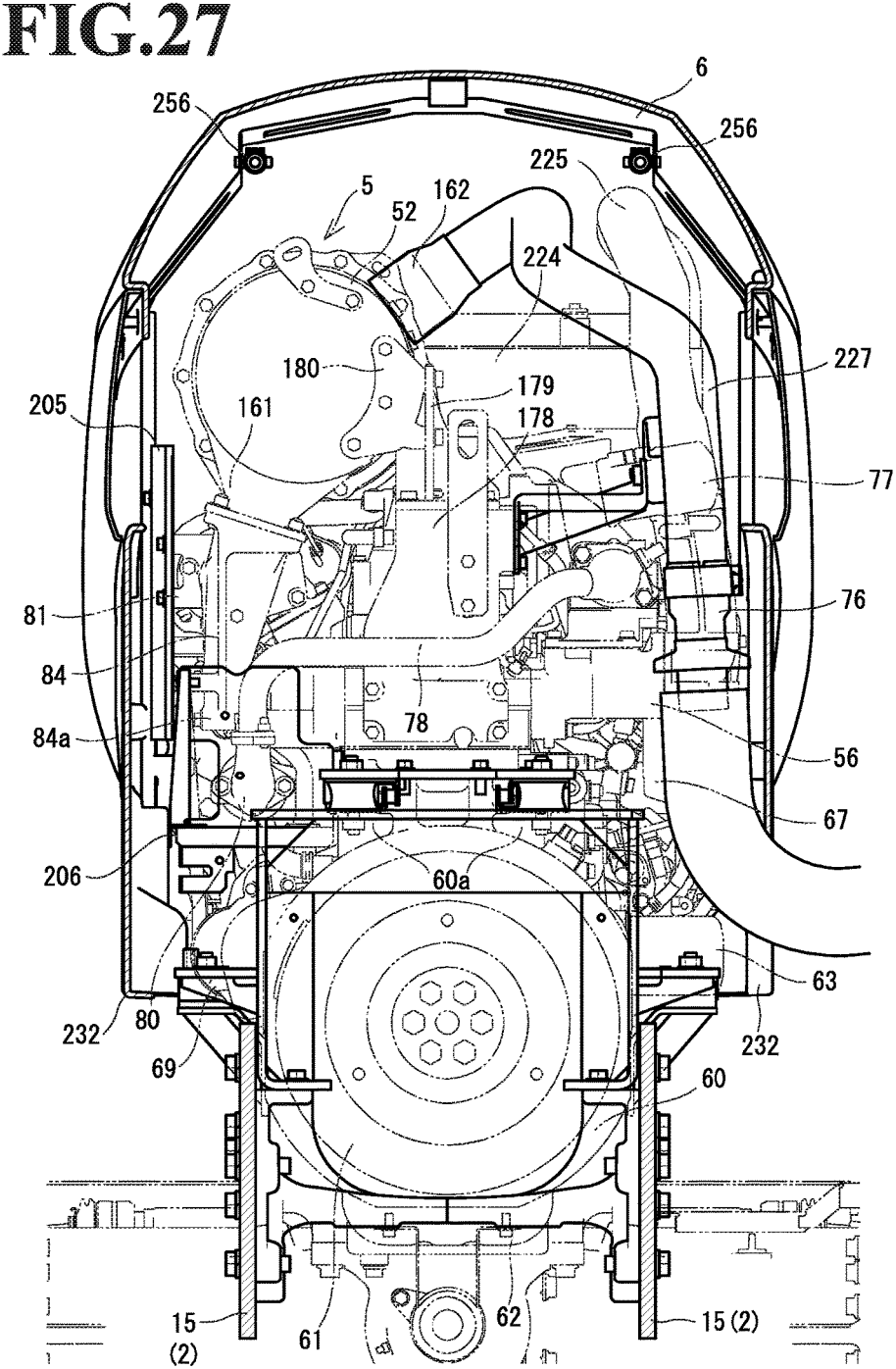
FIG. 27 is a rear cross-sectional view of the work vehicle illustrating the configuration in the engine compartment.

As illustrated in FIGS. 16, 17, and 27, a perforated heat insulator 205 is located below the exhaust gas purification device (DPF) 52. The perforated heat insulator 205 covers the left side of the engine 5. Since the heat insulator 205 is configured to cover the exhaust manifold 57, the turbocharger 81, and the exhaust connecting pipe 84, high-heat sources in the engine 5 are covered with the heat insulator 205. Thus, the temperature of the exhaust gas supplied to the DPF 52 is maintained high, and decrease in the regeneration ability of the DPF 52 is prevented. Since the heat insulator 205 is perforated and located to face the similarly perforated left side engine cover 232, some of air heated by the engine 5 is discharged to the outside through the heat insulator 205 and the engine cover 232. This configuration prevents heat retention on the left side of the engine 5 where the temperature is likely to become relatively high.

The heat insulator 205 is bolted to the exhaust gas introduction port side of the exhaust connecting pipe 84 (coupling portion coupled to the turbine case 82 of the turbocharger 81) and coupled to the rear component coupling portion 182d of the outlet side second bracket 182 via the shield securing bracket 207 to be supported by the engine 5. The shield securing bracket 207 is also coupled to the upstream relay pipe 223, which connects the fresh air introduction port of the intercooler 224 to the compressor case 83 of the turbocharger 81, and the upstream relay pipe 223 is also supported by the outlet side second bracket 182 of the engine 5.

As illustrated in FIGS. 16, 17, and 27, a heat insulating member 206, which is coupled to one side of the engine 5, is provided below the exhaust manifold 57, and an engine starter 69 is located below the heat insulator 206. The heat insulating member 206, which is coupled to the left side of the cylinder block 54, extends upright toward the engine cover 232 at a position between the engine starter 69 and the EGR cooler 80. Thus, the heat insulating member 206 covers over the electric device, which is the starter 69 in this embodiment. This reduces thermal influence on the starter 69 caused by heat dissipation from the exhaust manifold 57 that is heated and prevents failure of the electric device, which is the starter 69 in this embodiment.

Figure 28:
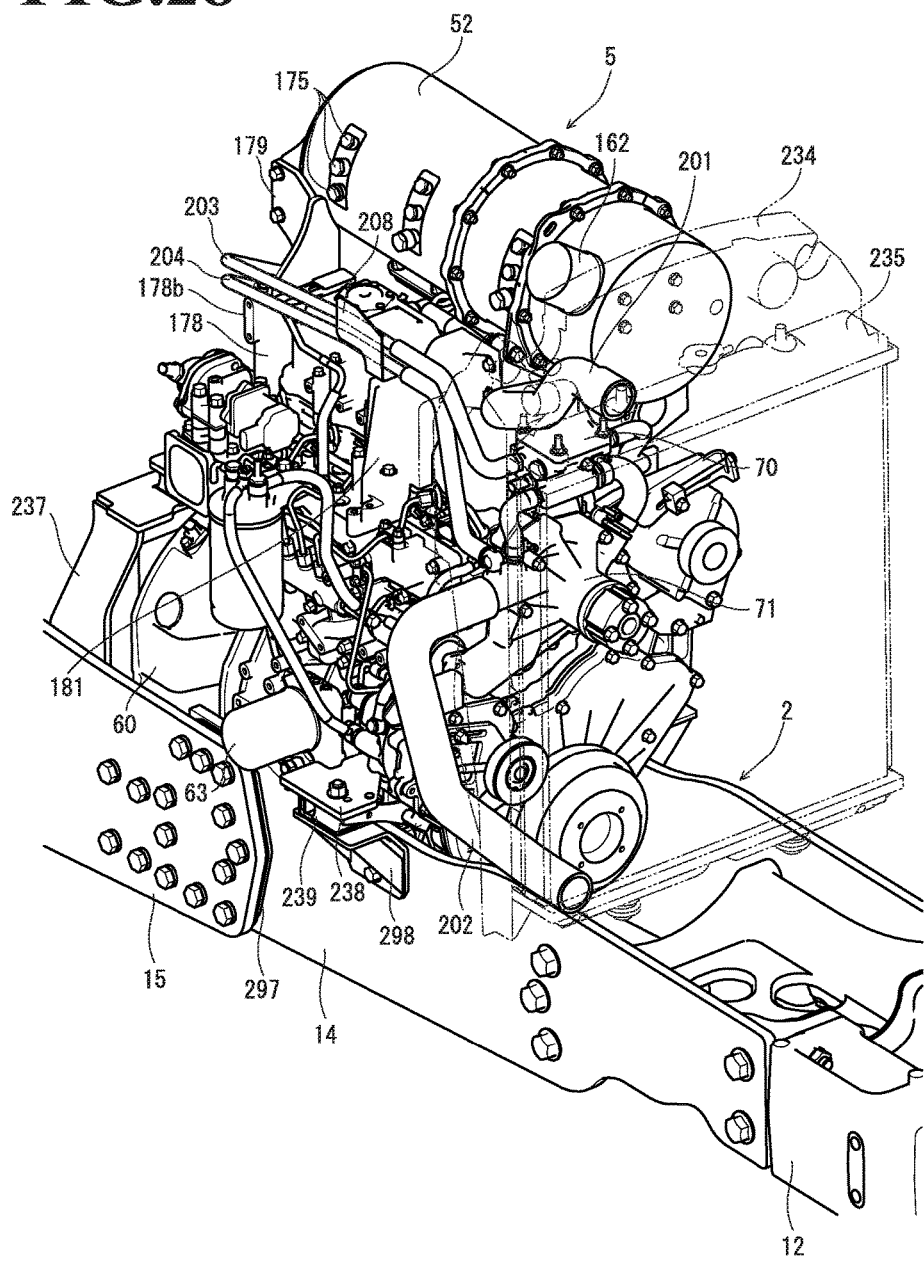
FIG. 28 is a front perspective view of the diesel engine and the radiator illustrating the relationship between the diesel engine and the radiator.

As illustrated in FIG. 28, the radiator 235 includes a coolant discharge port at the upper section and a coolant introduction port at the lower section. The coolant discharge port of the radiator 235 communicates with the coolant introduction port of the thermostat case 70 via a coolant supply pipe 201. The coolant introduction port of the radiator 235 communicates with a coolant discharge port of the coolant pump 71 via a coolant return pipe 202. The coolant in the radiator 235 is supplied to the coolant pump 71 via the coolant supply pipe 201 and the thermostat case 70. When the coolant pump 71 is driven, the coolant is supplied to the water-cooling jacket (not shown), which is formed in the cylinder block 54 and the cylinder head 55, to cool the engine 5. The coolant that has contributed to cooling the engine 5 is returned to the radiator 235 via the coolant return pipe 202.

The thermostat case 70 is also coupled to a warm water pipe 203, and the coolant pump 71 is also coupled to a warm water pipe 204. The coolant (warm water) that has contributed to cooling the engine 5 is circulated to an air conditioner 364 of the cabin 7. Thus, warm water circulates in the air conditioner 364 of the cabin 7, and the air conditioner 364 supplies warm air into the cabin 7. This configuration allows an operator to adjust the temperature in the cabin 7 to a desired temperature.

The coolant inlet that is bent rightward above the thermostat case 70 communicates with the coolant outlet (coolant discharge port) at the upper section of the radiator 235 via the coolant supply pipe 201. The radiator 235 is located forward of the engine 5 with the fan shroud 234 located in between. Also, the coolant discharge port of the coolant pump 71 projects rightward from the main body of the coolant pump 71 and communicates with the coolant introduction port at the lower section of the radiator 235 via the coolant return pipe 202. The coolant supply pipe 201 and the coolant return pipe 202, which are coupled to the radiator 235, are both arranged on the right side of the engine 5. This configuration not only reduces thermal influence on the coolant caused by exhaust heat from the engine 5, but also improves workability in assembly and disassembly.

As illustrated in FIG. 28, the warm water pipes 203, 204, which circulate warm water (coolant) to the air conditioner 364, are respectively coupled to the thermostat 70 and the coolant pump 71. The warm water pipes 203, 204 extend rearward on the right side position of the exhaust gas purification device 52 and are coupled to the air conditioner 364 in the cabin 7. That is, the warm water pipes 203, 204, which are coupled to the thermostat 70 and the coolant pump 71 on the right side, extend rearward in a bundle located one above the other. The warm water pipes 203, 204 are also arranged to pass above the bent portion (middle portion) 181c of the outlet side first bracket 181. The warm water pipes 203, 204 are coupled to the middle component coupling portion 181d on the bent portion 181c of the outlet side first bracket 181 via the warm water pipe securing bracket 208 to be supported by the engine 5.

Figure 29:
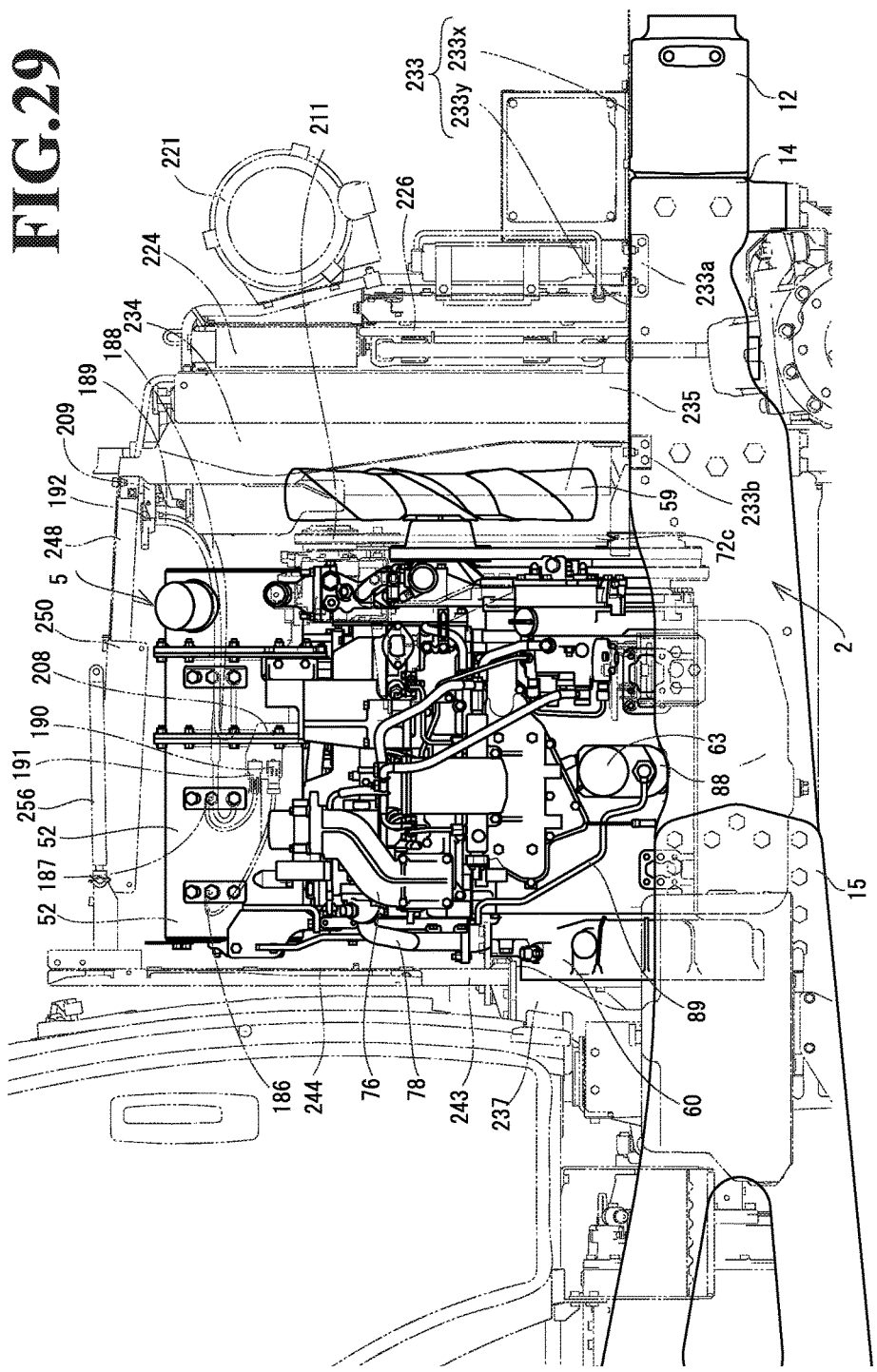
FIG. 29 is a right side enlarged view of the work vehicle illustrating the configuration in the engine compartment.
Figure 30:
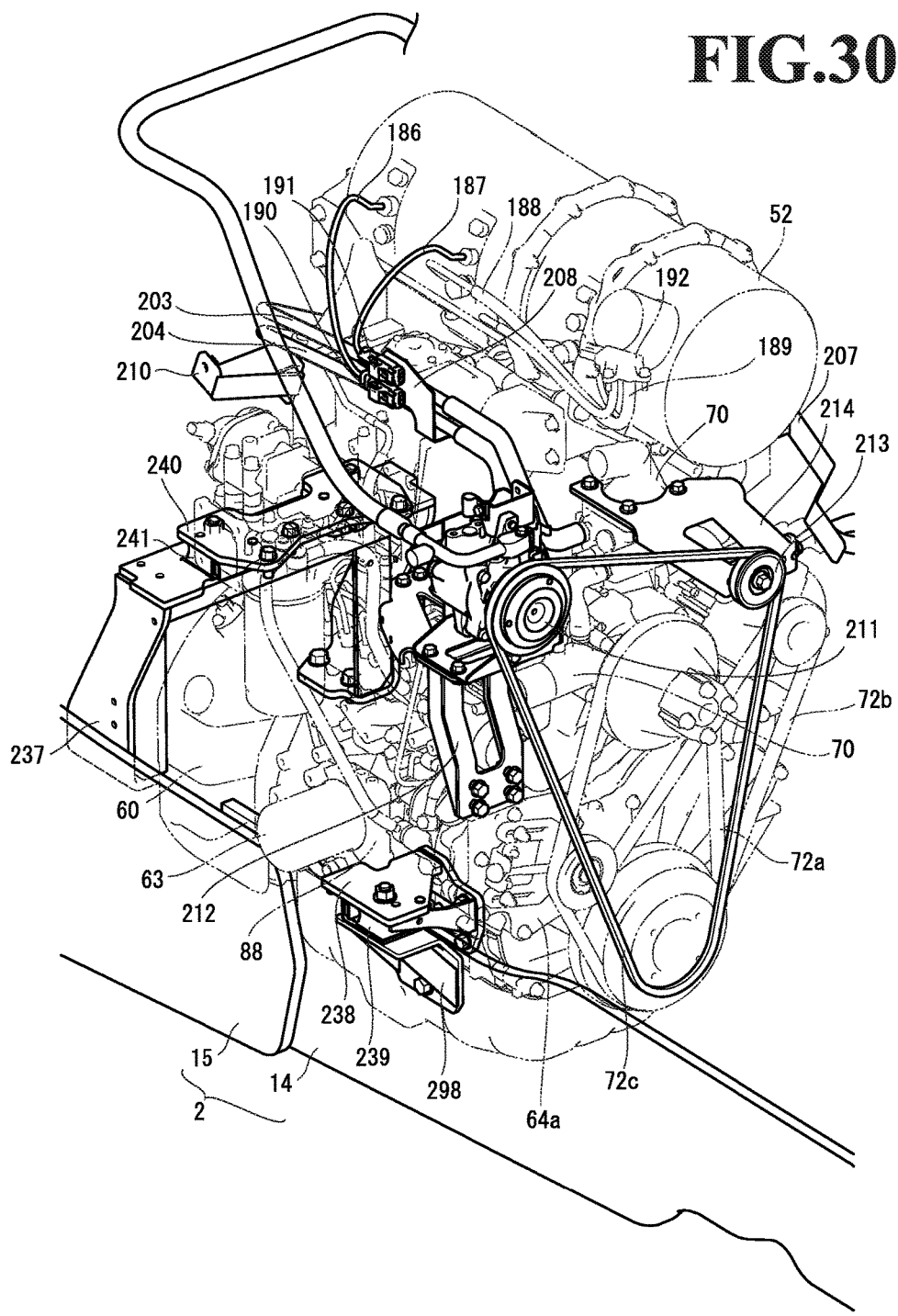
FIG. 30 is a front perspective view of the diesel engine illustrating the arrangement positions of the components attached to the diesel engine.

As illustrated in FIGS. 29 and 30, for example, the DPF 52 includes temperature sensors 186, 187, which detect exhaust gas temperature that flows through the gas purification housing 168. The temperature sensors 186, 187 are, for example, thermistor temperature sensors. The temperature sensors 186, 187 are inserted in the gas purification housing 168 and include wiring connectors 190, 191 for outputting measurement signals. The wiring connectors 190, 191 of the temperature sensors 186, 187 are secured to the warm water pipe securing bracket 208. The warm water pipe bracket 208 is configured by a plate that is bent into an L-shape and extends upright from the bent portion 181c of the outlet side first bracket 181 to be parallel to the DPF 52.

Figure 32:
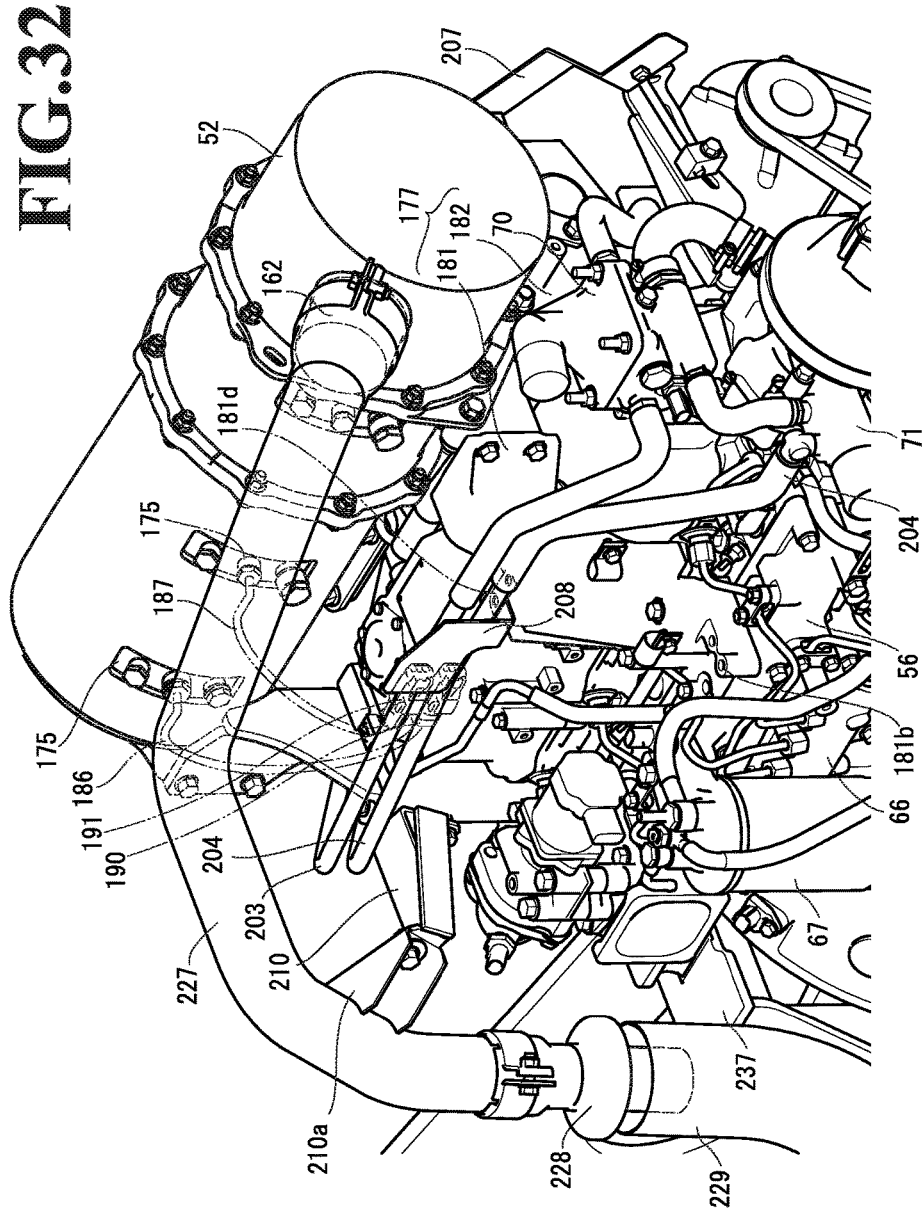
FIG. 32 is an enlarged perspective view of the diesel engine and the tailpipe illustrating the coupling relationship between the diesel engine and the tailpipe.
Figure 33:
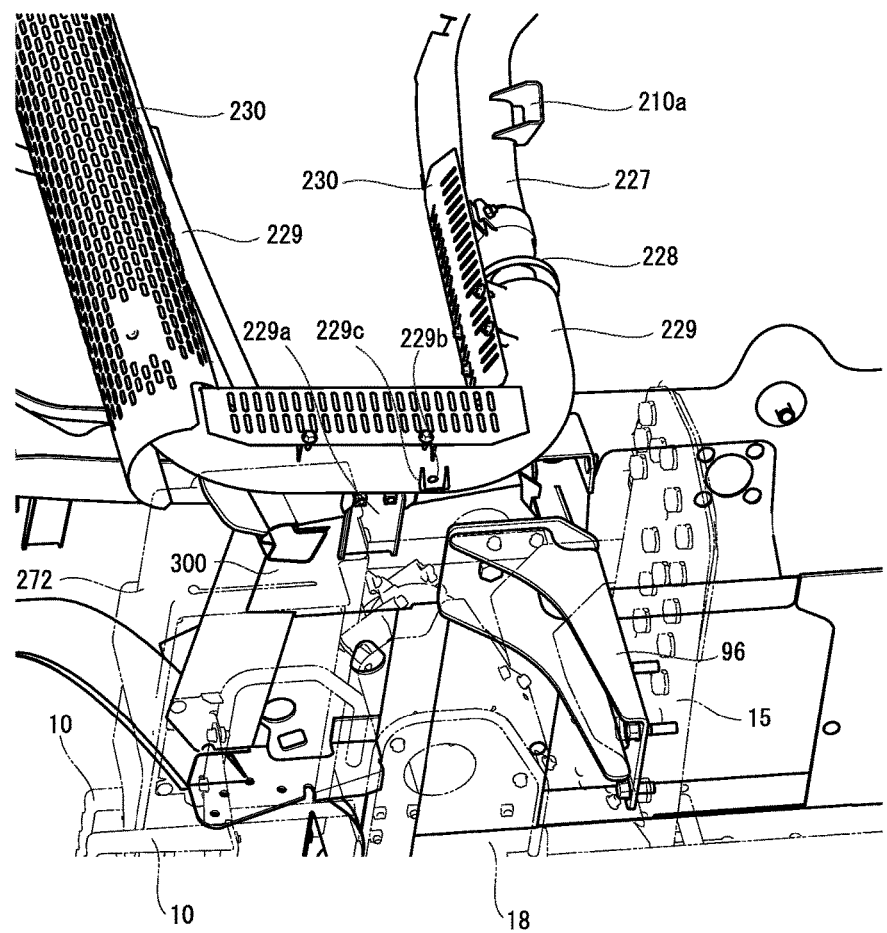
FIG. 33 is a bottom perspective view of the tailpipe illustrating the configuration of the lower section of the tail pipe.

As illustrated in FIGS. 30 and 32, for example, while the warm water pipes 203, 204 are secured to the left side (side facing the DPF 52) of the warm water pipe securing bracket 208, the wiring connectors 190, 191 are secured to the right side (side further from the DPF 52) of the warm water pipe securing bracket 208. The warm water pipes 203, 204, which supply coolant (warm water) that has contributed to cooling the engine 5 to an external device such as the air conditioner 364, are provided close to the DPF 52. This prevents decrease in the coolant temperature supplied to the external device. Providing a component to stand on the outer side of the warm water pipe securing bracket 208 insulates the heat of exhaust heat from the DPF 52. The electric components, which are the wiring connectors 190, 191 in this embodiment, are arranged on the further side of the warm water pipe securing bracket 208 from the DPF 52. This reduces influence caused by the exhaust heat from the engine 5 and the DPF 52, prevents failure caused by heat, and simultaneously inhibits noise from being superimposed on the output signal.

Figure 31:
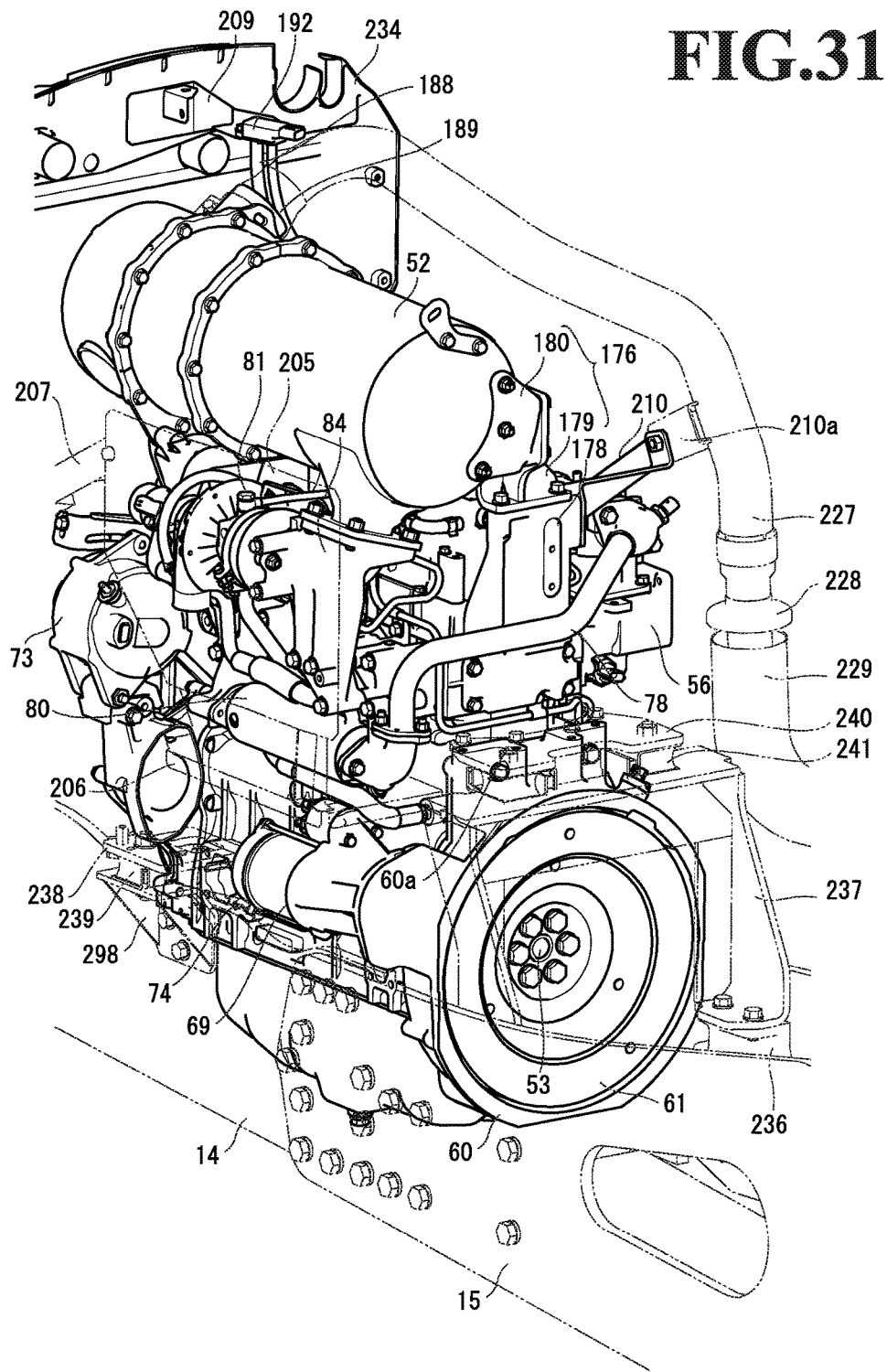
FIG. 31 is a rear perspective view of the engine compartment illustrating the positional relationship between the components in the engine compartment.

As illustrated in FIGS. 30 to 32, for example, the DPF 52 includes sensor pipes 188, 189, which are coupled to positions at the front and rear of a soot filter 164 in the gas purification housing 168 to detect the difference between the pressure of the exhaust gas in the section upstream of the soot filter 164 and the pressure of the exhaust gas in the section downstream of the soot filter 164 with a pressure difference sensor 192. The deposition amount of the particulate matter in the soot filter 164 is converted based on the pressure difference detected by the pressure difference sensor 192 to grasp the state of clogging in the DPF. A sensor bracket 209 is located on the fan shroud 234, which is located in front of the engine 5 and surrounds the cooling fan 59. The pressure difference sensor 192 is secured to the sensor bracket 209.

The sensor bracket 209 projects rearward from the rear surface of the fan shroud 234 and is located at a position higher than the sensor bosses 175, which are coupled to the sensor pipes 188, 189, and rightward of the DPF 52. The pressure difference sensor 192 is secured to the upper surface of the sensor bracket 209, and the sensor pipes 188, 189 are coupled to the sensor bracket 209 from the lower side. In this embodiment, the pressure difference sensor 192, which is secured to the sensor bracket 209, is located at a position higher than the DPF 52.

Since the sensor 192, which measures the internal environment of the DPF 52, is secured to the upper section of the fan shroud 234, the sensor 192 is located at an upstream section in the engine compartment along the flow direction of the cooling air. This configuration reduces influence of exhaust heat from the engine 5 and the DPF 52 and prevents failure of the sensor 192 that might otherwise be caused by the heat. Thus, the internal environment of the DPF 52 is properly grasped to optimally control the engine 5.

The exhaust gas outlet pipe 162 of the DPF 52 is provided close to the cooling fan 59. The pressure sensor 63, which measures the pressure difference between the front and rear of the purification filter 164 in the DPF 52, is secured to the upper section of the fan shroud 234. The exhaust gas outlet pipe 162 of the DPF 52 is provided close to the cooling fan 59. The pressure sensor 63, which measures the pressure difference between the front and rear of the purification filter 164 in the DPF 52, is secured to the upper section of the fan shroud 234. This configuration reduces the length of the pressure measurement pipes 188, 189, which are located between the pressure sensor 63 and the DPF 52, and reduces measurement errors caused by the pressure sensor 234.

As illustrated in FIG. 30, the tractor 1 of this embodiment includes the air conditioner compressor 211. The air conditioner compressor 211 compresses a refrigerant to be supplied to the air conditioner 364 of the cabin 7. The air conditioner compressor 211 receives power transmitted from the front end of the output shaft 53 of the engine 5 via a compressor V-belt 72c to be driven by the engine 5. The air conditioner compressor 211 is located at a position higher than the coolant pump 71 on the front right side of the engine 5. The air conditioner compressor 211 is mounted on the compressor securing bracket 212. One end of the compressor securing bracket 212 is coupled to an extended bracket 64a. The extended bracket 64a is coupled to the front section of the fuel supply pump 64.

The compressor securing bracket 212 is bent into an L-shape, and the air conditioner compressor 211 is secured to and located on the upper surface of the compressor securing bracket 212. The compressor securing bracket 212 is supported by the engine 5 by coupling one end of the compressor securing bracket 212 at the lower end to the extended bracket 64a and coupling the other end of the compressor securing bracket 212 at the upper end to the proximal end component coupling portion 181b at the proximal end of the outlet side first bracket 181. A pulley 213 is located on the front left side of the engine 5. The pulley 213 keeps the compressor V-belt 72c in tension. The pulley 213, around which the compressor V-belt is wound, is secured to the front edge of a position adjustment bracket 214 to be able to adjust the position. The position adjustment bracket 214 is coupled to the thermostat case 71 and projects forward of the engine 5.

As illustrated in FIG. 5, FIGS. 8 to 10, FIG. 27, FIG. 31, and FIG. 32, for example, the exhaust gas purification device 52 includes the exhaust gas outlet pipe 162 on the case outer circumferential surface at the other end (front end) of the exhaust gas purification device 52 in the longitudinal direction. The exhaust gas outlet pipe 162 is coupled to the exhaust pipe 227. The exhaust pipe 227 is located to extend over the engine 5 from the front left side toward the rear right side of the diesel engine 5. The exhaust pipe 227 is located between the exhaust gas purification device 52 and the downstream relay pipe 225 to be approximately parallel to the exhaust gas purification device 52 and the downstream relay pipe 225.

The exhaust gas purification device 52 and the exhaust pipe 227 are arranged above the engine 5 next to each other in the left and right direction to be parallel to the output shaft of the engine 5. That is, the exhaust gas purification device 52 and the exhaust pipe 227 are arranged next to each other such that the exhaust gas purification device 52 covers the left section of the upper surface of the engine 5, and the exhaust pipe 227 covers the right section of the upper surface of the diesel engine 5. The downstream relay pipe 225, which connects the intercooler 224 and an intake connecting pipe 76, is located further rightward of the exhaust pipe 227. This configuration prevents the exhaust gas purification device 52 that is heated to a high temperature from thermally affecting the downstream relay pipe 225.

The exhaust pipe (first exhaust pipe) 227, which is coupled to the exhaust side of the exhaust gas purification device 52, is inserted in the exhaust gas inlet port of a tailpipe (second exhaust pipe) 229 on the rear right side of the diesel engine 5. The tailpipe 229 is located on the front right side of the cabin 7 and extends toward the exhaust gas discharge side from below upward. The tail pipe 229 is bent toward the diesel engine 5 below the cabin 7 so that the tail pipe 229 has a J-shape. The exhaust pipe 227 also includes an umbrella-like upper surface cover 228 on the outer circumferential surface above the section at which the exhaust pipe 227 is inserted in the tailpipe 229. The upper surface cover 228 is secured to the outer circumferential surface of the exhaust pipe 227 to extend in a radial pattern. The upper surface cover 228 covers the exhaust gas inlet port of the tailpipe 229 and prevents dust and rain water from entering the tailpipe 229.

The tailpipe 229 is formed such that the lower bent portion extends over the body frame 15 from the inner side to the outer side. The tailpipe 229 includes an exhaust gas inlet port provided on the inner side of the body frame 15 at an upper section, and the exhaust gas discharge port of the exhaust pipe 227 is inserted in the exhaust gas inlet port. That is, the coupling portion between the tailpipe 229 and the exhaust pipe 227 has a two-layer pipe structure. When exhaust gas flows from the exhaust pipe 227 to the tailpipe 229, outside air is simultaneously allowed to flow into the tailpipe 229 through the space between the exhaust pipe 227 and the tailpipe 229. This configuration cools the exhaust gas that flows in the tailpipe 229. Furthermore, the tailpipe 229 is configured to be covered with a heat insulator 230. The engine covers 232 are formed of perforated plates and are located below the hood 6 on the left and right side to cover the left and right side of the engine compartment.

As illustrated in FIGS. 30 to 33, the exhaust pipe 227 is coupled to the exhaust gas outlet pipe 162, which is provided on the front right side of the outer circumferential surface of the DPF 52 facing upward. The exhaust pipe 227 is bent rearward along the exhaust gas flow direction and is arranged to be parallel to the DPF 52. The exhaust pipe 227 is bent downward at the downstream section along the exhaust gas flow such that the exhaust gas discharge port faces downward. The exhaust gas discharge port of the exhaust pipe 227 is inserted in the exhaust gas introduction port of the tailpipe 229, which is secured to the cabin 7. A securing coupling member 210a is provided at the middle of the outer circumference of the exhaust pipe 227. The exhaust pipe 227 is supported by the engine 5 by coupling the securing coupling member 210a to the bracket coupling portion 178b of the securing bracket 178 via the exhaust pipe securing bracket 210.

The tractor 1 includes the exhaust pipe (first exhaust pipe) 227, which is coupled to the exhaust gas outlet pipe 162 of the DPF 52 and secured to the engine 5, and the tailpipe (second exhaust pipe) 229, which is provided downstream of the exhaust pipe 227 and secured to the traveling body 2. The inner diameter of the tailpipe 229 is greater than the outer diameter of the exhaust pipe 227, and the exhaust outlet end of the exhaust pipe 227 is inserted in and communicates with the exhaust inlet of the tailpipe 229. The exhaust pipe 227 and the tailpipe 229 are securely coupled to the engine 5, the traveling body 2, and the cabin 7, which have different vibration systems. This configuration prevents damage on the exhaust pipe 227 and the tailpipe 229. Since the exhaust pipe 227 is configured to be inserted in the exhaust inlet of the tailpipe 229, the outside air is introduced into the tailpipe 229 together with the exhaust gas from the exhaust pipe 227. This cools the exhaust gas that is to be discharged outside.

The U-shaped tailpipe 229 is secured at a position forward of the operator's seat 8. That is, the tailpipe 229 is securely coupled to a front lower section of a cabin frame 300 of the cabin 7 via a securing bracket 229a. Four corners at the lower section of the cabin frame 300 of the cabin 7 are securely supported by the front supports 96 and the rear supports 97, which are located on the traveling body. A battery 272 for supplying power is provided at the lower right section of the cabin 7.

A drain hole 229b for drainage is provided at the lower section of the tailpipe 229, and a wind direction plate 229c is coupled to the lower section of the tailpipe 229. The wind direction plate 229c covers the drain hole 229b from below and the rear. Since the drain hole 229b is covered with the wind direction plate 229c, water is drained toward the front that is not covered with the wind direction plate 229b (in a direction to separate from the cabin 7). The drain hole 229b is provided inward (on the left side) of the battery 272. The wind direction plate 229 covers the left, the right, and the rear (three directions other than the front) of the drain hole 229b. Thus, when high-temperature water in the tailpipe 229 is drained to the outside, components having low heat resistance or low water resistance such as a harness or the battery 272, which are provided adjacent to the tailpipe 229, are prevented from being damaged by heat or causing failure due to water leakage.

The exhaust gas outlet pipe 162 and the exhaust gas inlet pipe 161 of the DPF 52 are distributed at the front and the rear of the DPF 52 such that exhaust gas from the engine 5 flows along the output shaft of the engine 5 in the exhaust gas purification device (DPF) 52. The exhaust inlet of the exhaust pipe (first exhaust pipe) 227 is coupled to the exhaust gas outlet pipe 162, which is located at the front section of the DPF 52. The exhaust pipe (first exhaust pipe) 227 extends rearward along the DPF 52 above the engine 5, and the DPF 52 and the exhaust pipe (first exhaust pipe) 227 are covered with the heat insulator 250. Since the DPF 52 and the exhaust pipe (first exhaust pipe) 227 are covered with the heat insulator 250, the hood 6, which covers the engine compartment, is prevented from being heated by exhaust heat from the engine compartment.

Figure 34:
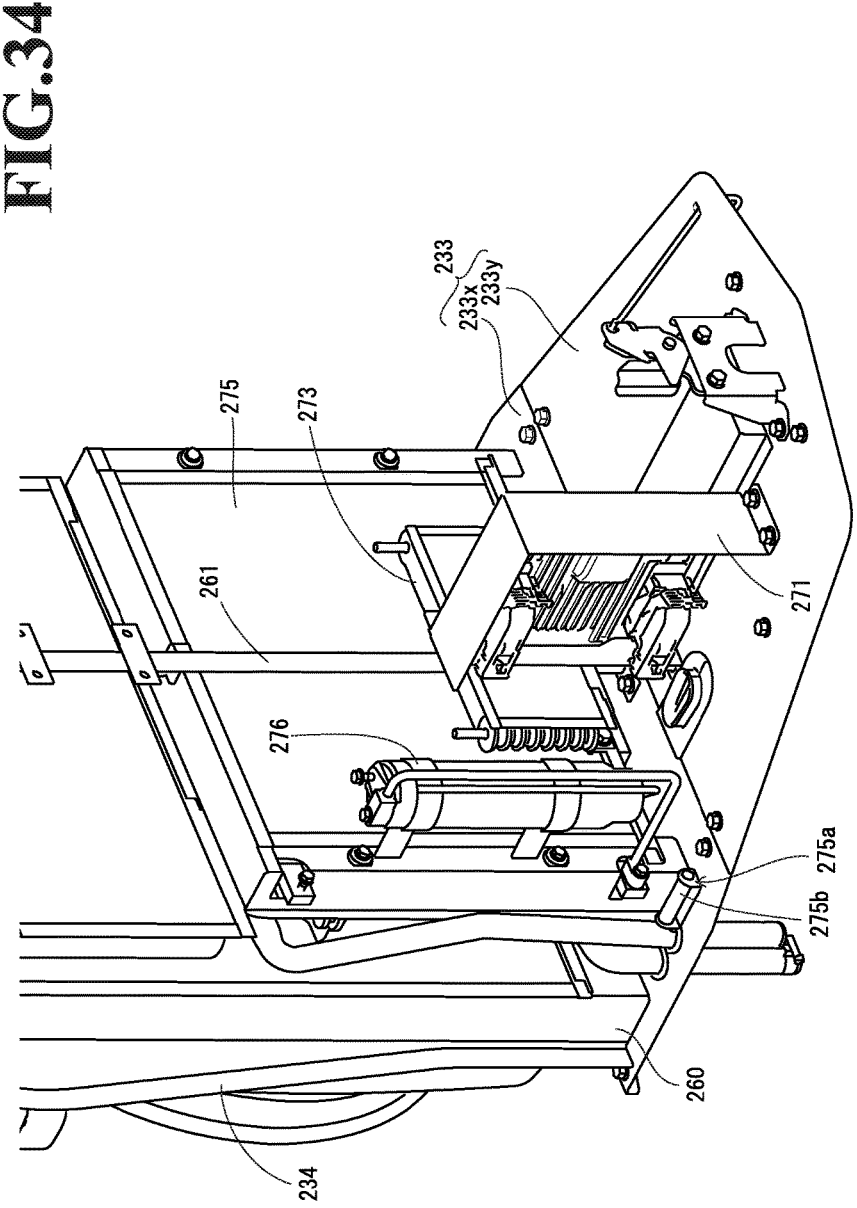
FIG. 34 is a perspective view of a variation of the engine compartment illustrating the configuration in the engine compartment at the front.
Figure 35:
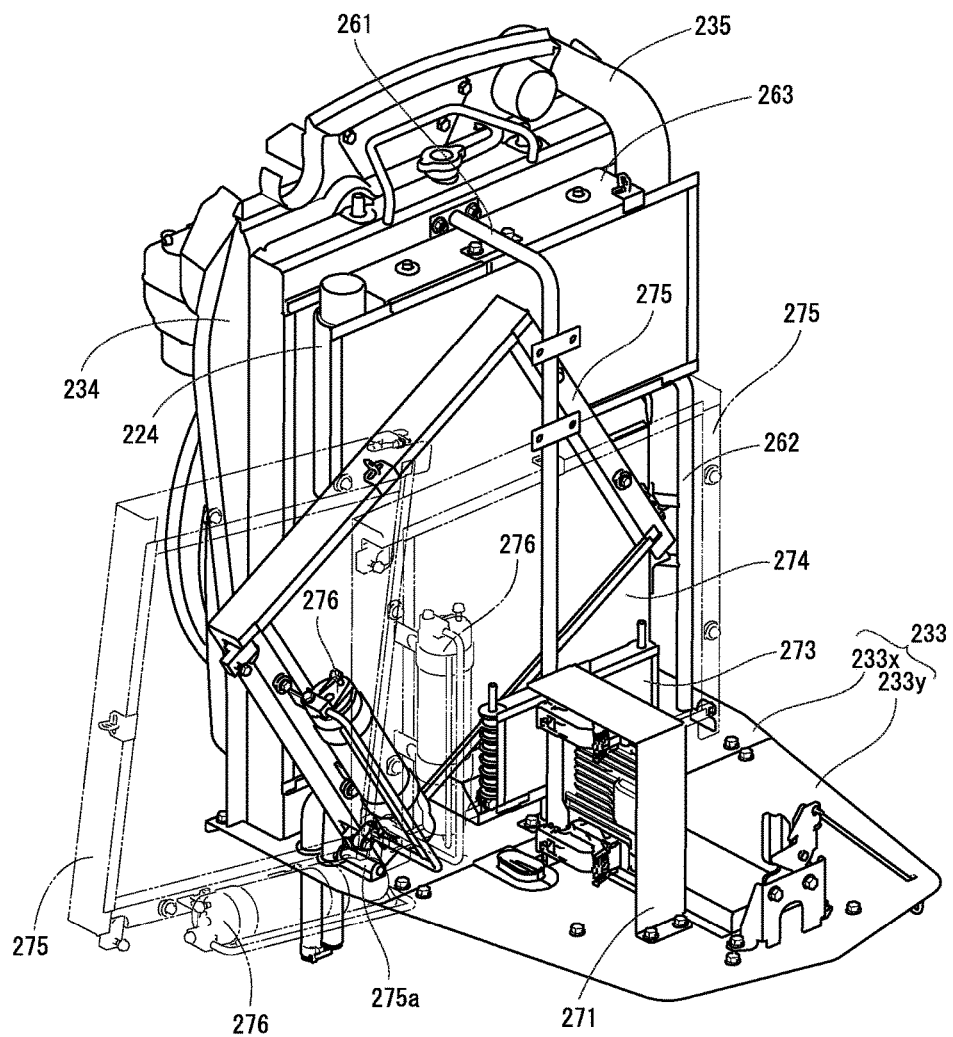
FIG. 35 is an enlarged view of the variation illustrated in FIG. 34.
Figure 36:
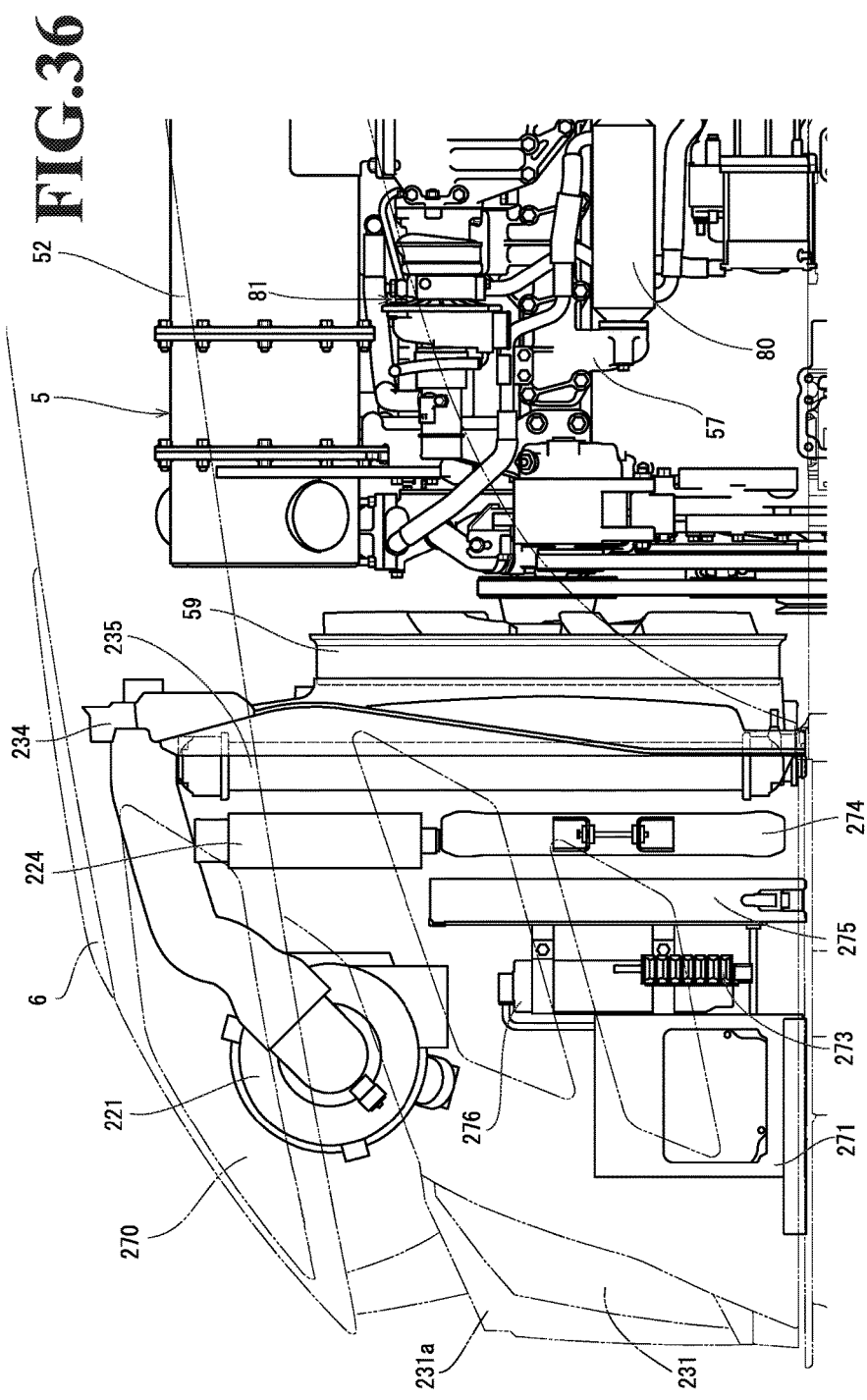
FIG. 36 is a left side view of the variation illustrating the configuration in the engine compartment.

With reference to FIGS. 34 to 38, variations of the arrangement of the heat exchangers in the engine compartment will be described below. As illustrated in FIGS. 34 and 36, in the engine compartment, which is covered with the hood 6, the rear surface of the radiator 235 is covered with the fan shroud 234. The fan shroud 234 surrounds the outer circumference of the cooling fan 59, which is provided at the front of the engine 5. The intercooler 224 and the oil cooler 274 are disposed one above the other in front of the radiator 235. The upper intercooler 224 is secured to the inverted U-shaped frame (stationary frame) 262. Within the inverted U-shaped frame 262, the lower oil cooler 274 is secured so as to be pivotable about the longitudinal axis.

As illustrated in FIGS. 34 and 35, the air cleaner 221 is located at a position in front of the upper intercooler 224 and spaced apart from the intercooler 224, and the condenser 275 is located in front of the upper oil cooler 274 and below the air cleaner 221. The condenser 275 is located at a position between the air cleaner 221 and the oil cooler 274. The condenser 275 stands upright on the bottom plate frame 233 and is configured to be pivotable about the fore-and-aft axis. More specifically, a hinge 275a is provided at the right lower end of the condenser 275. A shaft 275b of the hinge 275a is coupled to the bottom plate frame 233 with the shaft 275b oriented in the fore-and-aft direction. The condenser 275 is pivotable about the shaft 275b of the hinge 275a. The receiver dryer 276 is coupled to the condenser 275 and rotates integrally with the condenser 275.

As illustrated in FIG. 34, the air cleaner support frame 261 is a rod-shaped frame that is bent to have an L-shape, and is located adjacent to the condenser 275 and extends vertically on the bottom plate frame 233. The upper end of the air cleaner support frame 261 is bent horizontally toward the rear. Thus, as illustrated in FIG. 35, when the condenser 275 is pivoted about the hinge 275a, which is located at the right lower end, the condenser 275 can be rotated in such a manner that the left upper end of the condenser 275 passes below the bent portion of the air cleaner support frame 261. The oil cooler 274, which is located behind the condenser 275, is pivotally supported about the vertical axis on either the left or right side, and thus is disposed so as to be able to open and close the inverted U-shaped frame 262.

In this variation, the condenser 275 can be pivoted utilizing the space between the air cleaner 221 and the intercooler 224, and this facilitates access to the oil cooler 274. Furthermore, since the oil cooler 274 and the condenser 275 are mounted so as to be pivotable in a manner to avoid the air cleaner 221 and the intercooler 224, which are stationary, the number of components that need to be removed when accessing the radiator 235 is reduced and therefore the difficulties in maintenance work are eliminated. Furthermore, since the air cleaner 221 and the intercooler 224 are spaced apart from each other, a space is formed above the radiator 235 so that cool air can easily flow into the radiator 235. As a result, the velocity distribution of the cool air in the engine compartment is equalized in the height direction, and thus the backflow, for example, is inhibited.

Figure 37:
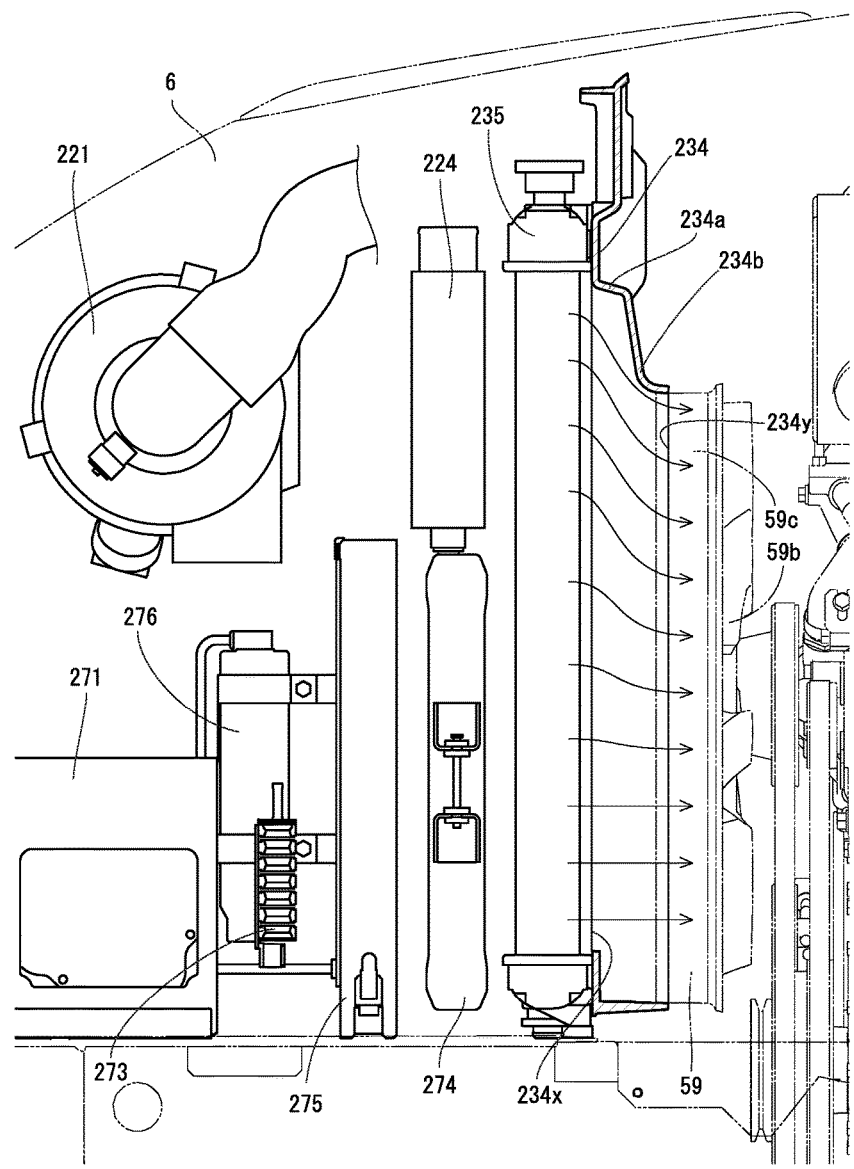
FIG. 37 is an enlarged cross-sectional view of the variation illustrating the configuration of the fan shroud.

As illustrated in FIGS. 36 and 37, the outer circumference of the cooling fan 59 is surrounded by the fan shroud 234, which covers the rear surface of the radiator 235, and the center of the cooling fan 59 is offset downward from the center of the radiator 235. Further, in front of the radiator 235, the plurality of heat exchangers (intercooler 224, oil cooler 274, and condenser 275) are disposed one above the other. In this configuration, the number of heat exchangers located in the upper section (intercooler 224) is smaller than the number of heat exchangers located in the lower section (oil cooler 274 and condenser 275). That is, in front of the radiator 235, the intercooler 224 and the oil cooler 274 are disposed one above the other, and the condenser 275 is located in front of the intercooler 224 and oil cooler 274 and in the lower section.

Since the pressure drop in the offset region between the cooling fan 59 and the radiator 235 is reduced, the velocity distribution of the cool air that flows within the fan shroud 234 is equalized. As a result, a pressure differential in the vertical direction is inhibited within the fan shroud 234, so that backflow of the cool air to the radiator 235 is prevented, and thus the cooling efficiency of the radiator 235 is increased. Furthermore, since the pressure drop in the offset region between the cooling fan 59 and the radiator 235 is reduced, introduction of the cool air into the engine 5 is facilitated to reduce the load imposed on the cooling fan 59. Furthermore, the air cleaner 221 is secured to a location in front of the intercooler 224 and spaced apart from the intercooler 224. With this configuration, a space is formed above the radiator so that the cool air can easily flow into the radiator. Thus, the velocity distribution of the cool air in the engine compartment is equalized in the height direction, and the backflow, for example, is inhibited.

As illustrated in FIG. 37, the fan shroud 234 has a shape such that a first frame portion 234a and a second frame portion 234b are connected to each other in the fore-and-aft direction. The first frame portion 234a includes an inlet side opening 234x, which covers the rear surface of the radiator 235 as a whole. The second frame portion 234b includes an outlet side opening 234y, which covers the outer circumference of the cooling fan 59. In the fan shroud 234, the inlet side open area is greater than the outlet side open area, and the upper edge of the outlet side opening 234y is located lower than the upper edge of the inlet side opening 234x. As illustrated in FIG. 37, the cross section of the fan shroud 234 from the inlet side opening 234x to the outlet side opening 234y has a bellmouth shape.

As illustrated in FIG. 37, the fan shroud 234 is configured such that, at the connection portion between the first frame portion 234a, which has a larger cross section, and the second frame portion 234b, which has a smaller cross section, the offset portion above the cooling fan 59 has a gently curved surface. With this configuration of the fan shroud 234, turbulence in the offset portion above the cooling fan 59 is inhibited and the velocity distribution of the cool air within the fan shroud 234 is equalized. Thus, the amount of cool air to be guided by the cooling fan 59 is optimized and therefore the introduction of the cool air into the engine compartment is facilitated. This configuration achieves noise reduction by reducing the rotational speed of the cooling fan 59.

Figure 38:
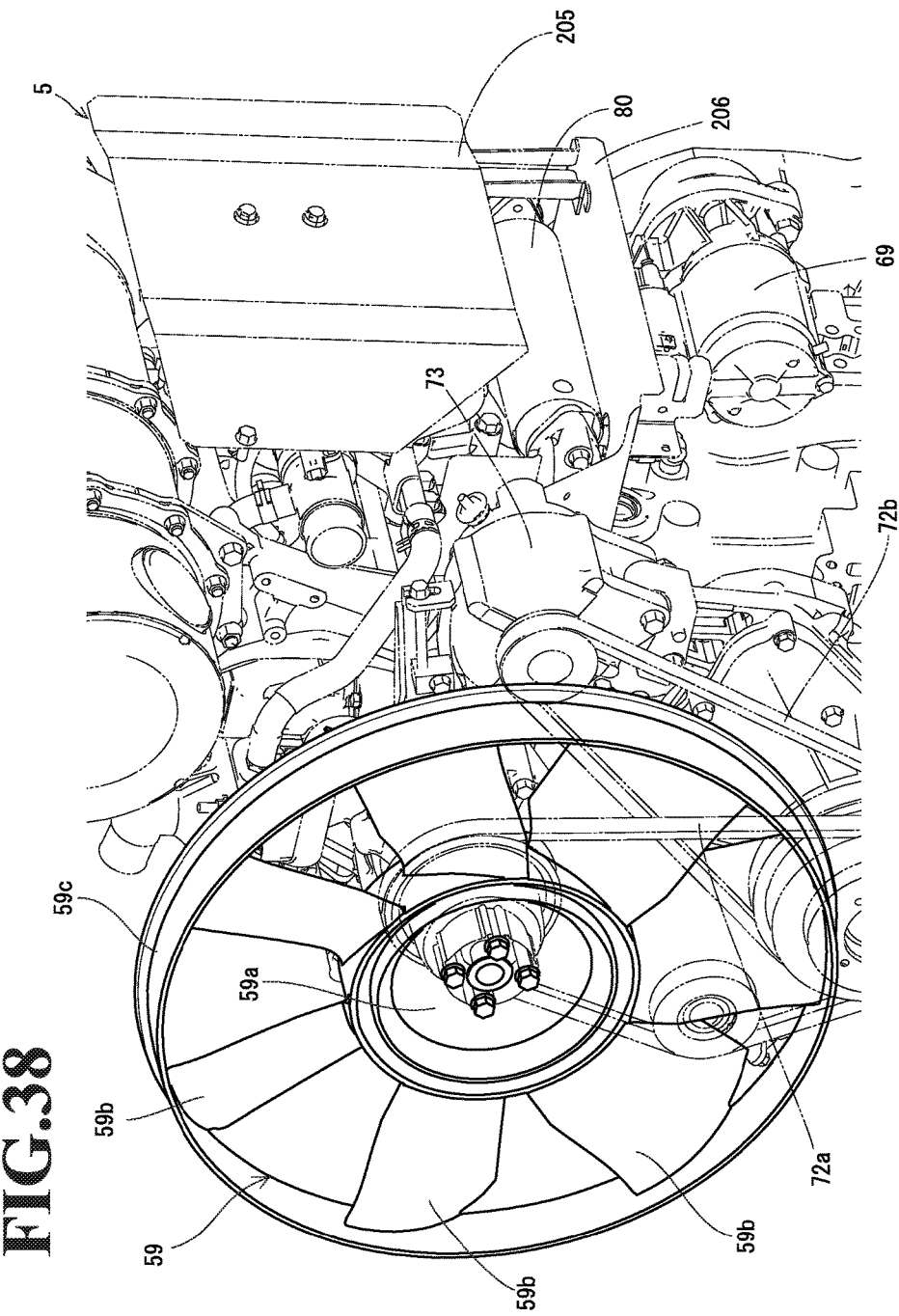
FIG. 38 is a perspective view of the variation illustrating the configuration of the cooling fan.

As illustrated in FIGS. 36 to 38, the front end of the cooling fan 59 is inserted in the outlet side opening 234$y$ of the fan shroud 234. The cooling fan 59 is formed by a ring fan. The cooling fan 59 includes a boss 59$a$ at the center and a plurality of blades 59$b$, which are radially arranged on the boss 59$a$. The outer ends (blade ends) of the blades 59$b$ are coupled to a ring-shaped frame 59$c$. When the cooling fan 59 is inserted through the outlet side opening 234$y$ of the fan shroud 234, the outer circumferential surface of the frame 59$c$ of the cooling fan is brought close to the inner edge of the outlet side opening 234$y$ of the fan shroud 234. Thus, the cooling air introduced into the fan shroud 234 flows into the frame 59$c$ in the cooling fan 59. Thus, by using a ring fan to form the cooling fan 59, guiding of the cooling air toward the engine 5 is facilitated, and the cooling effect in the engine compartment is increased.

The configurations of the components according to the invention of the present application are not limited to the illustrated embodiment, but may be modified in various forms without departing from the object of this invention.

The embodiment of the invention of the present application relates to work vehicles such as agricultural tractors or wheel loaders for civil engineering work.

What is claimed is:

1. A work vehicle comprising:
an engine positioned in a front portion of a traveling body, the engine comprising a forced induction device;
a radiator configured to supply a coolant to the engine;
the engine and the radiator being in an engine compartment which is covered by a hood comprising an opening portion in a front surface of the hood;
a fan shroud positioned in the engine compartment and surrounding an outer circumference of a cooling fan positioned in front of the engine and covering a rear surface of the radiator; and
a plurality of heat exchangers positioned in front of the radiator, the plurality of heat exchangers disposed one above the other;
an engine control unit configured to control the engine;
a bottom plate covering an upper surface of the front portion of the traveling body;
a center of the cooling fan being offset downward from a center of the radiator; and
wherein:
the engine control unit is positioned in front of the plurality of heat exchangers; and
the engine control unit is oriented upright on the bottom plate with a longitudinal direction of the engine control unit aligned with a fore-and-aft direction of the traveling body.

2. The work vehicle according to claim 1, wherein:
the hood comprises left and right symmetrical meshed opening portions at positions in front of the cooling fan, and the bottom plate comprises a meshed opening portion at a position in front of the cooling fan, and
the engine control unit is positioned between the left and right symmetrical meshed opening portions of the hood and above the meshed opening portion of the bottom plate.

* * * * *